US012723007B2

(12) United States Patent
Dumitras et al.

(10) Patent No.: US 12,723,007 B2
(45) Date of Patent: Sep. 1, 2026

(54) HYDROPHOBIC ADMIXTURE AND PROCESSES FOR MAKING SAME

(71) Applicant: DRYMAX GLOBAL LLC, Winston, GA (US)

(72) Inventors: Alan Dumitras, Winston, GA (US); Matias Soto, Winston, GA (US); Recharlis Souza Do Vale, Winston, GA (US)

(73) Assignee: DRYMAX GLOBAL LLC, Winston, GA (US)

( * ) Notice: Subject to any disclaimer, the term of this patent is extended or adjusted under 35 U.S.C. 154(b) by 309 days.

(21) Appl. No.: 18/468,494

(22) Filed: Sep. 15, 2023

(65) Prior Publication Data

US 2024/0002297 A1 Jan. 4, 2024

Related U.S. Application Data

(63) Continuation of application No. PCT/US2022/039733, filed on Aug. 8, 2022.

(60) Provisional application No. 63/230,450, filed on Aug. 6, 2021.

(51) Int. Cl.
*C04B 40/00* (2006.01)
*C04B 14/02* (2006.01)
(Continued)

(52) U.S. Cl.
CPC ........ *C04B 40/0042* (2013.01); *C04B 14/024* (2013.01); *C04B 14/28* (2013.01);
(Continued)

(58) Field of Classification Search
CPC ... C04B 40/0042; C04B 14/024; C04B 14/28; C04B 14/305; C04B 24/04; C04B 28/02;
(Continued)

(56) References Cited

U.S. PATENT DOCUMENTS 5,192,366 A 3/1993 Nishioka et al.
5,584,926 A 12/1996 Borgholm et al.
(Continued)

FOREIGN PATENT DOCUMENTS

JP 2000319642 A * 11/2000
WO 00/66514 A1 9/2000
WO 02/30847 A1 4/2002

OTHER PUBLICATIONS

JP 2000319642A Machine Translation (Year: 2000).*
(Continued)

*Primary Examiner* — Pamela H Weiss
(74) *Attorney, Agent, or Firm* — Bradley Arant Boult Cummings LLP; Adam J. Thompson

(57) ABSTRACT

A hydrophobic admixture may include titanium dioxide at about 1-16.5 weight % (wt %) of the hydrophobic admixture. The hydrophobic admixture can include a carbon allotrope at about 1-38.5 wt % of the hydrophobic admixture. The hydrophobic admixture may include calcium salt at about 25-82.5 wt % of the hydrophobic admixture. The hydrophobic admixture may include calcium stearate at about 15-27.5 wt % of the hydrophobic admixture. The hydrophobic admixture may include magnesium carbonate at about 0-11 wt % of the hydrophobic admixture.

14 Claims, 35 Drawing Sheets

(51) Int. Cl.

| | |
|---|---|
| ***C04B 14/28*** | (2006.01) |
| ***C04B 14/30*** | (2006.01) |
| ***C04B 24/04*** | (2006.01) |
| ***C04B 28/02*** | (2006.01) |
| ***C04B 103/65*** | (2006.01) |
| ***C04B 111/27*** | (2006.01) |

(52) U.S. Cl.
CPC ............ *C04B 14/305* (2013.01); *C04B 24/04* (2013.01); *C04B 28/02* (2013.01); *C04B 40/0014* (2013.01); *C04B 40/0071* (2013.01); *C04B 2103/65* (2013.01); *C04B 2111/27* (2013.01)

(58) Field of Classification Search
CPC ............ C04B 40/0014; C04B 40/0071; C04B 2103/65; C04B 2111/27; C04B 2111/28; C04B 40/0039; C01B 32/05; C01B 32/182; C01B 32/20
See application file for complete search history.

(56) References Cited

U.S. PATENT DOCUMENTS

| | | | |
|---|---|---|---|
| 7,670,423 | B2 | 3/2010 | Szymaski et al. |
| 8,092,586 | B2 | 1/2012 | Ancora et al. |
| 8,258,234 | B2 | 9/2012 | Lohmeijer et al. |
| 2014/0060388 | A1 | 3/2014 | Sadiq et al. |

OTHER PUBLICATIONS

International Search Report and Written Opinion issued for International Application No. PCT/US2022/039733, mailed Dec. 28, 2022, 13 Pages.

Office Action received in Chilean Patent application No. 202400361 mailed on Nov. 17, 2025.

First Examination Report received in Saudi Arabian Patent application No. 1120240508 mailed on Dec. 20, 2025.

Extended European Search Report received in European Patent application No. 22853997.9-1014 mailed on May 22, 2025.

* cited by examiner

200A

200B

300A

300B

| Elt. | Line | Intensity (c/s) | Conc | Units |
|---|---|---|---|---|
| C | Ka | 323.21 | 79.37 | wt.% |
| O | Ka | 42.70 | 3.81 | wt.% |
| Na | Ka | 1.54 | 0.02 | wt.% |
| Mg | Ka | 5.89 | 0.06 | wt.% |
| Al | Ka | 141.42 | 1.29 | wt.% |
| Si | Ka | 182.83 | 1.58 | wt.% |
| K | Ka | 56.04 | 0.61 | wt.% |
| Ti | Ka | 674.43 | 12.60 | wt.% |
| Fe | Ka | 16.80 | 0.65 | wt.% |
| | | | 100.00 | wt.% |

600

| Elt. | Line | Intensity (c/s) | Conc | Units |
|---|---|---|---|---|
| C | Ka | 288.70 | 78.25 | wt.% |
| O | Ka | 51.36 | 5.04 | wt.% |
| Na | Ka | 1.46 | 0.02 | wt.% |
| Mg | Ka | 4.70 | 0.05 | wt.% |
| Al | Ka | 114.45 | 1.16 | wt.% |
| Si | Ka | 154.91 | 1.49 | wt.% |
| K | Ka | 42.10 | 0.51 | wt.% |
| Ti | Ka | 625.49 | 12.96 | wt.% |
| Fe | Ka | 12.13 | 0.52 | wt.% |
| | | | 100.00 | wt.% |

800A

800B

| Elt. | Line | Intensity (c/s) | Conc | Units |
|---|---|---|---|---|
| C | Ka | 159.17 | 56.87 | wt.% |
| O | Ka | 130.36 | 14.24 | wt.% |
| Mg | Ka | 213.03 | 2.94 | wt.% |
| Al | Ka | 42.96 | 0.54 | wt.% |
| Si | Ka | 78.08 | 0.90 | wt.% |
| K | Ka | 15.18 | 0.20 | wt.% |
| Ca | Ka | 1236.48 | 20.97 | wt.% |
| Ti | Ka | 131.42 | 3.34 | wt.% |
| | | | 100.00 | wt.% |

1100

| Elt. | Line | Intensity (c/s) | Conc | Units |
|---|---|---|---|---|
| C | Ka | 124.76 | 54.63 | wt.% |
| O | Ka | 104.71 | 13.89 | wt.% |
| Mg | Ka | 171.38 | 2.85 | wt.% |
| Al | Ka | 40.76 | 0.62 | wt.% |
| Si | Ka | 74.02 | 1.03 | wt.% |
| K | Ka | 21.90 | 0.35 | wt.% |
| Ca | Ka | 1,029.74 | 20.78 | wt.% |
| Ti | Ka | 193.61 | 5.87 | wt.% |
| | | | 100.00 | wt.% |

1300

2600B

2600A

2700B

2700A

3000

HYDROPHOBIC ADMIXTURE AND PROCESSES FOR MAKING SAME

CROSS REFERENCE TO RELATED APPLICATIONS

This applications is a continuation of International Patent Application No. PCT/US22/39733, filed on Aug. 8, 2022 and entitled "HYDROPHOBIC ADMIXTURE AND PROCESSES FOR MAKING SAME," which claims the benefit of and priority to U.S. Provisional Application No. 63/230,450, filed Aug. 6, 2021 and entitled "HYDROPHOBIC ADMIXTURE AND PROCESSES FOR MAKING SAME," the disclosure of which is hereby incorporated by reference in its entirety.

TECHNICAL FIELD

The present systems and processes relate generally to hydrophobic admixtures.

BACKGROUND

A common method of improving the waterproofing capabilities of concrete is the use of a waterproofing additive. For example, a hydrophobic admixture can be mixed into fresh concrete and, following pouring, provide water resistance to the concrete. Waterproofing additives are generally characterized into two modes of water penetration reduction, crystallization activity and hydrophobic and pore-blocking (HPI) effects. Crystallization activity may occur when the chemicals in the additive react with moisture in fresh concrete and with the by-products of cement hydration to generate an insoluble crystalline formation in the pores and capillaries. HPI additives typically produce water repellant properties in concrete by changing the surface tension of cement hydrates and capillary surfaces present in the material. When the concrete experiences hydrostatic pressure, the HPI additive may physically plug capillaries, thereby preventing moisture intrusion. Previous approaches to waterproofing building materials have relied on complex organic molecules and polymers that may be costly to obtain and maintain and may experience diminishing efficacy over time (e.g., staling) due to breakdown of one or more components.

Therefore, there exists a long-felt but unresolved need for an effective admixture for waterproofing building materials.

BRIEF SUMMARY OF THE DISCLOSURE

Briefly described, and according to one embodiment, aspects of the present disclosure generally relate to hydrophobic admixtures and processes for making and using the same.

According to one embodiment, hydrophobic admixtures described herein demonstrate significant hydrophobic properties and, therefore, may be useful in conveying waterproof or water resistant properties to materials in which the hydrophobic admixtures are mixed. In various embodiments, the present disclosure provides processes for preparing a hydrophobic admixture from ingredients described herein. In at least one embodiment, the process modifies the wettability of one or more ingredients and, thereby, creates a hydrophobic admixture that demonstrates significant hydrophobic properties. The hydrophobic admixture can be in any suitable form including, but not limited to, a powder, an agglomerated solid, or a liquid suspension.

In one or more embodiments, the processes described herein transform physical characteristics of one or more ingredients, such as, for example, surface roughness, grain size, crystal size, hierarchical structure, and bonding. In various embodiments, the hydrophobic admixture includes, but is not limited to, titanium dioxide, graphite, calcium carbonate, calcium stearate, magnesium carbonate, and water.

The present hydrophobic admixtures may demonstrate hydrophobic properties and repel capillary absorption. The present hydrophobic admixtures may include nanoparticles, such as titanium dioxide nanoparticles. In one or more embodiments, the hydrophobic admixture fabrication processes described herein increase surface roughness of nanoparticles to increase hydrophobicity in hierarchical structures incorporating the same. In addition to hydrophobic effects, the present hydrophobic admixtures may reduce the absorption of mixed chlorides in moisture. The reduction of mixed chloride absorption may reduce corrosion of metallic structures. For example, concrete fabrication commonly includes pouring concrete over metal rebar structures. In this example, the present hydrophobic admixture may be introduced to the concrete during mixing and eventually produce a concrete structure with strong hydrophobic properties, low capillary absorption, and reduced corrosion of the metal rebar sub-structure. Previous additives may rely on a chemical reaction between their powders and water to form crystals within the porous networks of concrete structures; however, such approaches may fail to fully seal the porous networks due to incomplete or insufficient crystallization (e.g., or subsequent dissolving of the crystal structures) and overall lack of hydrophobic properties. In contrast, the present hydrophobic admixtures demonstrate hydrophobic properties that actively repel water and oppose capillary uptake of water and chlorine. Further, the present hydrophobic admixtures may immediately produce hydrophobic and anti-capillary effects when introduced to a building material, as opposed to previous polymer- or crystallization-based approaches that may require substantial curing times to infiltrate and block porous networks of the building material.

In various embodiments, the present hydrophobic admixtures demonstrate stability over time due to strength of particle bonding when mixed with building material(s), such as cement, aggregates, and water. In one or more embodiments, the temporal stability of the present hydrophobic admixtures may extend their performance beyond the typical lifespan of other waterproofing materials that rely on polymers or crystallization precursors, which may degrade over time and thereby reduce waterproofing performance.

A process for creating the hydrophobic admixture can include blending, in one or more ratios described herein, graphite, titanium dioxide, and water. The process can include microwaving the blend of graphite, titanium dioxide, and water for a predetermined time period, such as, for example, 18 minutes. The microwaving may be substituted by any suitable heating method, such as convection heating. In various embodiments, the microwaving and blending process increases crystal size of the graphite, reduces grain size of the titanium dioxide, and causes the titanium dioxide nanoparticles to bond to the graphite crystals (e.g., or a sheet formed therefrom), thereby producing a hierarchical structure with hydrophobic properties. In one or more embodiments, the titanium dioxide nanoparticles generate air pockets within the hierarchical structure that repel water. In at least one embodiment, the titanium dioxide nanoparticles (e.g., and/or other materials added in subsequent steps)

increase the surface roughness of the hierarchical structure, thereby increasing hydrophobic properties.

Following the first iteration of microwaving, the process can include forming a second blend by blending calcium carbonate and magnesium carbonate into the blend of graphite, titanium dioxide, and water. The process can include microwaving the second blend for a second predetermined time period, such as, for example, 20 minutes. During cooling of the second blend, the process can include forming the final hydrophobic admixture by adding calcium stearate to the second blend.

In various embodiments, the hydrophobic admixtures described herein demonstrate fire-retardant properties. In one or more embodiments, the hydrophobic admixture may be introduced to a material (e.g., or a mixture of ingredient(s) for producing the material) to reduce the flammability of the material (or a resultant material). In at least one embodiment, a process for producing fire-retardant drywall includes introducing the hydrophobic admixture to drywall precursor materials (e.g., gypsum, plywood, wood pulp, paper, and/or other ingredients). Experimental tests were performed on treated and untreated drywall samples. The treated drywall samples include about 90% by weight gypsum and about 10% by weight of an embodiment of the present hydrophobic admixture. Experimental tests demonstrated that hydrophobic admixture-treated drywall demonstrates a greater time to ignite (e.g., lower flammability) and slower burn rate as compared to untreated drywall. Droplet contact angle tests also confirmed the surface of hydrophobic admixture-treated drywall is more hydrophobic as compared to untreated drywall.

According to a first aspect, a hydrophobic admixture, comprising: A) titanium dioxide at about 1-15 wt % of the hydrophobic admixture; B) graphite at about 1-35 wt % of the hydrophobic admixture; C) calcium carbonate at about 25-75 wt % of the hydrophobic admixture; D) calcium stearate at about 15-25 wt % of the hydrophobic admixture; E) magnesium carbonate at about 0-10 wt % of the hydrophobic admixture; and F) water at about 1-10 wt % of the hydrophobic admixture.

According to a further aspect, the hydrophobic admixture of the first aspect or any other aspect, wherein the titanium dioxide and the graphite were subjected to a blending and microwaving process.

According to a further aspect, the hydrophobic admixture of the first aspect or any other aspect, wherein a microwaving step of the blending and microwaving process was performed in the presence of at least heat absorptive element.

According to a further aspect, the hydrophobic admixture of the first aspect or any other aspect, wherein the microwaving was performed in the presence of three heat absorptive elements.

According to a further aspect, the hydrophobic admixture of the first aspect or any other aspect, wherein the three heat absorptive elements are arranged equidistant around the titanium dioxide and the graphite during the microwaving.

According to a further aspect, the hydrophobic admixture of the first aspect or any other aspect, wherein the blending reduces a grain size of the titanium dioxide.

According to a further aspect, the hydrophobic admixture of the first aspect or any other aspect, wherein the blending reduces the grain size of the titanium dioxide by about 18%.

According to a further aspect, the hydrophobic admixture of the first aspect or any other aspect, wherein the microwaving increases a crystal size of the graphite.

According to a further aspect, the hydrophobic admixture of the first aspect or any other aspect, wherein the microwaving increases the crystal size of the graphite by about 12%.

According to a further aspect, the hydrophobic admixture of the first aspect or any other aspect, wherein the graphite comprises a pre-microwave crystal size of about 27.23 nm and a post-microwave crystal size of about 30.45 nm.

According to a further aspect, the hydrophobic admixture of the first aspect or any other aspect, wherein the blending decreases a grain size of the graphite.

According to a further aspect, the hydrophobic admixture of the first aspect or any other aspect, wherein the blending decreases the grain size of the graphite by about 42%.

According to a further aspect, the hydrophobic admixture of the first aspect or any other aspect, wherein the microwaving increases a crystal size of the titanium dioxide.

According to a further aspect, the hydrophobic admixture of the first aspect or any other aspect, wherein the microwaving increases the crystal size of the titanium dioxide by about 45%.

According to a further aspect, the hydrophobic admixture of the first aspect or any other aspect, wherein: A) the titanium dioxide, graphite, calcium carbonate, and magnesium carbonate were subjected to a second microwaving and blending process; and B) the second microwaving and blending process increases the crystal size of the titanium dioxide by about 5%.

According to a further aspect, the hydrophobic admixture of the first aspect or any other aspect, wherein the titanium dioxide comprises a pre-microwave crystal size of about 20.46 nm and a post-microwave crystal size of about 29.72 nm.

According to a further aspect, the hydrophobic admixture of the first aspect or any other aspect, wherein the graphite comprises a grain size of about 134 μm.

According to a further aspect, the hydrophobic admixture of the first aspect or any other aspect, wherein the titanium dioxide comprises a grain size of about 93 nm.

According to a further aspect, the hydrophobic admixture of the first aspect or any other aspect, wherein: A) the titanium dioxide comprises agglomerated nanocrystals; and B) at least a portion of the agglomerated nanocrystals are bonded to the graphite.

According to a further aspect, the hydrophobic admixture of the first aspect or any other aspect, wherein the hydrophobic admixture comprises: A) the titanium dioxide at 10 wt % of the hydrophobic admixture; B) the graphite at a weight percentage of about 30 wt % of the hydrophobic admixture; C) the calcium carbonate at a weight percentage of about 30 wt % of the hydrophobic admixture; D) the calcium stearate at a weight percentage of about 20 wt % of the hydrophobic admixture; E) the magnesium carbonate at a weight percentage of about 5 wt % of the hydrophobic admixture; and F) the water at a weight percentage of about 5 wt % of the hydrophobic admixture According to a second aspect, a hydrophobic admixture, comprising: A) titanium dioxide; B) graphite; C) a calcium salt; D) calcium stearate; E) magnesium carbonate; and F) water, wherein a ratio of the titanium oxide to the graphite is between about 1:2 and 1:10.

According to a further aspect, the hydrophobic admixture of the second aspect or any other aspect, wherein the ratio of titanium dioxide to graphite is about 1:3.

According to a further aspect, the hydrophobic admixture of the second aspect or any other aspect, wherein a ratio of the titanium dioxide to calcium salt is between about 1:3 and 1:1000.

According to a further aspect, the hydrophobic admixture of the second aspect or any other aspect, wherein the ratio of the titanium dioxide to calcium stearate is between about 1:2 and 1:300.

According to a further aspect, the hydrophobic admixture of the second aspect or any other aspect, wherein the calcium salt is selected from the group comprising or consisting of: calcium carbonate, calcium phosphate, and calcium oxalate.

According to a further aspect, the hydrophobic admixture of the second aspect or any other aspect, wherein the calcium salt is calcium carbonate.

According to a further aspect, the hydrophobic admixture of the second aspect or any other aspect, wherein a ratio of the titanium oxide to magnesium carbonate is between about 1:1 and 10:1.

According to a further aspect, the hydrophobic admixture of the second aspect or any other aspect, wherein the ratio titanium dioxide to magnesium carbonate is about 2:1.

According to a third aspect, a concrete mixture, comprising: A) concrete; and B) a hydrophobic additive, comprising: 1) titanium dioxide; 2) graphite; 3) calcium carbonate; 4) calcium stearate; 5) magnesium carbonate; and C) water, wherein a ratio of the titanium oxide to the graphite is between about 1:2 and 1:10.

According to a fourth aspect, a drywall mixture, comprising: A) drywall material selected from the group comprising or consisting of: calcium sulfate dihydrate, mica, and clay; and B) a hydrophobic additive, comprising: 1) titanium dioxide; 2) graphite; 3) calcium carbonate; 4) calcium stearate; 5) magnesium carbonate; and C) water, wherein a ratio of the titanium oxide to the graphite is between about 1:2 and 1:10.

According to a fifth aspect, a pre-cursor mixture for making bricks, comprising: A) a brick precursor selected from the group comprising or consisting of: silica, alumina, and lime; and B) a hydrophobic additive, comprising: 1) titanium dioxide; 2) graphite; 3) calcium carbonate; 4) calcium stearate; and 5) magnesium carbonate; and C) water, wherein a ratio of the titanium oxide to the graphite is between about 1:2 and 1:10.

According to a sixth aspect, a concrete mixture, comprising: A) at least one cement ingredient selected from the group comprising or consisting of: sand, coarse aggregate, and cement; B) a hydrophobic additive, comprising: 1) titanium dioxide; 2) graphite; 3) calcium carbonate; 4) calcium stearate; and 5) magnesium carbonate; and C) water, wherein a ratio of the titanium oxide to the graphite is between about 1:2 and 1:10.

According to a seventh aspect, a mortar building material, comprising: A) sand; B) cement; C) a first water portion; and D) a hydrophobic admixture, comprising: 1) titanium dioxide; 2) graphite; 3) calcium carbonate; 4) calcium stearate; 5) magnesium carbonate; and 6) a second water portion, wherein a ratio of the titanium oxide to the graphite is between about 1:2 and 1:10.

According to an eighth aspect, a process for forming a hydrophobic admixture, comprising: A) forming a first mixture comprising titanium dioxide and graphite; B) blending the first mixture to form a first blend; C) heating the first blend; D) forming a second mixture comprising the first blend, calcium carbonate, and magnesium carbonate; E) blending the second mixture to form a second blend; F) heating the second blend; and G) mixing the second blend and calcium stearate to form the hydrophobic admixture.

According to a further aspect, the process of the eighth aspect or any other aspect, wherein the heating the first blend comprises heating the first blend to a surface temperature of about 140 degrees Celsius.

According to a further aspect, the process of the eighth aspect or any other aspect, wherein heating the second blend comprises heating the second blend to a surface temperature of about 175 degrees Celsius.

According to a further aspect, the process of the eighth aspect or any other aspect, wherein heating the second blend comprises heating the second blend to an internal temperature of about 180 degrees Celsius.

According to a further aspect, the process of the eighth aspect or any other aspect, wherein heating the first blend comprises microwaving the first blend via a 1250 W microwave source.

According to a further aspect, the process of the eighth aspect or any other aspect, further comprising wetting the first blend prior to heating the first blend.

According to a further aspect, the process of the eighth aspect or any other aspect, wherein heating the first blend comprises: A) heating the first blend for about 10 minutes; B) cooling the first blend at ambient temperature for a cooling period of about 1 minute; C) mixing the first blend during the cooling period; and D) following the cooling period, heating the first blend for about 8 minutes.

According to a further aspect, the process of the eighth aspect or any other aspect, further comprising arranging three magnetic elements equidistant around the first blend prior to heating the first blend and prior to heating the second blend.

According to a further aspect, the process of the eighth aspect or any other aspect, wherein the three magnetic elements are arranged in a triangle.

According to a further aspect, the process of the eighth aspect or any other aspect, wherein heating the second blend comprises: A) heating the second blend for a first period about 10 minutes; B) cooling the second blend at ambient temperature for a cooling period of about 1 minute; C) mixing the first blend during the cooling period, wherein the mixing comprises adding calcium stearate to the second blend; and D) following the cooling period, heating the second blend for a second period of about 10 minutes.

According to a further aspect, the process of the eighth aspect or any other aspect, wherein the second blend and the calcium stearate are mixed within about 1 minute of the second period.

According to a further aspect, the process of the eighth aspect or any other aspect, wherein the first mixture is blended for about 1 minute and the first blend, calcium carbonate, and magnesium carbonate are blended for about 1 minute.

According to a ninth aspect, a process for forming a hydrophobic admixture, comprising: A) forming a first mixture comprising titanium dioxide and a carbon allotrope; B) blending the first mixture to form a first blend; C) heating the first blend; D) forming a second mixture comprising the first blend, a calcium salt, and magnesium carbonate; E) blending the second mixture to form a second blend; F) heating the second blend; and G) mixing the second blend and calcium stearate to form the hydrophobic admixture.

According to a further aspect, the process of the ninth aspect or any other aspect, wherein the calcium salt is selected from the group comprising or consisting of: calcium carbonate, calcium phosphate, calcium sulfate, calcium-magnesium carbonate, and calcium oxalate.

According to a further aspect, the process of the ninth aspect or any other aspect, wherein the calcium salt is calcium carbonate.

According to a further aspect, the process of the ninth aspect or any other aspect, wherein the carbon allotrope is selected from the group comprising or consisting of: graphite, graphenylene, AA'-graphite, and amorphous carbon.

According to a further aspect, the process of the ninth aspect or any other aspect, wherein the carbon allotrope is graphite.

According to a tenth aspect, a process for forming a hydrophobic admixture, comprising: A) forming a first mixture comprising titanium dioxide and a carbon allotrope; B) blending the first mixture to form a first blend; C) heating the first blend; D) forming a second mixture comprising the first blend, calcium carbonate, and magnesium carbonate; E) blending the second mixture to form a second blend; F) heating the second blend; and G) forming the hydrophobic admixture by mixing the second blend and a hydrophobic salt selected from the group comprising or consisting of: calcium stearate, magnesium stearate, and zinc stearate.

According to an eleventh aspect, a stucco building material, comprising: A) aggregate; B) binder; C) a first water portion; and D) a hydrophobic admixture, comprising: 1) titanium dioxide; 2) graphite; 3) calcium carbonate; 4) calcium stearate; 5) magnesium carbonate; and 6) a second water portion, wherein a ratio of the titanium oxide to the graphite is between about 1:2 and 1:10.

According to a twelfth aspect, a hydrophobic admixture, comprising: A) titanium dioxide at about 1-16.5 weight % (wt %) of the hydrophobic admixture; B) carbon allotrope at about 1-38.5 wt % of the hydrophobic admixture; C) calcium salt at about 25-82.5 wt % of the hydrophobic admixture; D) calcium stearate at about 15-27.5 wt % of the hydrophobic admixture; and E) magnesium carbonate at about 0-11 wt % of the hydrophobic admixture.

According to a further aspect, the hydrophobic admixture of the twelfth aspect or any other aspect, wherein the titanium dioxide is at about 1-15 wt % of the hydrophobic admixture; the carbon allotrope at about 1-35 wt % of the hydrophobic admixture; the calcium salt at about 25-75 wt % of the hydrophobic admixture; the calcium stearate at about 15-25 wt % of the hydrophobic admixture; and the magnesium carbonate at about 0-10 wt % of the hydrophobic admixture.

According to a further aspect, the hydrophobic admixture of the twelfth aspect or any other aspect, further comprising: A) the titanium dioxide at 10.5 wt % of the hydrophobic admixture; B) the carbon allotrope at about 31.6 wt % of the hydrophobic admixture; C) the calcium salt at about 31.6 wt % of the hydrophobic admixture; D) the calcium stearate at about 21.1 wt % of the hydrophobic admixture; and E) the magnesium carbonate at about 5.2 wt % of the hydrophobic admixture.

According to a further aspect, the hydrophobic admixture of the twelfth aspect or any other aspect, further comprising: A) the titanium dioxide at 10 wt % of the hydrophobic admixture; B) the carbon allotrope at a weight percentage of about 30 wt % of the hydrophobic admixture; C) the calcium salt at a weight percentage of about 30 wt % of the hydrophobic admixture; D) the calcium stearate at a weight percentage of about 20 wt % of the hydrophobic admixture; E) the magnesium carbonate at a weight percentage of about 5 wt % of the hydrophobic admixture; and F) water at a weight percentage of about 5 wt % of the hydrophobic admixture.

According to a further aspect, the hydrophobic admixture of the twelfth aspect or any other aspect, further comprising water at about 1-10 wt % of the hydrophobic admixture.

According to a further aspect, the hydrophobic admixture of the twelfth aspect or any other aspect, wherein the calcium salt is selected from the group comprising or consisting of: calcium carbonate, calcium phosphate, calcium sulfate, calcium-magnesium carbonate, and calcium oxalate.

According to a further aspect, the hydrophobic admixture of the twelfth aspect or any other aspect, wherein the calcium salt is calcium carbonate.

According to a further aspect, the hydrophobic admixture of the twelfth aspect or any other aspect, wherein the carbon allotrope is selected from the group comprising or consisting of: graphite, graphenylene, AN-graphite, and amorphous carbon.

According to a further aspect, the hydrophobic admixture of the twelfth aspect or any other aspect, wherein the carbon allotrope is graphite.

According to a thirteenth aspect, a method, comprising: A) forming a first mixture comprising titanium dioxide and graphite; B) blending the first mixture to form a first blend; C) heating the first blend; D) forming a second mixture comprising the first blend, calcium carbonate, and magnesium carbonate; E) blending the second mixture to form a second blend; F) heating the second blend; and G) mixing the second blend and calcium stearate to form a hydrophobic admixture.

According to a further aspect, the method of the thirteenth aspect or any other aspect, further comprising mixing an aggregate, a binder, a water portion, and the hydrophobic admixture.

According to a further aspect, the method of the thirteenth aspect or any other aspect, wherein the blending the first mixture comprises reducing a grain size of the titanium dioxide by about 18%.

According to a further aspect, the method of the thirteenth aspect or any other aspect, wherein heating the second mixture comprises: A) heating the first mixture for a first period of time; B) cooling the first blend for a second period of time; and C) mixing the first blend during the second period of time.

According to a further aspect, the method of the thirteenth aspect or any other aspect, further comprising microwaving the first blend to heat first blend.

According to a further aspect, the method of the thirteenth aspect or any other aspect, further comprising absorbing heat from the first blend via at least heat absorptive element.

According to a fourteenth aspect, a hydrophobic building material, comprising: A) a binder; B) an aggregate; C) a water portion; and D) a hydrophobic admixture, comprising: 1) titanium dioxide at about 1-16.5 wt % of the hydrophobic admixture; 2) graphite at about 1-38.5 wt % of the hydrophobic admixture; 3) calcium carbonate at about 25-82.5 wt % of the hydrophobic admixture; 4) calcium stearate at about 15-27.5 wt % of the hydrophobic admixture; and 5) magnesium carbonate at about 0-11 wt % of the hydrophobic admixture.

According to a further aspect, the hydrophobic building material of the fourteenth aspect or any other aspect, wherein the graphite comprises a grain size of about 134 μm and the titanium dioxide comprises a grain size of about 93 nm.

According to a further aspect, the hydrophobic building material of the fourteenth aspect or any other aspect, wherein the binder comprises cement.

According to a further aspect, the hydrophobic building material of the fourteenth aspect or any other aspect, wherein the aggregate comprises at least one of: sand and stone.

According to a further aspect, the hydrophobic building material of the fourteenth aspect or any other aspect, wherein the hydrophobic building material comprises at least one: of concrete, mortar, stucco, and drywall.

These and other aspects, features, and benefits of the claimed embodiment(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
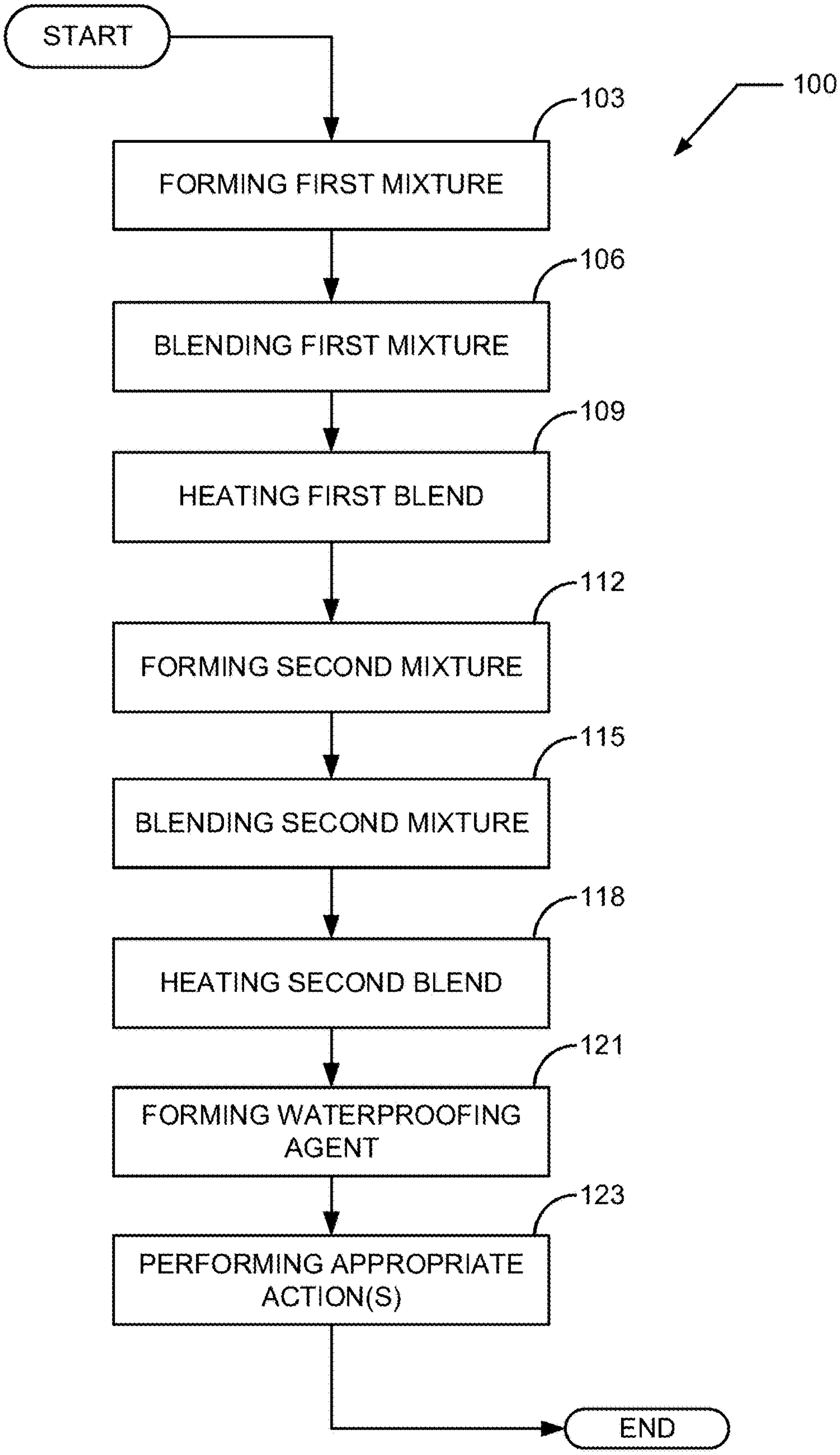
FIG. 1A shows an exemplary hydrophobic admixture manufacturing process according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

When used herein in reference to a percentile, the terms "about" or "approximately" may refer to the quantity stated +/−2 units. For example, "about 15%" refers to a range of 13-17%. As used herein, "concrete" refers to a mixture of cement, one or more aggregates, an aqueous portion, and potentially other materials or additives. As used herein, "grain size" can include an average size of all grains of a sample or a maximum size of grains of the sample. As used herein, "crystal size" can include an average size of all crystals of a sample or a maximum size of grains of the sample.

Figure 1B:
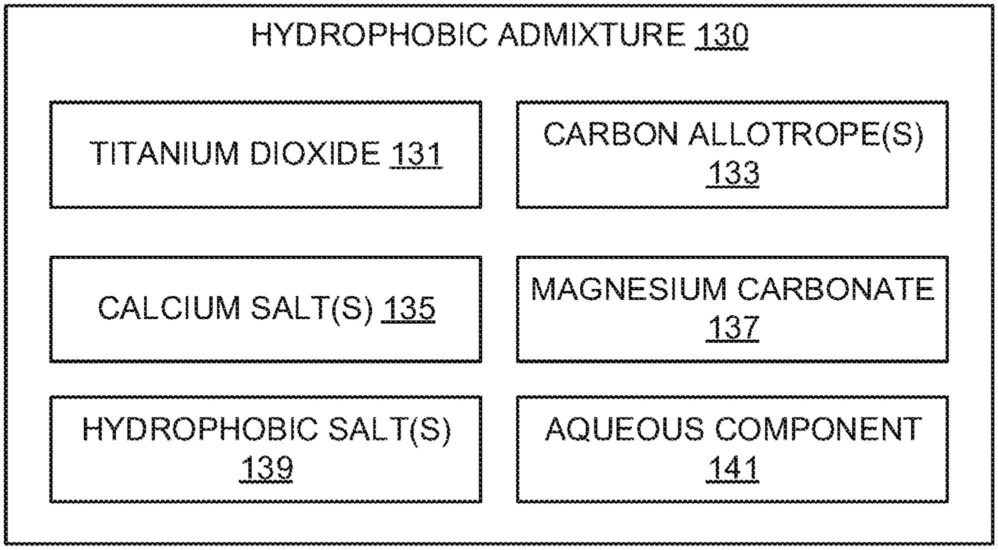
FIG. 1B shows an exemplary hydrophobic admixture, according to one embodiment of the present disclosure.

As used herein, the term "hydrophobic admixture" may include any hydrophobic admixture for-mulation shown or described herein, such as an output of an embodiment of the process 100 (FIG. 1A) or the hydrophobic admixture 130 (FIG. 1B).

Overview

Aspects of the present disclosure generally relate to hydrophobic admixtures and processes for making and using the same.

Moisture migration into concrete can be a leading cause of concrete degradation worldwide. There are two main water transport mechanisms in concrete: capillary absorption and permeability. Capillary absorption is the main transport mechanism for water in concrete structures. The capillary network is created by the excess water used during concrete mixing. As this water leaves the concrete, it leaves behind a porous network. Water absorption through the capillary network requires no pressure to function. The speed of capillary absorption is about a million times faster than pressure permeability, in the order of 10-6 m/s (1 μm/s). Not only does water enter the concrete but chloride infiltration also occurs. This can reach the steel reinforcement and cause corrosion. The other water transport mechanism in concrete, permeability, is generally less threatening. Permeability of water occurs when there is a pressure gradient, such as hydrostatic pressure due to water. To reduce permeability, engineers generally increase the density of the concrete by adding more cement to the mixture. Usually, water will only be able to penetrate up to a certain depth due to the hydrostatic pressure, which is neutralized by the density of the concrete. However, once inside, water continues to be absorbed through the capillary network as explained before.

A common method of improving the waterproofing capabilities of concrete is the use of admixtures. These can be mixed in the fresh concrete before pouring and provide water resistance throughout the material and at the surface. Waterproofing admixtures have been developed and commercialized over the last 60 years or so, by companies such as Hycrete, Inc., Xypex Chemical Company, Cement Aid Inc., and Sika AG. Most waterproofing admixtures are generally characterized by two methods in water penetration reduction: crystallization activity; or hydrophobic and pore-blocking effects (HPI). Crystallization activity occurs when the chemicals in the hydrophobic admixture react with the moisture in the fresh concrete and with the by-products of cement hydration to generate an insoluble crystalline formation in the pores and capillaries. Meanwhile, the hydrophobicity of HPI admixtures changes the surface tension of the cement hydrates and capillary surfaces, making them water repellent. While under hydrostatic pressure, the pore-blocking components plug the capillaries physically. HPI admixtures significantly enhance the concrete durability with respect to chloride-induced corrosion, when compared to crystalline admixtures.

In one or more embodiments, the present hydrophobic admixtures are composed of inert minerals and nanoparticles formed into a redispersible powder. In various embodiments, the present hydrophobic admixtures improve waterproofing of concrete and mortar materials, or other building materials, (e.g., via introduction of the hydrophobic admixture to the concrete or mortar). In various embodiments, mineral ingredients of the hydrophobic admixture are modified via one or more ultra-high temperature (UHT) processes. The modified and active minerals may react with the humidity of the fresh concrete or mortar, and with the substances of cement hydration, to form an insoluble hydrophobic structure in the pores and capillaries of the concrete or mortar. In this way, the concrete or mortar becomes permanently protected against water penetration or other liquids in any direction. Further, the concrete or mortar is protected from deterioration due to aggressive agents of the atmosphere, such as chlorine. The present hydrophobic admixtures are compatible with building project temperature conditions and other criteria, such as hardening times and overall resistance and/or endurance limit of building materials modified via the hydrophobic admixture.

In one or more embodiments, the hydrophobic admixtures described herein (e.g., or building materials produced therefrom) may be especially well-suited for use in construction of reservoirs, water and wastewater treatment plants, secondary containment structures, tunnels, slabs, subsoil slabs, foundations, underground parking lots, and swimming pools. In various embodiments, when integrated into a structure, the present hydrophobic admixture is capable of withstanding extreme hydrostatic pressures on both the positive and negative sides of the structure. According to one embodiment, the hydrophobic admixture becomes an integral part of the building material(s), resulting in a strong and durable structure. The present hydrophobic admixtures are highly resistant to aggressive chemicals, such as chlorine-based agents. In at least one embodiment, within concrete or mortar, the hydrophobic admixture can seal cracks as small as 200 microns while allowing the building material to expel excess moisture via evaporation during curing.

In various embodiments, the hydrophobic admixture is non-toxic and contains no volatile organic compounds, thereby ensuring safety of use in confined spaces indoors and outdoors. The present hydrophobic admixtures cause permanent changes to hydrophobicity and capillary absorption upon mixing with a building material and, therefore, are to weather-based production restrictions (e.g., potentially increasing the flexibility of and/or truncating construction schedules). As shown in Table 2 and described herein, the present hydrophobic admixtures may improve the durability of concrete and/or mortar. As shown in Tables 3-5 and described herein, the present hydrophobic admixtures may acts a permeability-reducing additive for hydrostatic conditions.

In at least one embodiment, concrete fabricated with the present hydrophobic admixture complies with performance standards including, but not limited to, Norma Brasileira Regulamentadora (NBR) 10787 of September 2011 (Hardened concrete—Determination of water penetration under pressure (Report No. 5157)), NBR 9204 of December 2012 (Hardened concrete—Determination of electrical-volumetric resistivity (Report No. 136 922)), NBR 9778 of October 2005 (Mortar and hardened concrete—Determination of water absorption, void ratio and specific mass (General Register No. 5167/43517)), NBR 9779 of December 2012 (Hardened mortar and concrete—Determination of water absorption by capillarity (General registration No. 51167/43517)), NBR 5739 of May 2018 (Concrete compression test of cylindrical specimens (Report No. AGR/5169)), American Society for Testing and Materials (ASTM) C642/97 (Density, absorption and voids in hardened concrete (Report No. 21052 TEC)), and ASTM C494/19 (Standard specification for chemical admixtures for concrete (TEC Report No. 21052)).

In various embodiments, a hydrophobic admixture includes, but is not limited to, titanium dioxide, graphite, calcium carbonate, calcium stearate, magnesium carbonate, and water. In one example, a 1 kg sample of the hydrophobic admixture is formed from 100 grams (g) of titanium dioxide, 300 g of graphite, 300 g of calcium carbonate, 200 g of calcium stearate, 50 g of magnesium carbonate, and 50 mL of water. In some embodiments, the water portion is omitted and requisite masses of other ingredients in the hydrophobic admixture may be increased while maintaining their original ratios.

Titanium dioxide is intrinsically hydrophilic. The hydrophobicity of titanium dioxide has been reported to increase with increase in surface roughness due to the intrusion of air between water droplets and the surfaces of the titanium dioxide nanoparticles. Titanium dioxide occurs in nature in the mineral forms known as rutile and anatase. Graphite can be intrinsically hydrophobic and can be the most stable naturally occurring carbon allotrope under standard conditions. Calcium carbonate can be insoluble in water (e.g., solubility in water approximately 0.013 g/L at 25 degrees Celsius). Calcium carbonate occurs in nature in the crystalline mineral forms calcite (hexagonal) and aragonite (orthorhombic). Calcium stearate can be insoluble in water (e.g., solubility in water approximately 0.04 g/L at 15 degrees Celsius). Magnesium carbonate can be an inorganic, anhydrous salt. Magnesium carbonate can be insoluble in water, acetone, and ammonia (e.g., solubility in water approximately 0.139 g/L at 25 degrees Celsius). Magnesium carbonate can be found in a trigonal (rhombohedral) crystalline form and can be used as chalk in gymnastics, rock climbing, weightlifting, etc.

Titanium dioxide can be intrinsically hydrophilic (e.g., the compound attracts and bonds with water molecules), as observed during the water solubility tests during which titanium dioxide easily dissolved and mixed in water. However, titanium dioxide can demonstrate a phenomenon of reversible switching of surface wettability between superhydrophobic (water contact angle >150°) and superhydrophilic (water contact angle <10°) and, thus, the water-bonding properties of titanium dioxide can be modified. The water-repelling properties of titanium dioxide may increase with increasing surface roughness due to the intrusion of air between water droplets and the titanium dioxide surface. For example, a composite material formed from titanium dioxide deposited on candle soot (e.g., a carbon allotrope) shows superhydrophobic behavior with a water contact angle of 160°. The Cassie-Baxter model states that rough surfaces with hierarchical structures can trap air between water and the solid surface, thereby providing a potential explanation for the hydrophobic behavior of the titanium dioxide and carbon powder blend. For example, the trapped air in the compound prevents water from binding to the surface molecules or intrude into the interfaces between the microstructures.

Fresh graphene and graphite can be mildly hydrophilic (e.g., water contact angle of approximately 70°); however, upon exposure to ambient air the substances can become mildly hydrophobic (e.g., contact angle of approximately 90-100°) due to surface adsorption of airborne hydrocarbon. For example, a portion of raw graphite powder may partially dissolve in water, leaving a portion of the powder in undissolved agglomerates. It may be expected that the simple dry mixing of titanium dioxide and graphite would show mildly hydrophilic behavior, due to the properties of each individual component. However, the simple dry mixture of titanium dioxide and graphite was easily mixed and mostly dissolvable in water, as verified in solubility experiments. Therefore, hydrophobic behavior of a titanium dioxide/graphite composite may be considered counter-intuitive, unless there are physical changes occurring that would also cause a change in the wettability properties.

The hydrophobic admixture fabrication process 100 shown in FIG. 1A and described herein causes physical changes to one or more of the raw materials (e.g., titanium dioxide, carbon, and/or salts). For example, blending of titanium dioxide and graphite powders causes the grain or particle size of both graphite and titanium dioxide to decrease (e.g., though the change to the graphite grain size may be more significant). Additionally, blending of the titanium dioxide and graphite powders can improve the distribution of the titanium dioxide on the graphite surface. X-ray diffraction (XRD) analysis can show that exposure to microwave heating increased the crystal size of the titanium dioxide (rutile phase). XRD analysis can show that interlayer spacing of the graphite does not significantly change throughout admixture fabrication process. Fourier-transform infrared spectroscopy (FTIR) analysis can show that, during the hydrophobic admixture fabrication process, titanium dioxide nanoparticles can create bond with carbon atoms on the graphite surface. The bonding of titanium dioxide to carbon structures may allow selective growth of the titanium dioxide on carbon due to heating. The titanium dioxide growth may be attributed to the microwave absorption capacity of carbon, which favors bonding of titanium dioxide to its surface.

Titanium dioxide-bonded carbon structures have been investigated for use as photocatalytic additives; however, their application in forming hydrophobic additives was largely unstudied until the discovery of their efficacy by the present inventors. Previous works used graphite oxide as a precursor placed in a solvent during attempted microwave-assisted synthesis of a material with photocatalytic properties. The previous approach differs from the one used in exemplary reactions of the present disclosure. For example, the reactions performed in previous studies exfoliate the graphite oxide and form graphene layers, which are covered by titanium dioxide nanoparticles. These reactions occur in a liquid suspension, afterwhich the solvent is evaporated to obtain a dry compound. In contrast, the reactions of the present disclosure used pristine dry graphite powder (e.g., instead of graphite oxide) as a precursor to react with titanium dioxide. For example, an embodiment of the present process for forming a hydrophobic additive uses only dry ingredients as precursors (e.g., other than a slight damping of powdered ingredients, such as wetting a titanium dioxide/graphite powder blend prior to microwave heating). The exemplary reaction does not create graphene sheets as in previous works and, instead, maintains the molecular structure of graphite as it bonds with titanium dioxide nanoparticles. Based on experiments described herein, microwaving and blending processes applied to titanium dioxide, graphite, and water mixtures (e.g., wetted powder blends) can result in reduction of solubility and increase of hydrophobicity.

Following microwaving and blending, the titanium dioxide and graphite mixture can be mixed and blended with calcium carbonate and magnesium carbonate, thereby resulting in further changes to various properties. XRD analysis can show that the calcium carbonate used is in the calcite phase, which can be considered insoluble in water, and was determined to be as such during solubility experiments. XRD analysis shows that the magnesium carbonate used is in the dolomite phase, which contains calcium and magnesium together ($CaMg(CO_3)_2$). Dolomite was present in the sample mixture that exists before the blending and microwave heating takes place. The presence of dolomite in the sample mixture rules out that dolomite could have been created due to the interaction of calcium and magnesium carbonates caused by the microwave heating. Magnesium carbonate can be considered to be 10 times more soluble in water than calcium carbonate. Solubility experiments demonstrated that magnesium carbonate was easily mixed and dissolved in water.

The blending and microwaving of the titanium dioxide, graphite, calcium carbonate, and magnesium carbonate mixture induces additional physical changes to the various components. For example, scanning electron microscopy (SEM) images of a mixture sample showed that the surface of the powder exhibited a fuzzier appearance as compared to the mixture pre-blending and microwaving. The fuzzier appearance may be due to an interaction between calcium carbonate, magnesium carbonate, and titanium dioxide. XRD analysis shows that the second heating process applied to titanium dioxide induced an additional 5% growth in titanium dioxide crystal size and did not significantly affect graphite crystal size (e.g., less than 5% change) or interlayer spacing. The small magnitudes of change observed indicate that the physical modifications to titanium dioxide and graphite may occur mostly during the first blending and microwaving of the materials (e.g., prior to the addition of calcium carbonate and magnesium carbonate, or other similar ingredients). According to various embodiments, following blending and microwaving, the interplanar spacing of calcium carbonate was unchanged, the interplanar spacing of magnesium carbonate was unchanged, the crystal size of the calcium carbonate was unchanged, and the crystal size of magnesium carbonate changed by less than 5%. FTIR analysis shows some bonding between calcium carbonate and magnesium carbonate can occur during microwaving. Additionally, bonding between titanium dioxide and graphite can continue to occur in the second iteration of microwaving. Overall, the induced physical changes provide the material with improved hydrophobic properties.

Exemplary Embodiments

Referring now to the figures, for the purposes of example and explanation of the fundamental processes and components of the disclosed systems and processes, reference is made to FIG. 1, which illustrates an exemplary hydrophobic admixture fabrication process 100 according to one embodiment of the present disclosure. As will be understood by one having ordinary skill in the art, the steps and processes shown in FIG. 1A (and those of all other flowcharts and sequence diagrams shown and described herein) may operate concurrently and continuously, are generally asynchronous and independent, and are not necessarily performed in the order shown.

FIG. 1A shows an exemplary process 100 for manufacturing a hydrophobic admixture according to one embodiment of the present disclosure. In various embodiments, the process 100 may be performed under normal atmospheric conditions, inert atmospheric conditions (e.g., a mixture of nitrogen and/or argon gases), anaerobic conditions, or vacuum (e.g., no atmosphere) conditions.

At step 103, the process 100 includes forming a first mixture. Forming the first mixture can include combining quantities of titanium dioxide powder and an allotrope of carbon, such as, for example, graphite, graphene, graphenylene, carbon nanotubes, AA'-graphite, and amorphous carbon. In some embodiments, carbon allotropes having crystalline structure are preferably used because the repeated arrangement of carbon provides bonding sites for titanium dioxide molecules and promotes heat conduction, which may improve the reaction of titanium dioxide and carbon. In various embodiments, forming the first mixture includes combining titanium dioxide powder and graphite powder. The ratio of titanium dioxide powder and carbon allotrope can be at least about 1:1, or between about 1:1 and 1:10, about 1:2, about 1:3, about 1:4, about 1:5, about 1:6, about 1:7, about 1:8, about 1:9, or about 1:10, or less than about 1:10. In one example, 100 g of titanium dioxide powder is mixed with 300 g of graphite powder. In a similar example, the 400 g first powder mixture may be further processed as described herein to generate a final hydrophobic admixture of about 1 kg (e.g., which may be introduced to a building material, such as 50 kg of cement). According to one embodiment, a sufficient amount of titanium dioxide powder is added such that, during subsequent heating steps, the surface of the graphite powder is near or completely covered by bonded titanium dioxide.

At step 106, the process 100 includes blending the first mixture to form a first blend. In various embodiments, blending the first mixture distributes the titanium dioxide powder across surfaces of the graphite powder. Blending of the first mixture can be performed in a commercial blender or mixer for a predetermined time period of about 1 minute, about 2 minutes, or another sufficient interval for blending the first mixture. In some embodiments, blending the first mixture includes confirming that a grain size of the graphite has been decreased as compared to a pre-blending grain size. In one example, blending the first mixture decreases the grain size of the graphite by about 42%. In another example, prior to blending, the graphite demonstrates a pre-blend maximum grain size of about 228 μm and a post-blend maximum grain size of about 134 μm. In at least one embodiment, blending the first mixture includes confirming that a grain size of the titanium dioxide has been decreased as compared to a pre-blending grain size. In one example, blending the first mixture decreases the grain size of the titanium dioxide by about 18%. In another example, the titanium dioxide demonstrates a pre-blend minimum grain size of about 113 nm and a post-blend minimum grain size of about 93 nm. The titanium dioxide can include agglomerated titanium dioxide nanoparticles.

At step 109, the process 100 includes heating the first blend. The first blend can be heated to a surface temperature of at least about 100 degrees Celsius, about 120-400 degrees Celsius, or less than about 400 degrees Celsius. In one example, the first blend is heated to a surface temperature of 140 degrees Celsius. The heat can be applied via any suitable method, such as, for example, convection oven, microwaving (e.g., or other radiation-based heating technique), or induction. In some embodiments, microwaving may be utilized to ensure consistent heating throughout the first blend. Heating the first blend can include placing the first blend into a microwave and microwaving the first blend for a predetermined time period. The first blend can be placed onto a ceramic plate during microwaving. The microwave source can demonstrate a power of at least about 600 W, or about 600-1500 W, 600-700 W, 700-800 W, 800-900 W, 900-1000 W, 1000-1100 W, 1100-1200 W, 1250 W, 1200-1300 W, 1300-1400 W, 1400-1500 W, less than about 1500 W, or any power sufficient for inducing titanium dioxide bonding (e.g., without burning the materials). In at least one embodiment, the microwave source demonstrates a wavelength of about 12.24 cm and a frequency of about 2450 MHz. In some embodiments, the microwave source is oriented over or beneath the first blend (e.g., emitting microwave radiation downward into the first blend) to ensure consistent and even heating. Multiple microwave sources can be used to further promote consistent and even heating. In various embodiments, a continuous microwaving system is utilized. The continuous microwaving system can include, for example, a series of microwave-emitting elements (e.g., and/or a large industrial microwave) and a belt-fed mechanism for transporting powder blends past each element. In at last one embodiment, a combination of radiation- and convection-based heating sources are used.

The predetermined time period can be at least about 1 minute, about 1-30 minutes, 1-5 minutes, 5-10 minutes, 10-15 minutes, 15-20 minutes, 18 minutes, 20-25 minutes, 25-30 minutes, or less than about 30 minutes. The predetermined time period can include an intermediate cooling period of less than about 5 minutes, between about 30 seconds to 5 minutes, about 30 seconds to 1 minute, about 1 minute, about 1-2 minutes, about 2-3 minutes, about 3-4 minutes, or less than about 5 minutes. In one example, microwaving is performed for about 10 minutes followed by a 1-minute cooling period during which the first blend is thoroughly mixed, and followed by a second round of microwaving for about 8 minutes. The cooling period can occur at ambient temperature (e.g., about 25 degrees Celsius).

The heating may be performed in the presence of one or more heat absorptive elements, such as, for example, a magnetic element, foams or other plastics, insulative fabrics, or ceramic elements. One or more heat absorptive elements (e.g., 3, 4, 5, or any suitable number) can be arranged equidistant around the first blend during microwaving. In one example, three magnets are arranged equidistant around the first blend in a triangular shape. In another example, four magnets are arranged equidistant around the first blend in a square shape. In another example, ten magnets are arranged equidistant around the first blend in a circular shape. In some embodiments, no heat absorptive elements are used at step 109. In some embodiments, heat absorptive elements are omitted.

In at least one embodiment, heating the first blend includes confirming that a crystal size of the titanium dioxide and a crystal size of the graphite have increased as compared to pre-heating sizes (e.g., indicating that the crystals of the respective ingredients grew in response to heating). In one example, heating the first blend increases the graphite crystal size by about 12%. In another example, the graphite demonstrates a pre-heating crystal size of about 27.23 nm and a post-heating crystal size of about 30.45 nm. In another example, heating the first blend increases the titanium dioxide crystal size about 45%. In another example, the titanium dioxide demonstrates a pre-heating crystal size of about 20.46 nm and a post-heating crystal size of about 29.72 nm. According to one embodiment, heating the first blend bonds the titanium nanocrystals to the carbon allotrope crystals. For example, the heating causes titanium nanocrystals to bond to surfaces of graphite crystals. In various embodiments, the titanium nanocrystals bond into and/or along surfaces of the carbon, thereby generating a hierarchical structure of mixed particle sizes that produce hydrophobic effects. In one or more embodiments, the carbon particles form a sheet-like structure and the titanium dioxide nanocrystals bond to the sheet-like structure, generating air pockets therein. In various embodiments, the air pockets prevent intrusion of water into the carbon-titanium dioxide hierarchical structure. In one or more embodiments, the titanium dioxide may also oppose intrusion of salts into the carbon-titanium dioxide hierarchical structure.

In at least one embodiment, prior to heating, the first blend is wetted with a quantity of water solution at a titanium dioxide:water ratio of at least about 1:1, or between about 1:1 and 10:1, or about 2:1, 3:1, 4:1, 5:1, 6:1, 7:1, 8:1, 9:1, or less than about 10:1. In one example, a 400 g sample of the first blend is wetted with 50 ml (e.g., 50 g) of water. In some embodiments, the wetting of the blend is not performed. For example, when convection-based heating is used in place of microwaving, the wetting step may be omitted.

At step 112, the process 100 includes forming, from the first blend and one or more ingredients, a second mixture. Forming the second mixture can include combining the first blend, a calcium salt, and magnesium carbonate. The calcium salt can include, but is not limited to, calcium carbonate, calcium phosphate, and calcium oxalate. According to one embodiment, the calcium salt is provided as a very fine powder that helps densify building materials to which the hydrophobic admixture is added. The densification can reduce porosity and, thereby, improve the building material's ability to repel water intrusion. The ratio of titanium dioxide and calcium salt can be at least about 1:1, or between about 1:1 and 1:1000, between about 1:3 and 1:10, about 1:3, between about 1:100 and 1:1000, about 1:1000, or less than about 1:1000. In one example, 300 g of calcium carbonate is combined with 400 g of the first blend (e.g., including 100 g of titanium dioxide). The ratio of titanium dioxide and magnesium carbonate can be at least about 1:1, or between about 1:1 and 10:1, or about 2:1, 3:1, 4:1, 5:1, 6:1, 7:1, 8:1, 9:1, or less than about 10:1. In one example, 50 g of magnesium carbonate is combined with 400 g of the first blend (e.g., including 100 g of titanium dioxide).

The magnesium carbonate may bond to other minerals in the hydrophobic admixture precursors or final mixture, thereby reducing degradation of the hydrophobic admixture over time. In some embodiments, an additional portion of calcium salt (for example, calcium carbonate) is used in place of magnesium carbonate. In one or more embodiments, magnesium carbonate is omitted from the hydrophobic admixture. In at least one embodiment, step 112 occurs within 1 minute of step 109 (e.g., during cooling of the first blend) or prior to the first blend cooling to ambient temperature.

At step 115, the process 100 includes blending the second mixture to form a second blend. Blending of the first blend, the calcium salt, and the magnesium carbonate can be performed in a commercial blender for a predetermined time period of about 1 minute, about 2 minutes, or another sufficient interval.

At step 118, the process 100 includes heating the second blend. The second blend can be heated to a surface temperature of at least about 100 degrees Celsius, or about 100-400 degrees Celsius, or less than about 400 degrees Celsius. For example, the second blend can be heated to a surface temperature of about 175 degrees Celsius. The second blend can be heated to an internal temperature of at least about 100 degrees Celsius, or about 100-400 degrees Celsius, 400 degrees Celsius. For example, the second blend can be heated to an internal surface temperature of 180 degrees Celsius. The heat can be applied via any suitable method, such as, for example, convection oven, microwaving (e.g., or other radiation-based heating technique), or induction. In at least one embodiment, as compared to other heating modes, the microwave-based heating may generate more consistent heating throughout the blend and in a more targeted and controllable manner.

Heating the second blend can include placing the second blend into a microwave and microwaving the second blend for a predetermined time period. The second blend can be placed onto a ceramic plate during microwaving. The microwave source can demonstrate a power of at least about 600 Watts (W), or about 600-1500 W, 600-700 W, 700-800 W, 800-900 W, 900-1000 W, 1000-1100 W, 1100-1200 W, 1250 W, 1200-1300 W, 1300-1400 W, 1400-1500 W, or less than about 1500 W. The predetermined time period can be at least about 1 minute, about 1-30 minutes, 1-5 minutes, 5-10 minutes, 10-15 minutes, 15-20 minutes, 20 minutes, 20-25 minutes, 25-30 minutes, or less than about 30 minutes. The predetermined time period can include an intermediate cooling period of less than about 5 minutes, between about 30 seconds to 5 minutes, about 30 seconds to 1 minute, about 1 minute, about 1-2 minutes, about 2-3 minutes, about 3-4 minutes, or less than about 5 minutes. In one example, microwaving is performed for about 10 minutes followed by a 1-minute cooling period during which the second blend is thoroughly mixed, and followed by a second iteration of microwaving for about 10 minutes. The cooling period can occur at ambient temperature (e.g., about 25 degrees Celsius).

The heating may be performed in the presence of one or more heat absorptive elements, such as, for example, a magnetic element, foams or other plastics, insulative fabrics, or ceramic elements. One or more heat absorptive elements (e.g., 3, 4, 5, or any suitable number) can be arranged equidistant around the second blend during microwaving. In one example, three magnets are arranged equidistant around the second blend in a triangular shape. In another example, four magnets are arranged equidistant around the second blend in a square shape. In another example, ten magnets are arranged equidistant around the second blend in a circular shape. In some embodiments, no heat absorptive elements are used at step 118.

In at least one embodiment, heating the second blend includes confirming that a crystal size of the titanium dioxide increased as compared to a crystal size of the titanium dioxide in the second blend prior to microwaving sizes (e.g., indicating that the crystals of titanium dioxide grew in response to heating). In one example, heating the second blend increases the titanium dioxide crystal size by about 5%. According to one embodiment, heating the second blend does not cause a significant change in the crystal sizes of the carbon allotrope, calcium salt, or magnesium carbonate.

At step 121 the process 100 includes forming, from the second blend and one or more hydrophobic salts, a hydrophobic admixture. Forming the hydrophobic admixture may include combining the second blend and a quantity of a hydrophobic salt. The hydrophobic salt can include, but is not limited to, calcium stearate, magnesium stearate, or zinc stearate. In one example, a quantity of calcium stearate is mixed into the second blend. The ratio of titanium dioxide and the hydrophobic salt can be at least about 1:1, or between about 1:1 and 1:300, between about 1:2 and 1:10, about 1:2, between about 1:2 and 1:300, about 1:300, or less than about 1:300. In one example, 200 g of calcium stearate is added to 800 g of the second blend (e.g., including 100 g of titanium dioxide).

The hydrophobic admixture can include a composition described in Table 1 or any other composition shown or described herein. In one example, the hydrophobic admixture includes titanium dioxide at about 10 weight (wt.) % (e.g., wt. % of the hydrophobic admixture), graphite at about 30 wt. %, calcium carbonate at about 30 wt. %, magnesium carbonate at about 5 wt. %, calcium stearate at about 20 wt. %, and water at about 5 wt. %. In another example, the % wt. of titanium dioxide is 3.6%. In another example, the % wt. of titanium dioxide is 3.9%. In some embodiments, the final composition of the hydrophobic admixture excludes water. In at least one embodiment, step 121 includes removing moisture from the hydrophobic admixture, for example, by allowing the hydrophobic admixture to dry completely. In some embodiments, the hydrophobic admixture formulation excludes magnesium carbonate. In one or more embodiments, the hydrophobic admixture formulation excludes the calcium salt or at least a portion of the calcium carbonate is supplemented by additional magnesium carbonate.

The hydrophobic admixture formulation can be based on a particular building material (e.g., or class thereof) with which the hydrophobic admixture will be mixed. For example, cements produced in the United States of America are known to include higher levels of calcium as compared to cements produced in Brazil. In this example, for the American cement use case, the hydrophobic admixture formulation can include a lower % wt. of calcium carbonate (e.g., or no calcium carbonate) and a greater % wt. of a non-calcium salt, such as magnesium carbonate. In another example, for the American cement use case, the hydrophobic admixture formulation can include a non-calcium-based hydrophobic salt (for example, zinc stearate) in place of calcium stearate or another calcium-based hydrophobic salt.

At step 123, the process 100 includes performing one or more appropriate actions including, but not limited to, storing the hydrophobic admixture in a container, forming a hydrophobic building material by mixing the hydrophobic admixture with one or more building materials, or adding additional ingredients to the hydrophobic admixture. In one example, a predetermined quantity of the hydrophobic admixture is sealed into a container. Non-limiting examples of building materials include cement and other mortar mixtures, concrete mixtures, drywall mixtures, stucco mixtures, grout mixtures, pre-cursor mixtures for cement board, pre-cursors for cinder block making, pre-cursor mixtures for brick making, polystyrene, polyurethane, and latex. The building material may include one or more pre-cursor ingredients of a building material.

In one example, step 123 includes combining concrete mixer (e.g., cement, sand, gravel, water, etc.) and the hydrophobic admixture in a predetermined ratio to produce a hydrophobic concrete mixture. In this example, the predetermined ratio of cement:additive can be at least about 2:1, or between about 2:1 and 100:1, between about 10:1 and 50:1, about 10:1, about 20:1, about 50:1, less than about 50:1, or less than about 100:1. In another example, step 123 includes combining drywall material (e.g., calcium sulfate dihydrate, gypsum, mica, and/or clay) and the hydrophobic admixture in a predetermined ratio (e.g., a gypsum:additive ratio of about 3:1, 10:1, 20:1, 50:1, 100:1, or another suitable ratio) to produce a hydrophobic drywall mixture. In another example, step 123 includes combining brick pre-cursor mixer (e.g., silica, alumina, sand, lime, etc.) and the hydrophobic admixture in a predetermined ratio (e.g., an alumina: additive ratio of about 3:1, 10:1, 20:1, 50:1, 100:1, or another suitable ratio) to produce a hydrophobic mixture for manufacturing waterproof bricks. In another example, step 123 includes combining one or more cement ingredients (e.g., sand, coarse aggregate, cement, water, etc.) and the hydrophobic admixture in a predetermined ratio (e.g., 3:1, 10:1, 50:1, 100:1, or another suitable ratio) to produce a hydrophobic cement mixture. In at least one embodiment, one or more additional hydrophobic salts are added to the hydrophobic admixture. The additional hydrophobic salts can include, but are not limited to, calcium stearate, magnesium stearate, and zinc stearate.

FIG. 1B shows an exemplary hydrophobic admixture 130, which can be referred to as a hydrophobic admixture herein. The hydrophobic admixture 130 may be formed according to and as an output of the process 100 (FIG. 1). As shown in FIG. 1B, the hydrophobic admixture 130 can include one or more of, but is not limited to, titanium dioxide 131, one or more carbon allotropes 133, one or more calcium salts 135, magnesium carbonate 137, additional hydrophobic salt(s) 139, and an aqueous component 141 (e.g., water). In some embodiments, the aqueous component 141 is omitted. The carbon allotrope 133 can include one or more of, but is not limited to, graphite, graphene, graphenylene, carbon nanotubes, AA'-graphite, and amorphous carbon. The calcium salt 135 can include one or more of, but is not limited to, calcium carbonate, calcium phosphate, and calcium oxalate. The additional hydrophobic salt 139 may include one or more of, but is not limited to, calcium stearate, magnesium stearate, or zinc stearate.

The hydrophobic admixture 130 can include any suitable formulation shown or described herein, such as, for example, a formulation shown in Table 1. In some embodiments, the hydrophobic admixture 130 omits one or more components shown in FIG. 1B, such as, for example, the magnesium carbonate 137, additional hydrophobic salt(s) 139, or the aqueous component 141.

TABLE 1

Exemplary Hydrophobic Admixture Composition

| Ingredient | Wt. % of the Hydrophobic Admixture |
|---|---|
| Titanium dioxide | 1-16.5 |
| Carbon allotrope (ex., graphite) | 1-38.5 |
| Calcium Salt (ex., calcium carbonate) | 25-82.5 |
| Magnesium carbonate | 0-11 |
| Hydrophobic salt (ex., calcium stearate) | 15-27.5 |
| Water | 0-10 |

Exemplary Experimental Results

The following section describes one or more experimental tests, and results thereof, performed on one or more embodiments of systems and methods described herein. The descriptions therein are provided for the purposes of illustrating various elements of the systems and methods (e.g., as observed in the one or more embodiments). All descriptions, embodiments, and the like are exemplary in nature and place no limitations on any embodiment described or anticipated herein.

Samples of a hydrophobic admixture and various hydrophobic admixture precursors were analyzed to identify their molecular components and document the chemical and physical changes that occur during hydrophobic admixture fabrication (e.g., during various steps of the process 100). The hydrophobic admixture analyzed may correspond to the hydrophobic admixture 130 shown in FIG. 1B and described herein. The hydrophobic admixture was characterized using scanning electron microscope (SEM), energy-dispersive X-ray spectroscopy (EDS), X-ray diffraction (XRD), and Fourier-transformed infrared spectroscopy (FTIR). Additionally, admixture samples were taken at different phases of the preparation process to identify the chemical and physical changes occurring therein. The first sample (referred to herein as DP-01) corresponded to steps 103-106 of the process 100 and is described by FIGS. 2A, 3A, 4A, 5, 12, 16, and 18-19. The second sample (referred to herein as DP-02) corresponds to step 109 of the process 100 and is described by FIGS. 2B, 3B, 4B, 6, 13, and 17-19. The third sample (referred to herein as DP-03) corresponds to steps 112-115 and is described by FIGS. 7A, 8A, 9A, 10, 14, and 20-21. The fourth sample (referred to herein as DP-04) corresponds to step 118 of the process 100 (e.g., following microwaving) and is described by FIGS. 7B, 8B, 9B, 11, 15, and 20-21.

Scanning electron microscopy (SEM) and energy-dispersive X-ray spectroscopy (EDS) was performed on the hydrophobic admixture to observe the surface morphology and to obtain the chemical elemental analysis of the powder at different steps of the process.

Figure 2A:
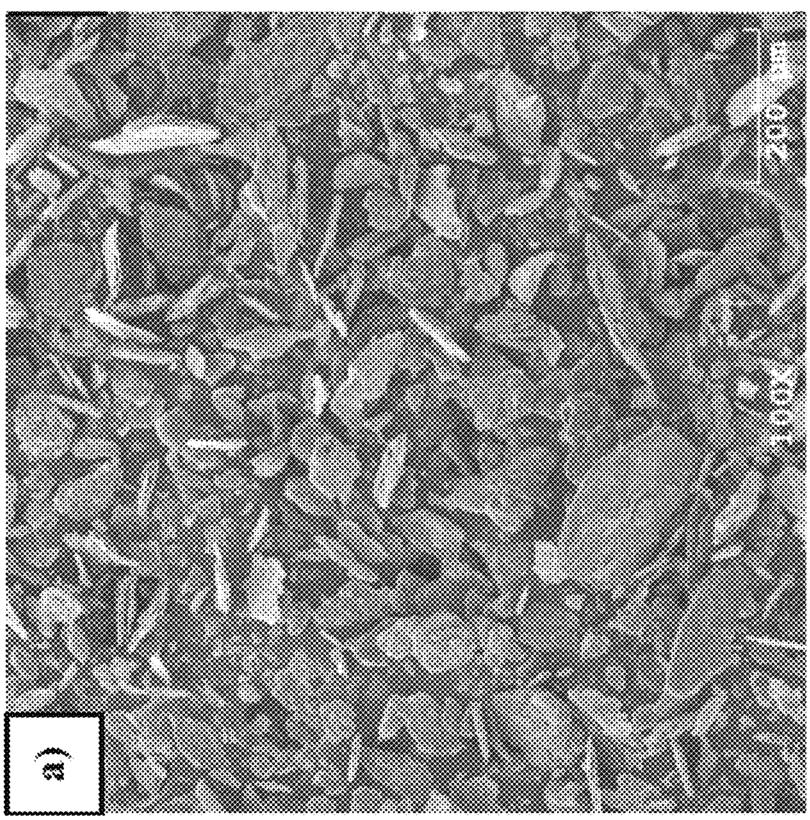
FIG. 2A shows a scanning electron microscope (SEM) image of an exemplary hydrophobic admixture precursor, according to one embodiment of the present disclosure.

FIG. 2A shows a SEM image 200A of an exemplary hydrophobic admixture precursor according to various embodiments of the present disclosure. The hydrophobic admixture precursor shown in SEM image 200A can correspond to before the hydrophobic admixture precursor is subjected to blending and microwaving processes.

Figure 2B:
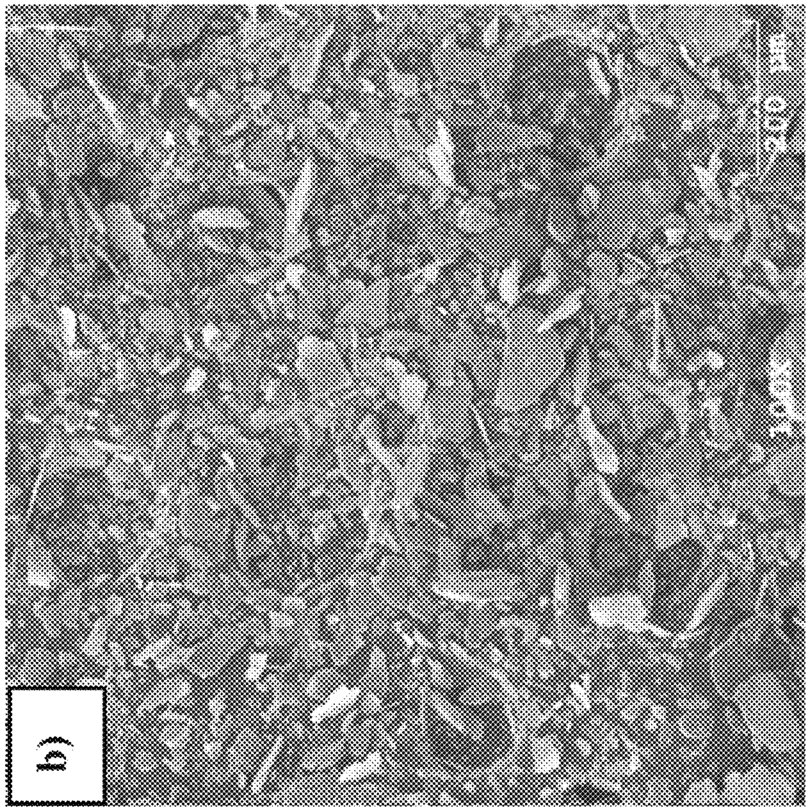
FIG. 2B shows a SEM image of an exemplary hydrophobic admixture precursor, according to one embodiment of the present disclosure.

FIG. 2B shows a SEM image 200B of an exemplary hydrophobic admixture precursor according to various embodiments of the present disclosure. The hydrophobic admixture precursor shown in SEM image 200B can correspond to after the hydrophobic admixture precursor is subjected to blending and microwaving processes.

In particular, FIGS. 2A-B show SEM images at 100× magnification of a graphite and titanium dioxide blend before (200A, FIG. 2A) and after (200B, FIG. 2B) blending and microwave processes. The graphite grains were measured using ImageJ. The resulting sizes as measured were as large as 228 μm before blending and microwave process and as large as 134 μm (measured using ImageJ) after blending and microwave process, which corresponds to a reduction of about 42%. This shows that blending of the material is effective at reducing the graphite grain size.

Figure 3A:
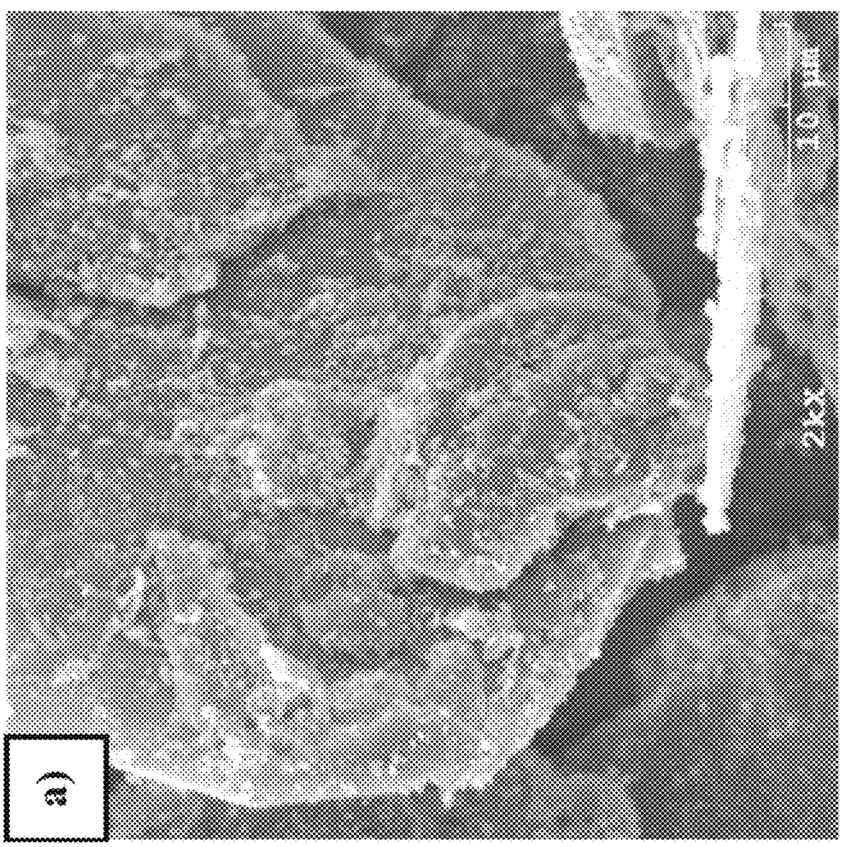
FIG. 3A shows a SEM image of an exemplary hydrophobic admixture precursor, according to one embodiment of the present disclosure.

FIG. 3A shows a SEM image 300A of an exemplary hydrophobic admixture precursor according to various embodiments of the present disclosure. The hydrophobic admixture precursor shown in SEM image 300A can correspond to prior the hydrophobic admixture precursor being subjected to blending and microwaving processes.

Figure 3B:
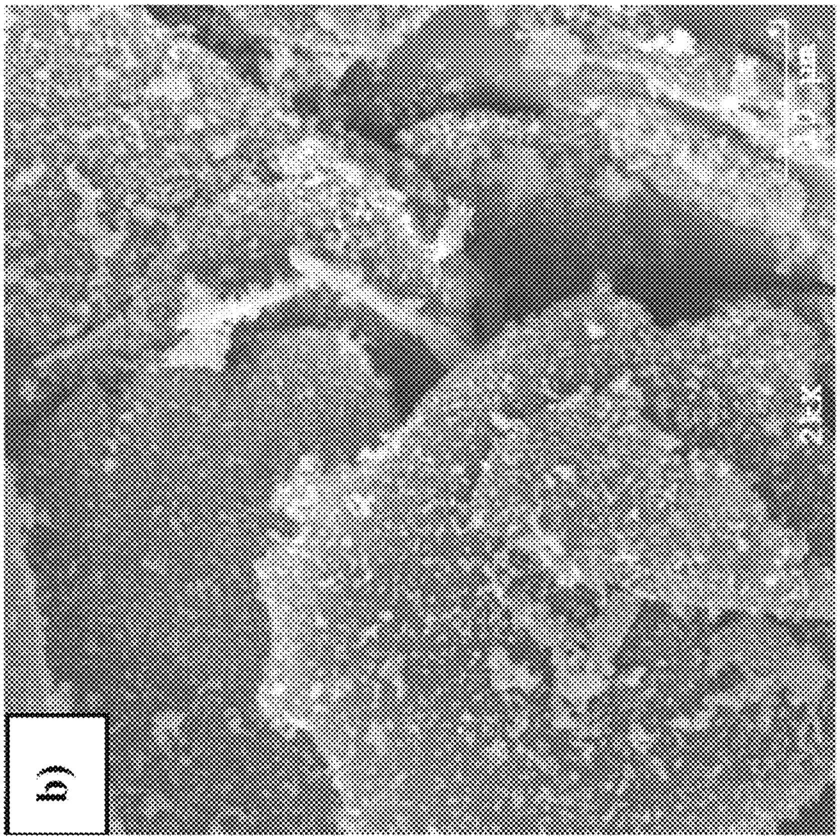
FIG. 3B shows a SEM image of an exemplary hydrophobic admixture precursor, according to one embodiment of the present disclosure.

FIG. 3B shows a SEM image 300B of an exemplary hydrophobic admixture precursor according to various embodiments of the present disclosure. The hydrophobic admixture precursor shown in SEM image 300B can correspond to after the hydrophobic admixture precursor is subjected to blending and microwaving processes.

In particular, FIGS. 3A-B show SEM images at 2000× and 7500× magnification, of the graphite and titanium dioxide blend before (300A, FIG. 3A) and after (300B, FIG. 3B) blending and microwaving processes. At higher magnifications (e.g., 2000× and 7500×), the titanium dioxide nanoparticles are visible. At 2000× (300A, FIG. 3A), agglomeration of the titanium on the graphite surface is observed before blending and microwave. Image 300B clearly shows better distribution of the titanium dioxide after blending and microwaving.

Figure 4B:
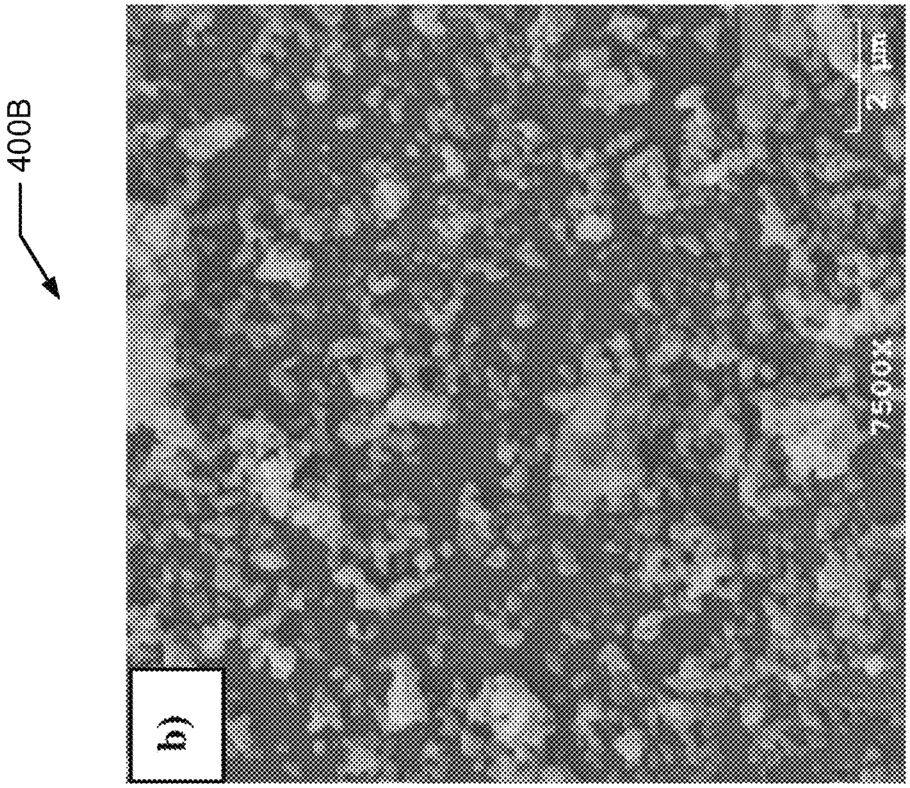
FIG. 4B shows a SEM image an exemplary hydrophobic admixture precursor, according to one embodiment of the present disclosure.
Figure 4A:
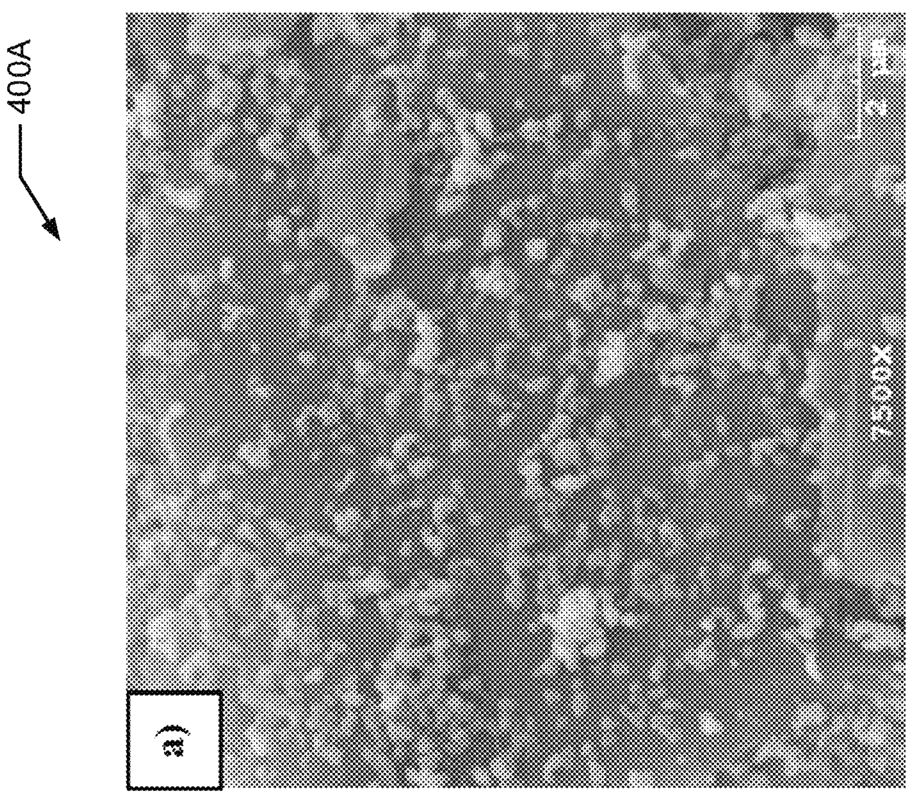
FIG. 4A shows a SEM image of an exemplary hydrophobic admixture precursor, according to one embodiment of the present disclosure.

FIG. 4A shows a SEM image 400A of an exemplary hydrophobic admixture precursor according to various embodiments of the present disclosure. The hydrophobic admixture precursor shown in SEM image 400A can correspond to prior the hydrophobic admixture precursor being subjected to blending and microwaving processes.

FIG. 4B shows a SEM image 400B of an exemplary hydrophobic admixture precursor according to various embodiments of the present disclosure. The hydrophobic admixture precursor shown in SEM image 400B can correspond to after the hydrophobic admixture precursor is subjected to blending and microwaving processes.

The grain size of titanium dioxide was also measured using ImageJ software and found to vary slightly in size (image 400A, FIG. 4A). The smallest titanium dioxide nanoparticle observed before blending and microwave was measured at about 113 nm (image 400A, FIG. 4A). After the blending and microwave process the smallest particle was measured at 93 nm (image 400B, FIG. 4B), which is a reduction of about 18%. The titanium dioxide grains look like an agglomeration of several smaller gains. This indicates that the titanium dioxide includes agglomerated nanoparticles (also referred to as "nanocrystals"), which can be slightly reduced in size through the blending process.

Figure 5:
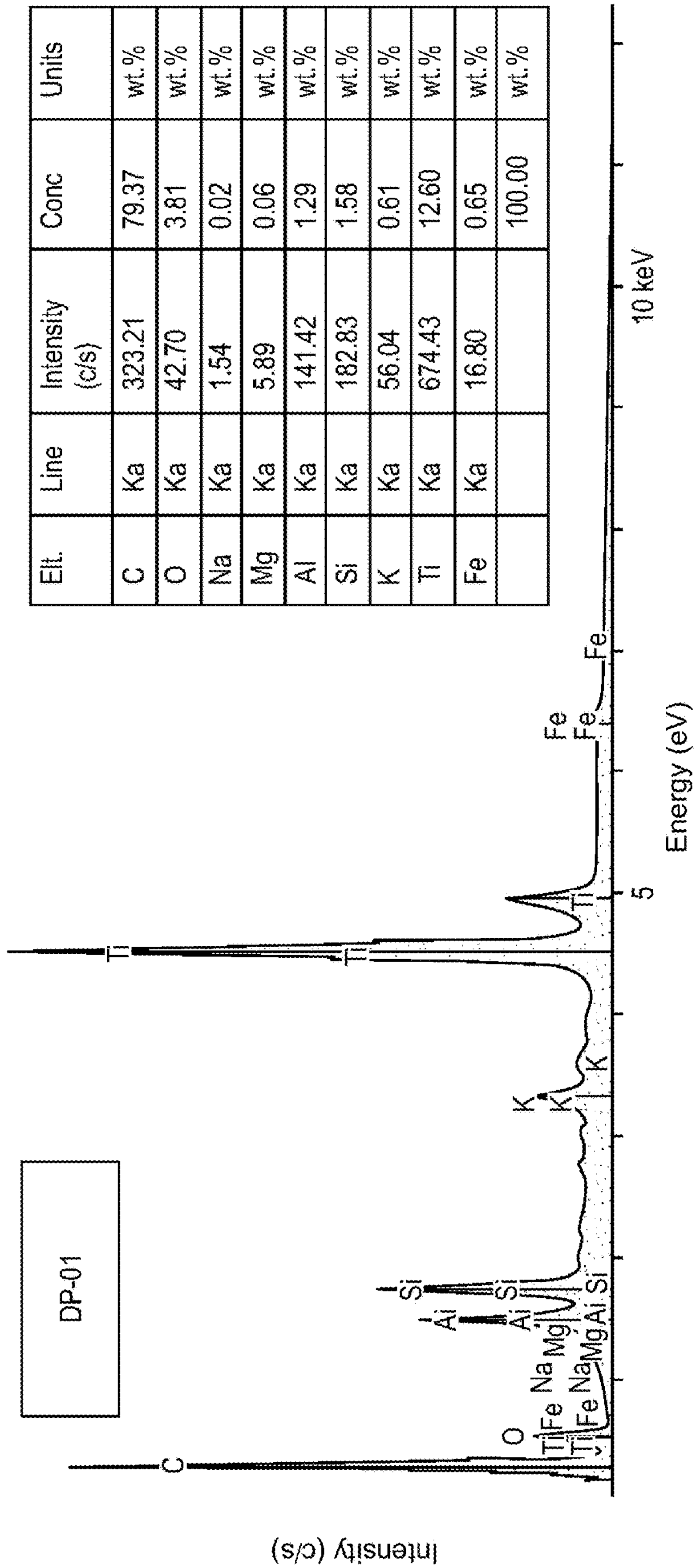
FIG. 5 shows a chart of exemplary energy-dispersive X-ray spectroscopy (EDS), results obtained from XRD analysis of an exemplary hydrophobic admixture precursor composition, according to one embodiment of the present disclosure.

FIG. 5 shows a chart 500 of results obtained from EDS analysis of an exemplary hydrophobic admixture precursor composition according to various embodiments of the present disclosure. The hydrophobic admixture precursor composition shown in chart 500 can correspond to before the hydrophobic admixture precursor is subjected to blending and microwaving processes. The chart 500, chart 600 (FIG. 6), chart 1000 (FIG. 10), and chart 1100 (FIG. 11) include the following columns: 1) Element (Elt.) according to the periodic table; 2) Emission line shown (e.g., Ka corresponds to K-alpha emission line); 3) intensity measured in speed of light (c) per second (s); 4) concentration (Conc); and 5) Units showing the units of the concentration (for example, the analyzed sample in chart 1100 shown in FIG. 11 included 54.63 weight % of Carbon).

Figure 6:
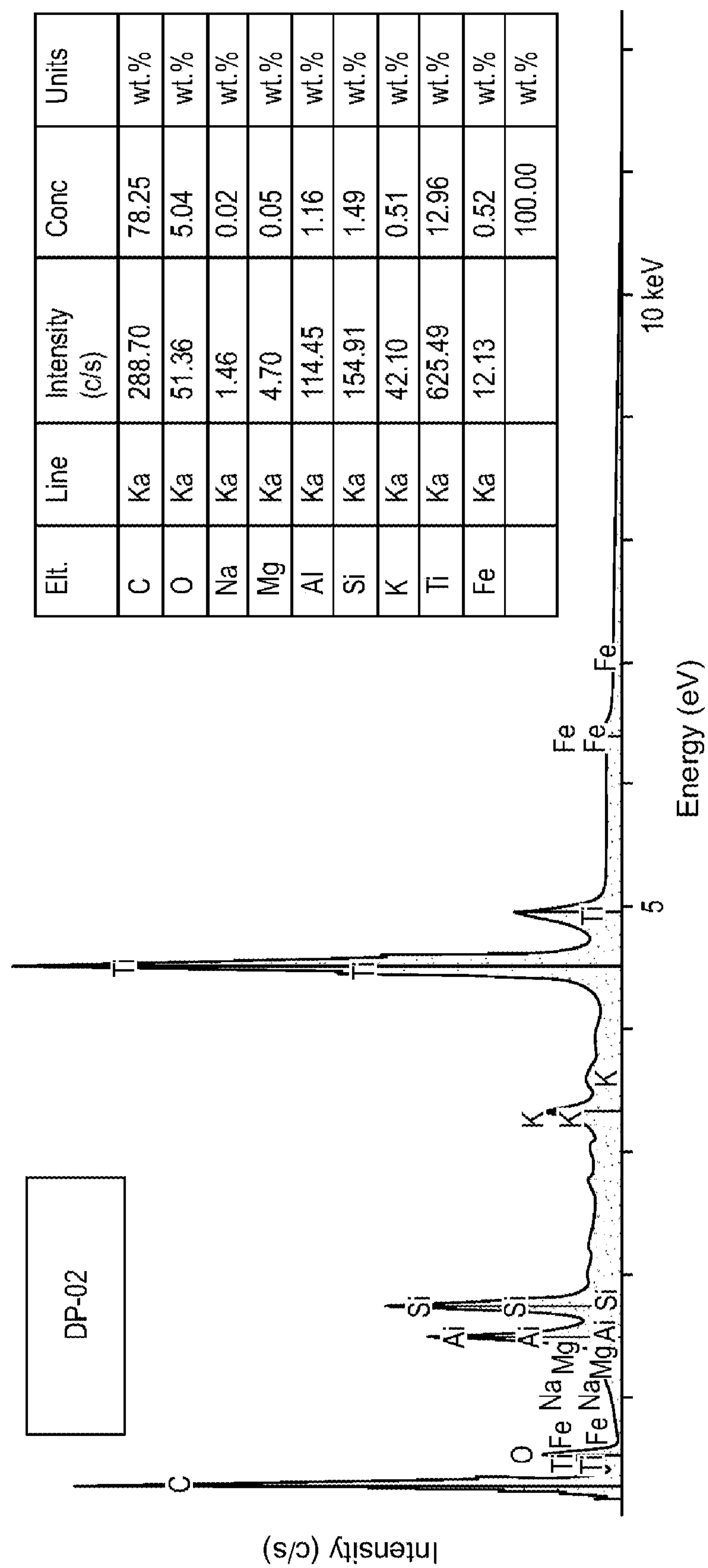
FIG. 6 shows a chart of exemplary EDS results obtained from EDS analysis of an exemplary hydrophobic admixture precursor composition, according to one embodiment of the present disclosure.

FIG. 6 shows a chart 600 of results obtained from EDS analysis of an exemplary hydrophobic admixture precursor composition according to various embodiments of the present disclosure. The hydrophobic admixture precursor composition shown in chart 600 can correspond to after the hydrophobic admixture precursor is subjected to blending and microwaving processes.

Elemental analysis was also done on the samples before (e.g., chart 500, FIG. 5) and after (e.g., chart 600, FIG. 6) the blending and microwave process. Chart 500 shows the elements present on a pre-blending and microwaving samples, and chart 600 shows the elements present on the sample post-blending and microwaving. Although some elements show weight percent less than 0.1% (Na, Mg), removal of carbon and oxygen in the elemental analysis confirms their weight percent above the threshold value of 0.1%. The elemental composition shows slight variations between the samples (e.g., which are common because the elemental analysis is focused on a small area and does not correspond to the entirety of the samples). The analysis shows 95.8% of the weight comes from carbon, titanium, oxygen, which correspond to the graphite and titanium dioxide used as raw materials, with carbon clearly dominating (e.g., 79%). Other elements considered impurities, such as sodium, magnesium, aluminum, silicon, potassium, and iron, only make up 4.2% percent of the total weight.

Figure 7B:
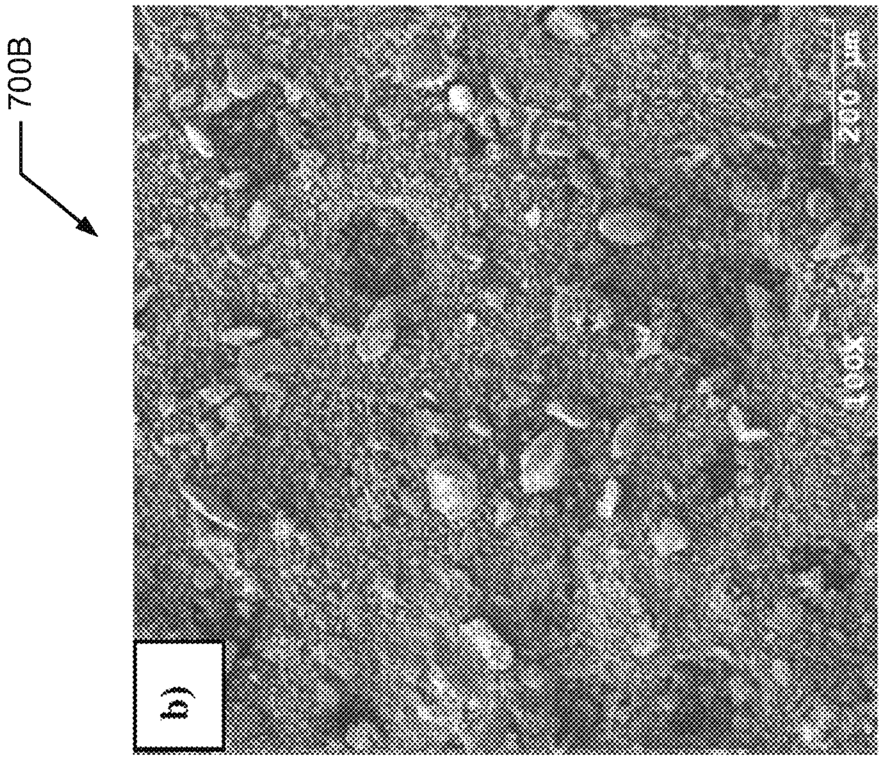
FIG. 7B shows a SEM image of an exemplary hydrophobic admixture, according to one embodiment of the present disclosure.
Figure 7A:
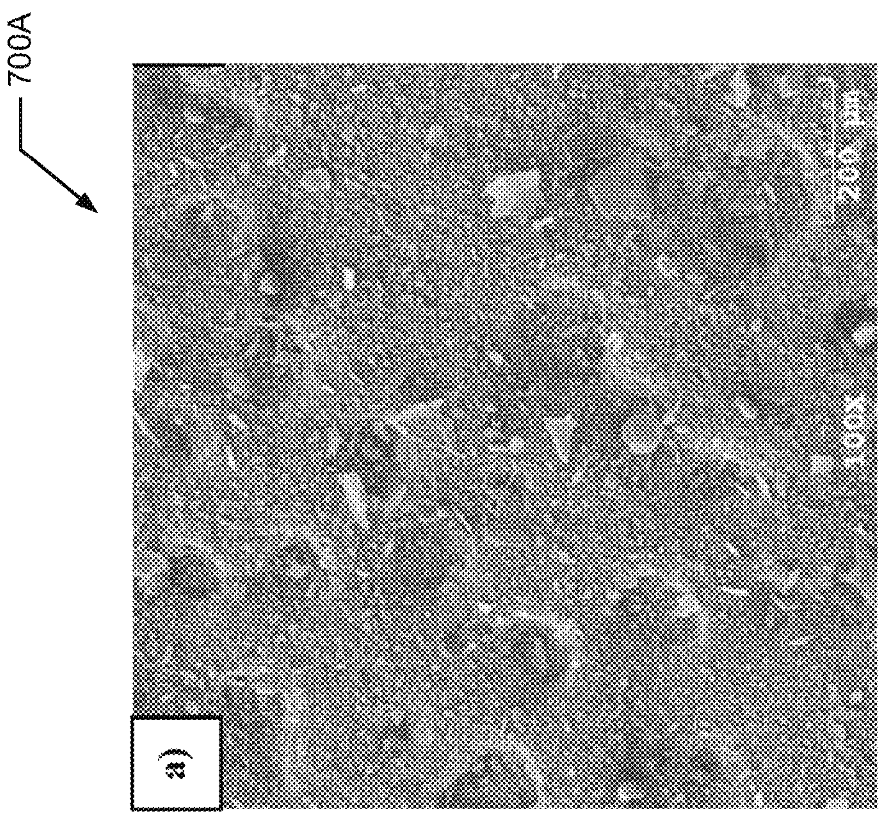
FIG. 7A shows a SEM image of an exemplary hydrophobic admixture, according to one embodiment of the present disclosure.

FIG. 7A shows a SEM image 700A of an exemplary hydrophobic admixture according to various embodiments of the present disclosure. The hydrophobic admixture shown in SEM image 700A can correspond to prior the hydrophobic admixture being subjected to blending and microwaving processes.

FIG. 7B shows a SEM image 700B of an exemplary hydrophobic admixture according to various embodiments of the present disclosure. The hydrophobic admixture shown in SEM image 700B can correspond to after the hydrophobic admixture is subjected to blending and microwaving processes.

Figure 8A:
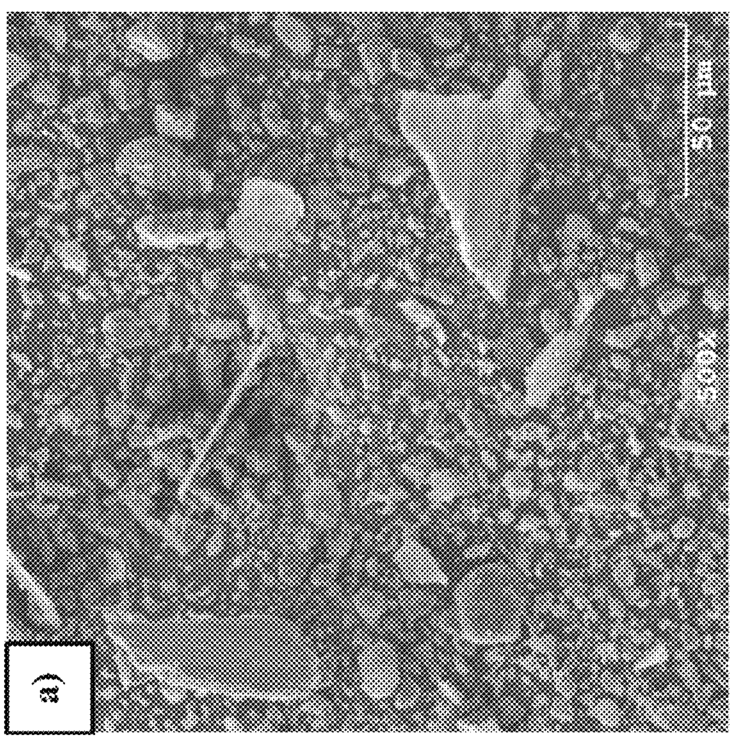
FIG. 8A shows a SEM image of an exemplary hydrophobic admixture, according to one embodiment of the present disclosure.

FIG. 8A shows a SEM image 800A of an exemplary hydrophobic admixture according to various embodiments of the present disclosure. The hydrophobic admixture shown in SEM image 800A can correspond to prior the hydrophobic admixture being subjected to blending and microwaving processes.

Figure 8B:
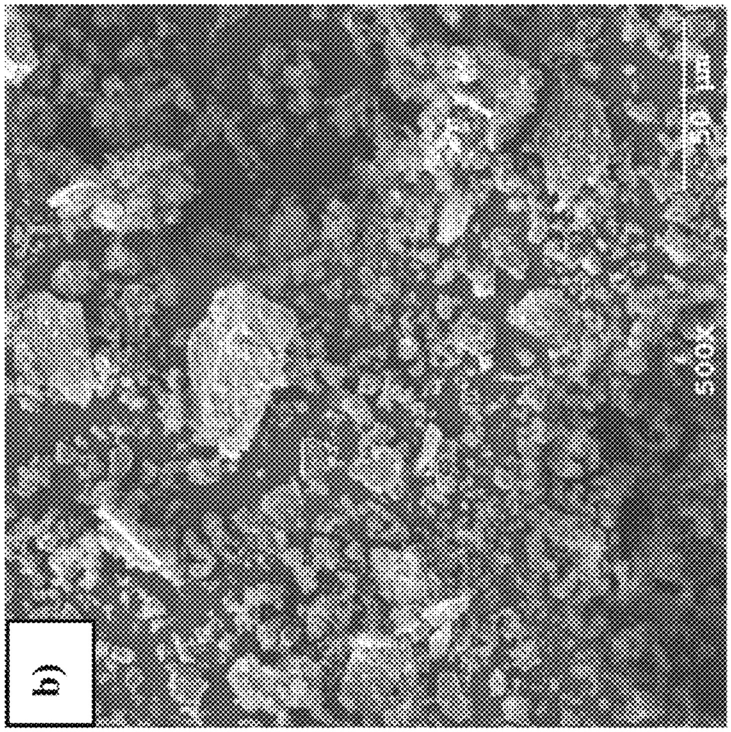
FIG. 8B shows a SEM image of an exemplary hydrophobic admixture, according to one embodiment of the present disclosure.

FIG. 8B shows a SEM image 800B of an exemplary hydrophobic admixture according to various embodiments of the present disclosure. The hydrophobic admixture shown in SEM image 800B can correspond to after the hydrophobic admixture is subjected to blending and microwaving processes.

In particular, FIGS. 7A-B show SEM images at 100× magnification of samples including titanium dioxide, graphite, calcium carbonate, and magnesium carbonate prior to (e.g., image 700A) and following (e.g., image 700B) blending and microwaving. Comparing images 700A and 700B, the powder morphology appears to change following the blending and microwaving process. Upon further investigation at higher magnifications of 500× (e.g., image 800A) and 2000× (e.g., image 800B), it can be observed that differences persist between samples DP-03 and DP-04.

Figure 9A:
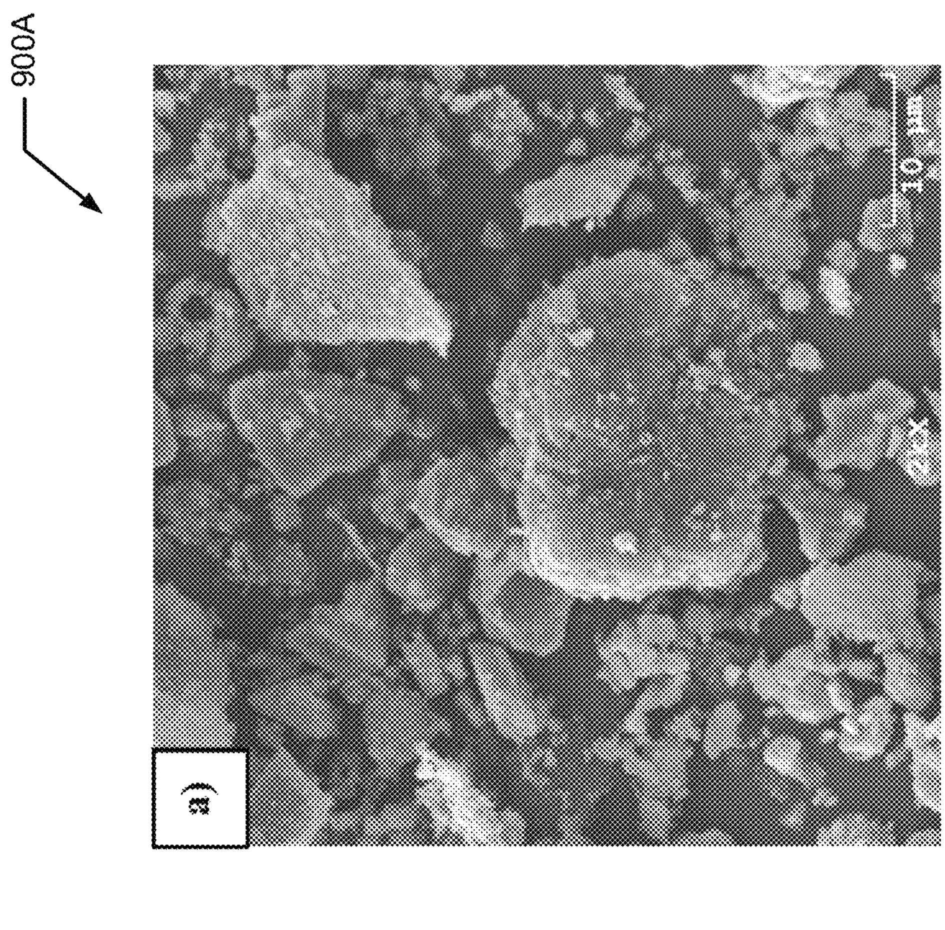
FIG. 9A shows a SEM image 900A of an exemplary hydrophobic admixture, according to one embodiment of the present disclosure.

FIG. 9A shows a SEM image 900A of an exemplary hydrophobic admixture according to various embodiments of the present disclosure. The hydrophobic admixture shown in SEM image 900A can correspond to prior the hydrophobic admixture being subjected to blending and microwaving processes.

Figure 9B:
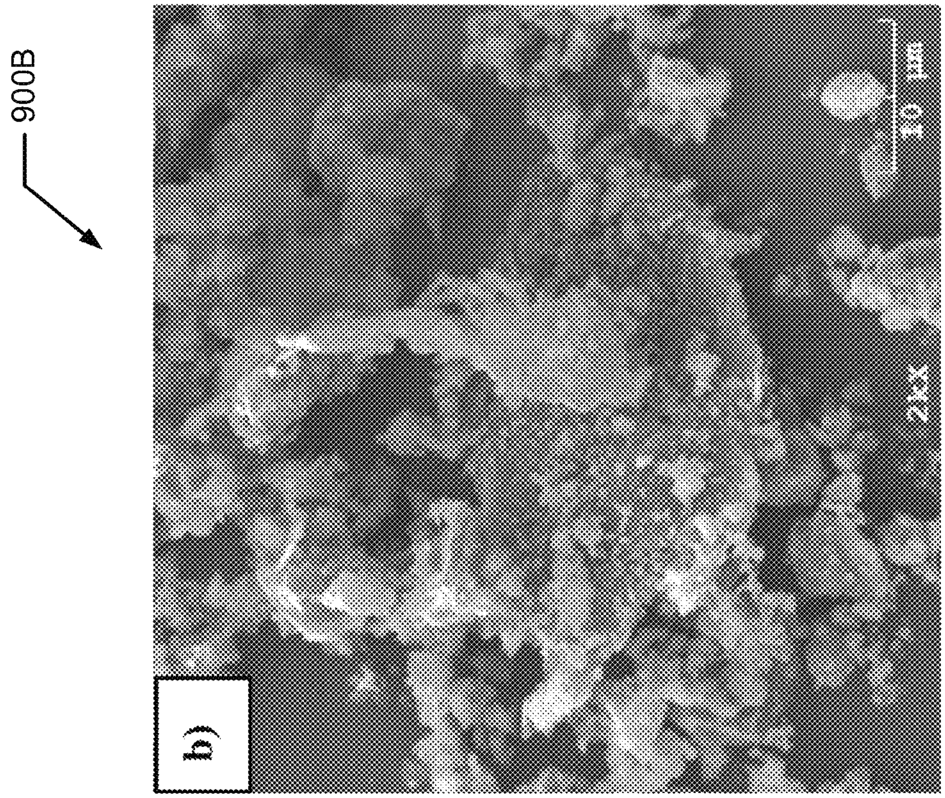
FIG. 9B shows a SEM image 900B of an exemplary hydrophobic admixture, according to one embodiment of the present disclosure.

FIG. 9B shows a SEM image 900B of an exemplary hydrophobic admixture according to various embodiments of the present disclosure. The hydrophobic admixture shown in SEM image 900B can correspond to after the hydrophobic admixture is subjected to blending and microwaving processes.

As shown in 900A, 900B the powder on the surface of the hydrophobic admixture appears "fuzzier" following blending and microwaving. Comparing the 900A-B with previous SEM images 200A-B, 300A-B, 400A-B shown in FIGS. 2A-B, 3A-B, and 4A-B, it can be observed that the fuzzy materials are the carbonates and thus the change in surface morphology may be attributed to interaction between calcium and magnesium carbonates and/or between one or more carbonates and titanium dioxide.

Figure 10:
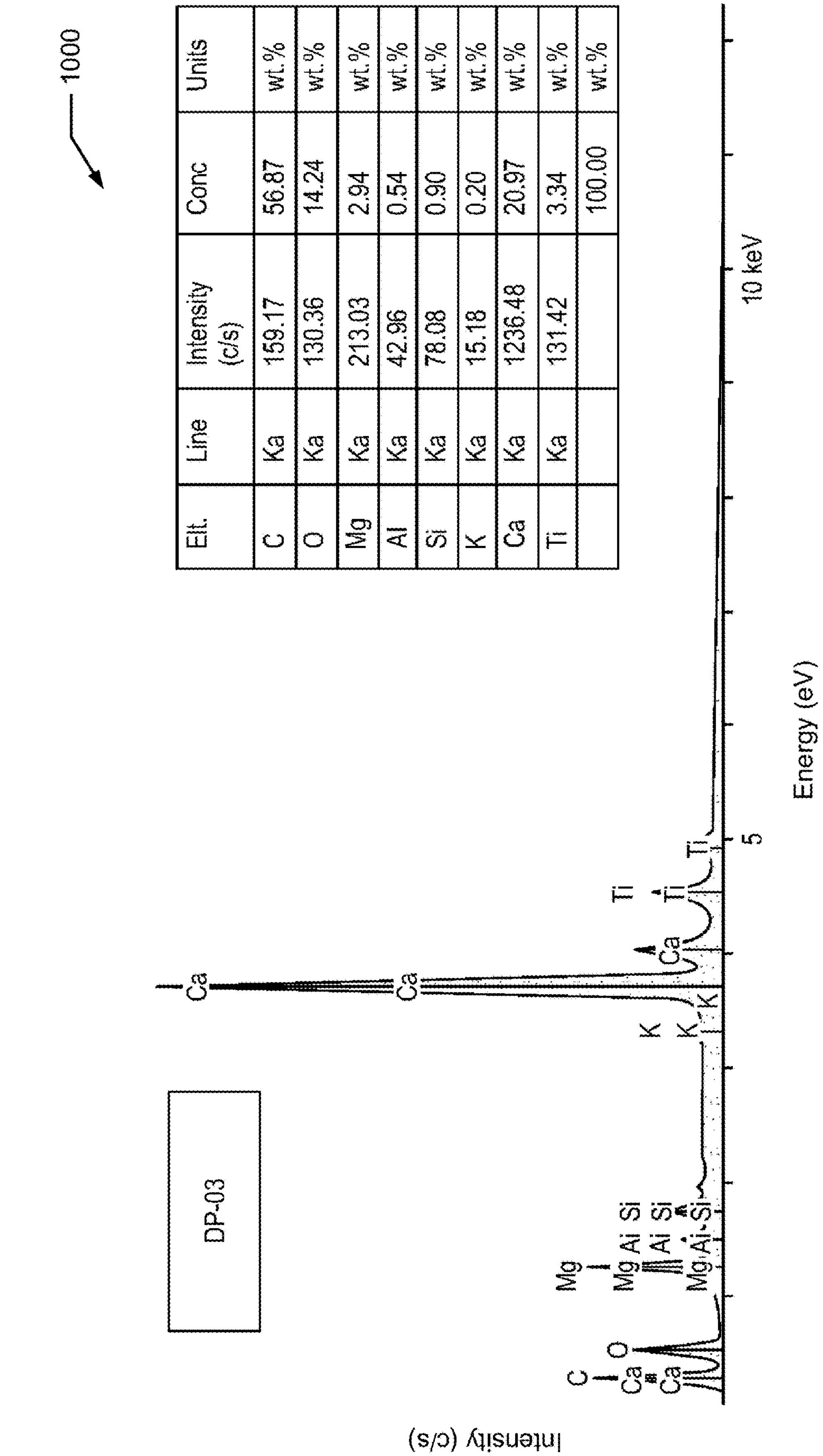
FIG. 10 shows a chart of exemplary EDS results obtained from EDS analysis of an exemplary hydrophobic admixture composition, according to one embodiment of the present disclosure.

FIG. 10 shows a chart 1000 of results obtained from EDS analysis of an exemplary hydrophobic admixture composition according to various embodiments. The hydrophobic admixture composition shown in chart 1000 can correspond to before the hydrophobic admixture is subjected to blending and microwaving processes.

Figure 11:
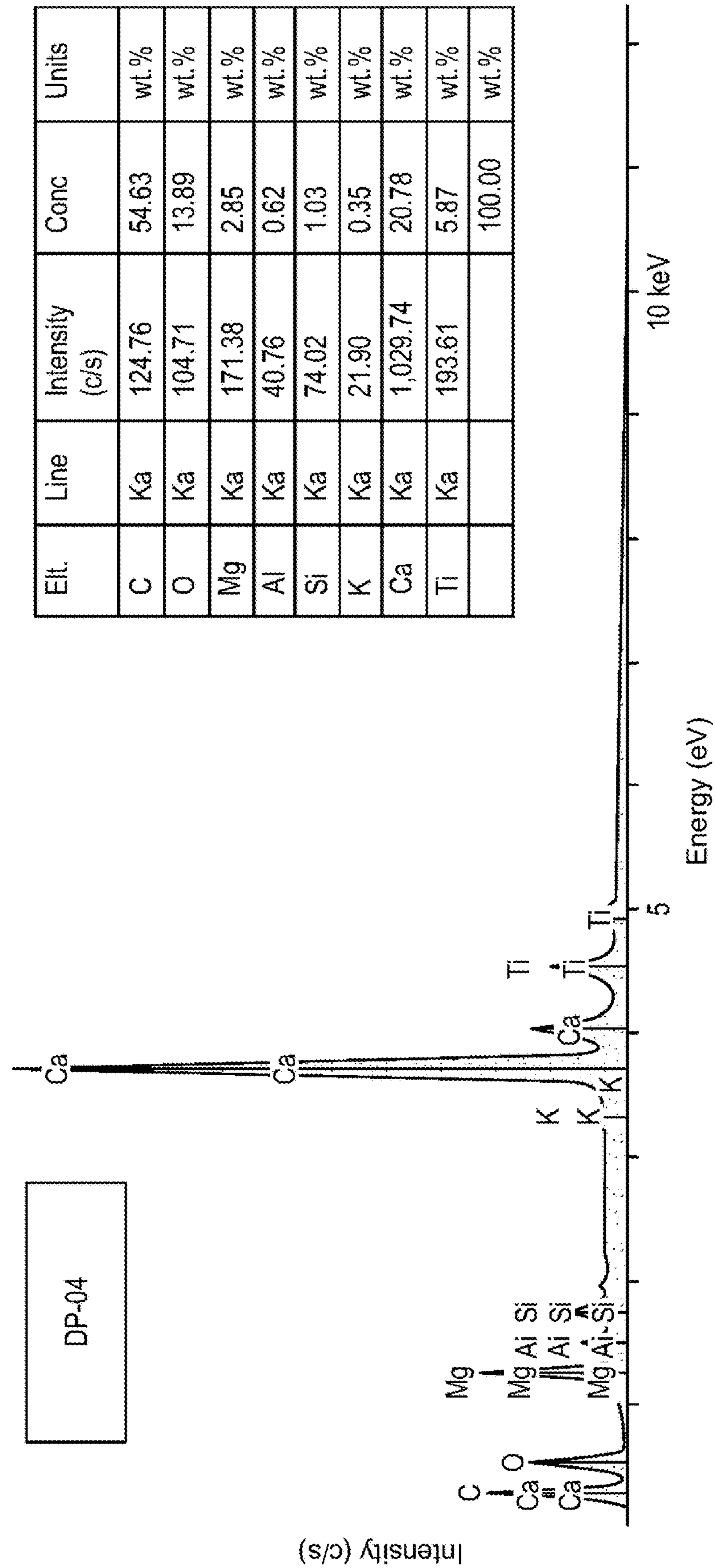
FIG. 11 shows a chart of exemplary EDS results obtained from EDS analysis of an exemplary hydrophobic admixture composition, according to one embodiment of the present disclosure.

FIG. 11 shows a chart 1100 of results obtained from EDS analysis of an exemplary hydrophobic admixture composition according to various embodiments. The hydrophobic admixture composition shown in chart 1100 can correspond to after the hydrophobic admixture is subjected to blending and microwaving processes. Elemental analysis was performed on admixture samples before (e.g., chart 1000, FIG. 10) and after (e.g., chart 1100, FIG. 11) a second process of blending and microwaving. All the elements shown have a weight percent above the minimum threshold of 0.1%, even before removing carbon and oxygen from the analysis. A significant increase in the percent of oxygen can be observed when comparing to samples described by FIGS. 5-6, which is due to the addition of calcium and magnesium carbonate. Calcium and magnesium are also significant components of these samples, as shown in charts 1000, 1100, corresponding to the calcium and magnesium carbonates. Comparing to samples shown in FIGS. 5-6, sodium and iron are not present in the EDS analysis of samples shown in charts 1000, 1100. Both of those elements were previously present in very small amounts, and, with the addition of more powder, their weight percent was further reduced below the minimum threshold of 0.1%. The elements corresponding to the raw ingredients, which are carbon, oxygen, magnesium, calcium, and titanium, make up 98.4% in weight. The impurities make up 1.6% of the total weight and are composed of the chemical elements of aluminum, silicon, and potassium.

The aforementioned samples were analyzed using X-ray diffraction (XRD). The resultant spectrum of each sample was analyzed to identify the crystalline structures present in each powder, admixture precursor, or admixture derived therefrom.

Figure 12:
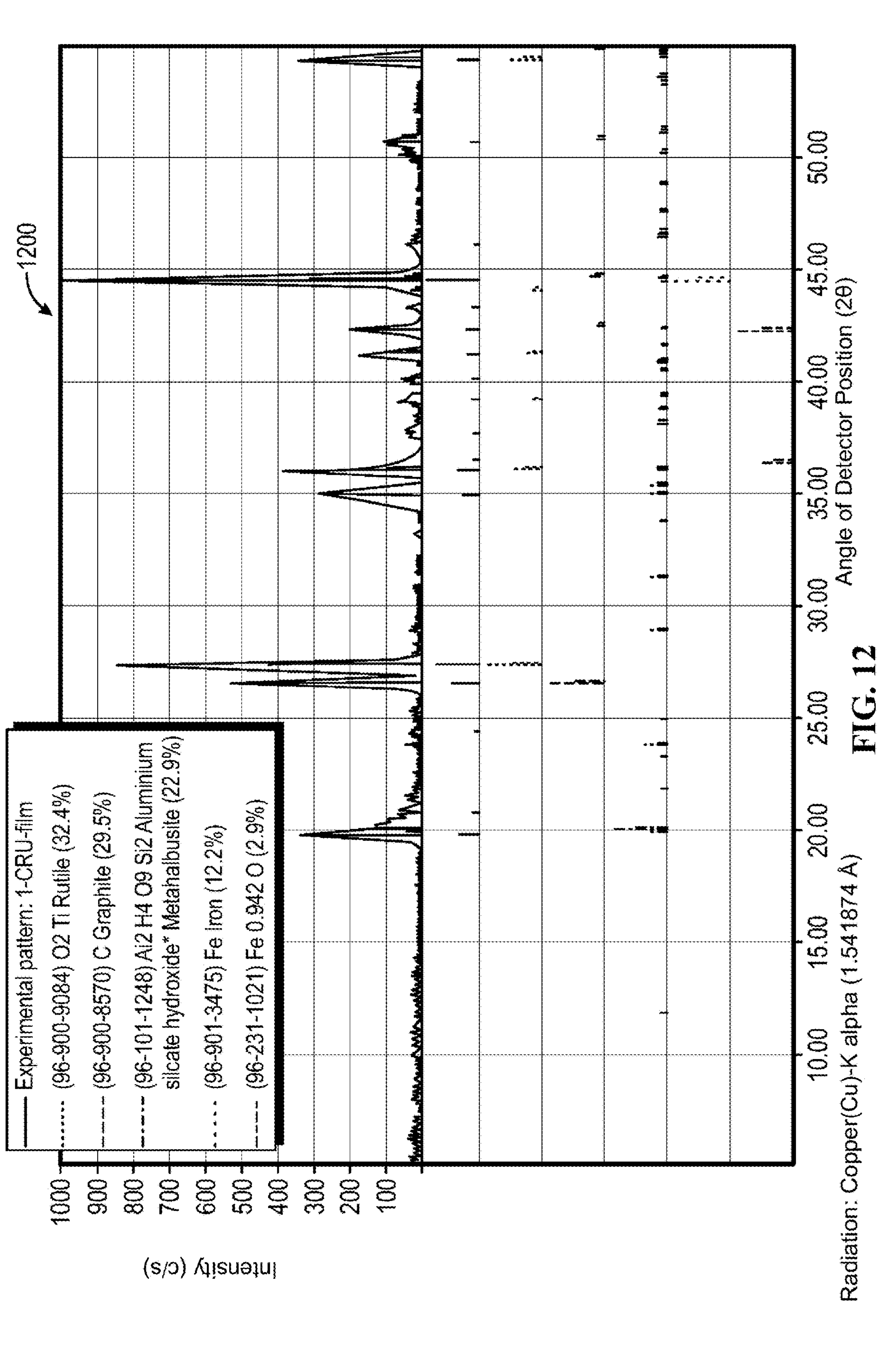
FIG. 12 shows a chart of exemplary X-ray diffraction (XRD) results obtained from XRD analysis of a hydrophobic admixture, according to one embodiment of the present disclosure.

FIG. 12 shows a chart 1200 of exemplary X-ray diffraction (XRD) results obtained from XRD analysis of a hydrophobic admixture according to various embodiments of the present disclosure. The hydrophobic admixture shown in chart 1200 can correspond to before the hydrophobic admixture is subjected to blending and microwaving processes.

The spectrum for the sample of FIG. 5 is shown in the chart 1200. The crystalline phases identified with a figure-of-merit (FoM) above 0.6 were rutile (e.g., titanium dioxide), graphite, halloysite (e.g., aluminum silicate hydroxide), iron (Fe), and iron oxide. Halloysite and iron are impurities present in titanium dioxide and graphite powders. According to the previous energy-dispersive X-ray spectroscopy (EDS), aluminum and silicon combine for 2.87% of the total weight, which are the main constituents of halloysite. Iron is also present in small quantities, 0.65% of total weight, according to the previous EDS. This is expected, as natural rutile may contain up to 10% iron. Halloysite, a form of clay, is likely to be an impurity found in graphite. The XRD peaks for rutile and graphite are sharp, which signals a high degree of crystallinity. In the case of graphite, it shows a high degree of graphitization, which points to layers of well-ordered hexagonal carbon lattices. The interlayer spacing of graphite was found to be 3.4 Å, which is consistent with values in the literature. No peaks were detected corresponding to graphite oxide, reduced graphene oxide, or graphene, as it is the case in other previous experiments using microwave heating and graphite oxide as precursors.

Figure 13:
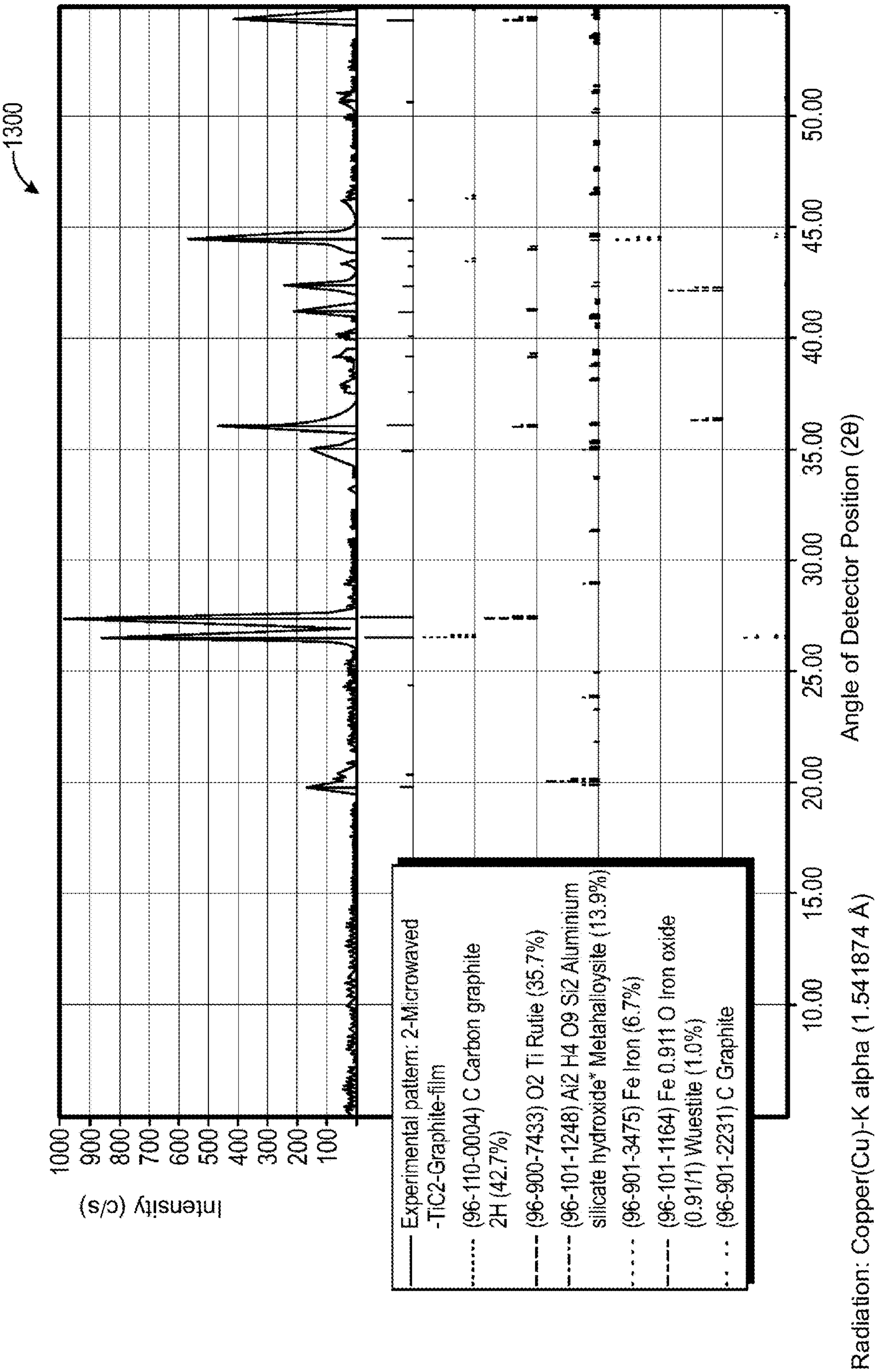
FIG. 13 shows a chart of exemplary X-ray diffraction (XRD) results obtained from XRD analysis of a hydrophobic admixture, according to one embodiment of the present disclosure.

FIG. 13 shows a chart 1300 of exemplary X-ray diffraction (XRD) results obtained from XRD analysis of a hydrophobic admixture according to one embodiment.

The spectrum of the sample analyzed at FIG. 6 is shown in the chart 1300. The same crystalline phases were identified as before. As can be seen from FIGS. 12-13, the XRD spectra have the main peaks at the same 2θ angle locations, and only vary in height and width for some of the peaks. The size of crystallites can be determined using the Scherrer equation, which can be written as "$\tau = K\lambda/\beta \cos\theta$" where $\tau$ is the mean size of the crystalline domains, K is a dimensionless shape factor, usually of about 0.9, $\lambda$ is the X-ray wavelength, $\beta$ is the line broadening at half the maximum intensity (FWHM), and $\theta$ is the Bragg angle. Using this equation, titanium dioxide in rutile phase in the FIG. 5 sample has a crystalline size of 20.46 nm using the peak at 27.4°. For the same compound in the FIG. 6 sample, the crystalline size is 29.72 nm using peak at 27.4°. More commonly, the Scherrer equation should be used on a diffraction peak without overlap from reflections from other crystals, which corresponds to the 27.4° peak for titanium dioxide and a titanium dioxide crystalline growth of 45% due to microwaving. Crystal size should not be confused with particle size, which is an agglomeration of multiple crystals. The crystal growth indicates that the agglomerated titanium dioxide crystals are fusing together due to the heat created by the microwaving process. The interlayer spacing of graphite remained the same at 3.4 Å, although the graphite crystal size of the 26.5° peak grew from 27.23 nm to 30.45 nm (e.g., about a 12% increase).

Figure 14:
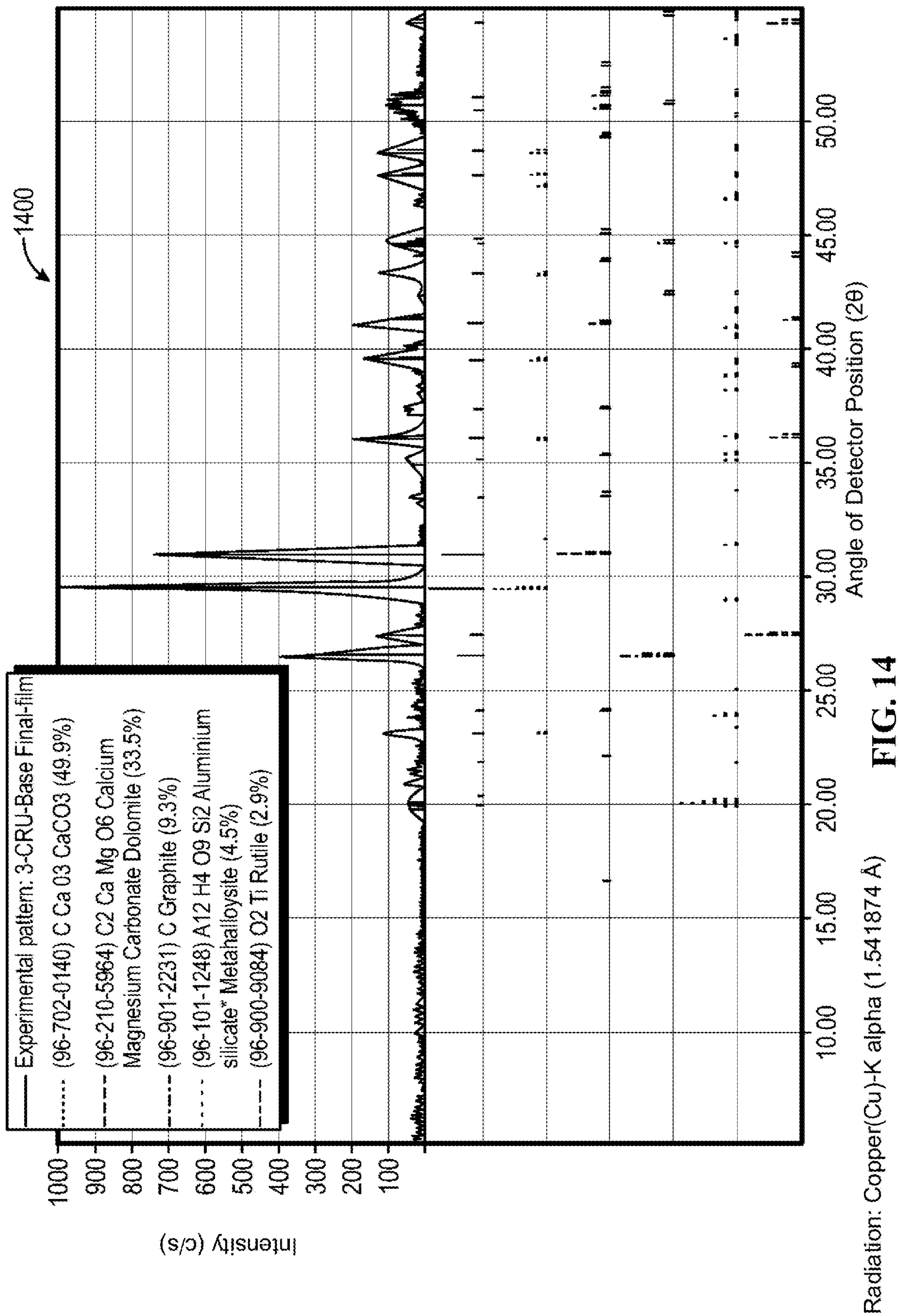
FIG. 14 shows a chart of exemplary X-ray diffraction (XRD) results obtained from XRD analysis of a hydrophobic admixture, according to one embodiment of the present disclosure.

FIG. 14 shows a chart 1400 of exemplary X-ray diffraction (XRD) results obtained from XRD analysis of a hydrophobic admixture according to one embodiment.

The chart 1400 shows an XRD spectrum for the sample shown in FIG. 10. The crystalline phase identified by the analysis with FoM near or above 0.6 were calcium carbonate ($CaCO_3$), dolomite (e.g., calcium magnesium carbonate), graphite (e.g., carbon (C)), halloysite (aluminum silicate hydroxide), and rutile (titanium dioxide). Iron and iron oxide were not detected in the sample due to its low quantity compared to other compounds in the powder sample. The other impurity, halloysite, was still detected in this sample, and even increased in its semi-quantitative amount ratio to graphite and rutile when compared to samples shown in FIGS. 5-6. Halloysite is a clay mineral often found near carbonate rocks. Carbonate rocks are a class of sedimentary rocks composed primarily of carbonate minerals. The two major types are limestone (e.g., composed of calcite or aragonite) and dolomite rock (e.g., composed of mineral dolomite). Halloysite increases its semi-quantitative weight ratio to graphite and rutile compared to the samples of FIGS. 5-6, because the substance is an impurity of carbonate rocks as well as graphite (e.g., both of which are present in the sample of FIG. 10). The interlayer spacing of graphite was found to be 3.4 Å (e.g., indicating no change).

Figure 15:
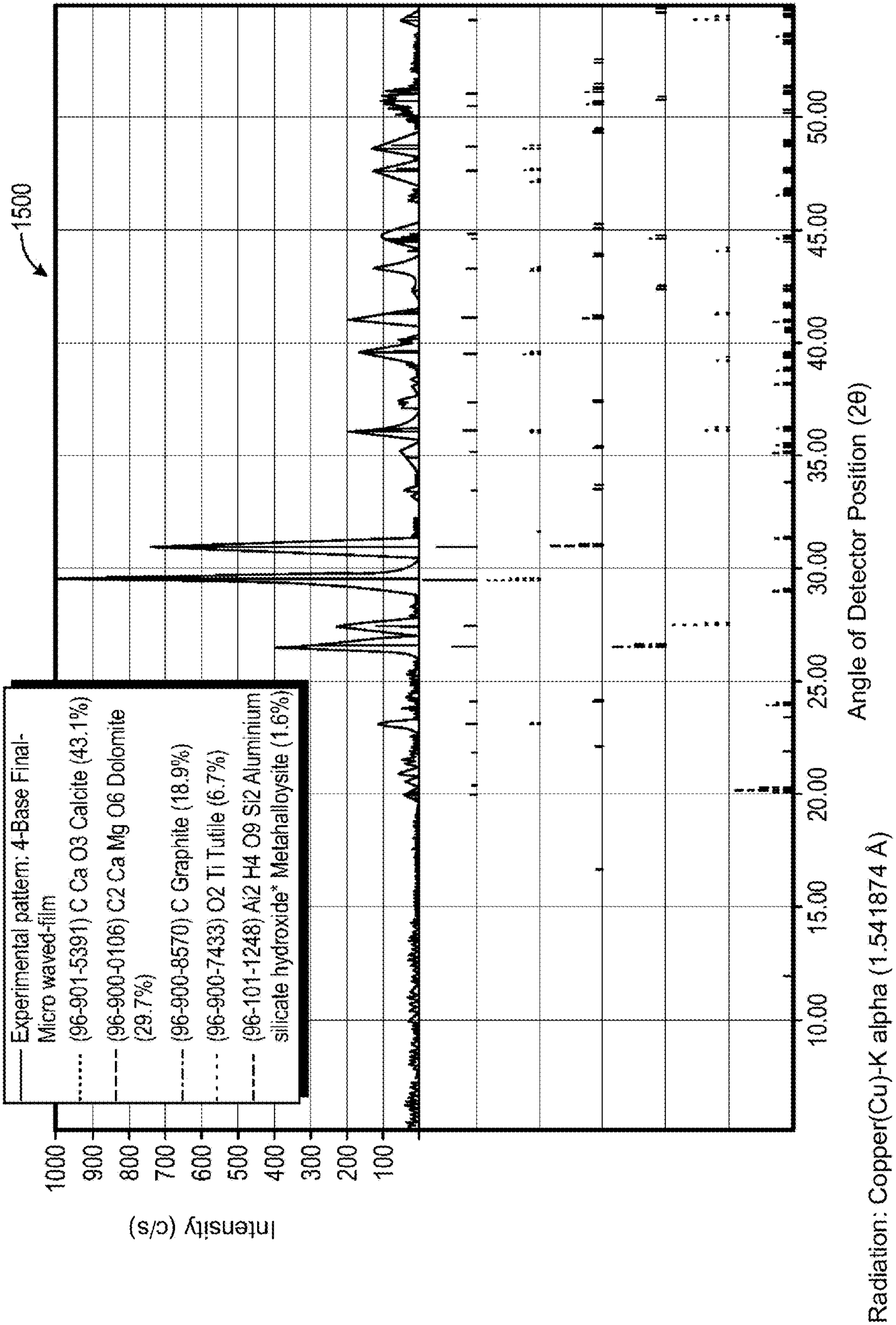
FIG. 15 shows a chart of exemplary X-ray diffraction (XRD) results obtained from XRD analysis of a hydrophobic admixture, according to one embodiment of the present disclosure.

FIG. 15 shows a chart 1500 of exemplary X-ray diffraction (XRD) results obtained from XRD analysis of a hydrophobic admixture according to one embodiment.

The chart 1500 shows an XRD spectrum corresponding to sample the sample represented in FIG. 11. The analysis identified the same crystalline phases as the sample represented in FIG. 14. The peak positions are virtually unchanged, which shows that the microwave heating process between FIG. 14 and FIG. 15 samples does not cause any major phase changes. The titanium dioxide crystal size only grew about 5% compared to the sample represented in FIGS. 6 and 13. Graphite crystal size at the 26.5° peak remained virtually unchanged compared to the sample represented in FIG. 13 (e.g., 29.5 nm for FIG. 15 vs 30.5 nm for FIG. 13). The interlayer spacing of graphite remained at 3.4 Å for all samples, which shows that the graphite molecular structure did not change throughout the process. Only blending of the powder caused a modification of graphite by decreasing its grain size. For calcium carbonate (calcite), the interplanar spacing (d) corresponding to its main peak at 29.46° remained unchanged between the samples of FIGS. 14 and 15 (e.g., 3.03 nm). Also, the crystal size for the same peak did not change due to the blending and microwave heating process (e.g., 25.4 nm). Similarly, the interplanar spacing (d) and crystal size corresponding to dolomite for peak position 30.90° remained virtually unchanged, at values of 2.89 nm (e.g., no change) and 28.5 nm (e.g., less than 5% change), respectively.

Figure 20:
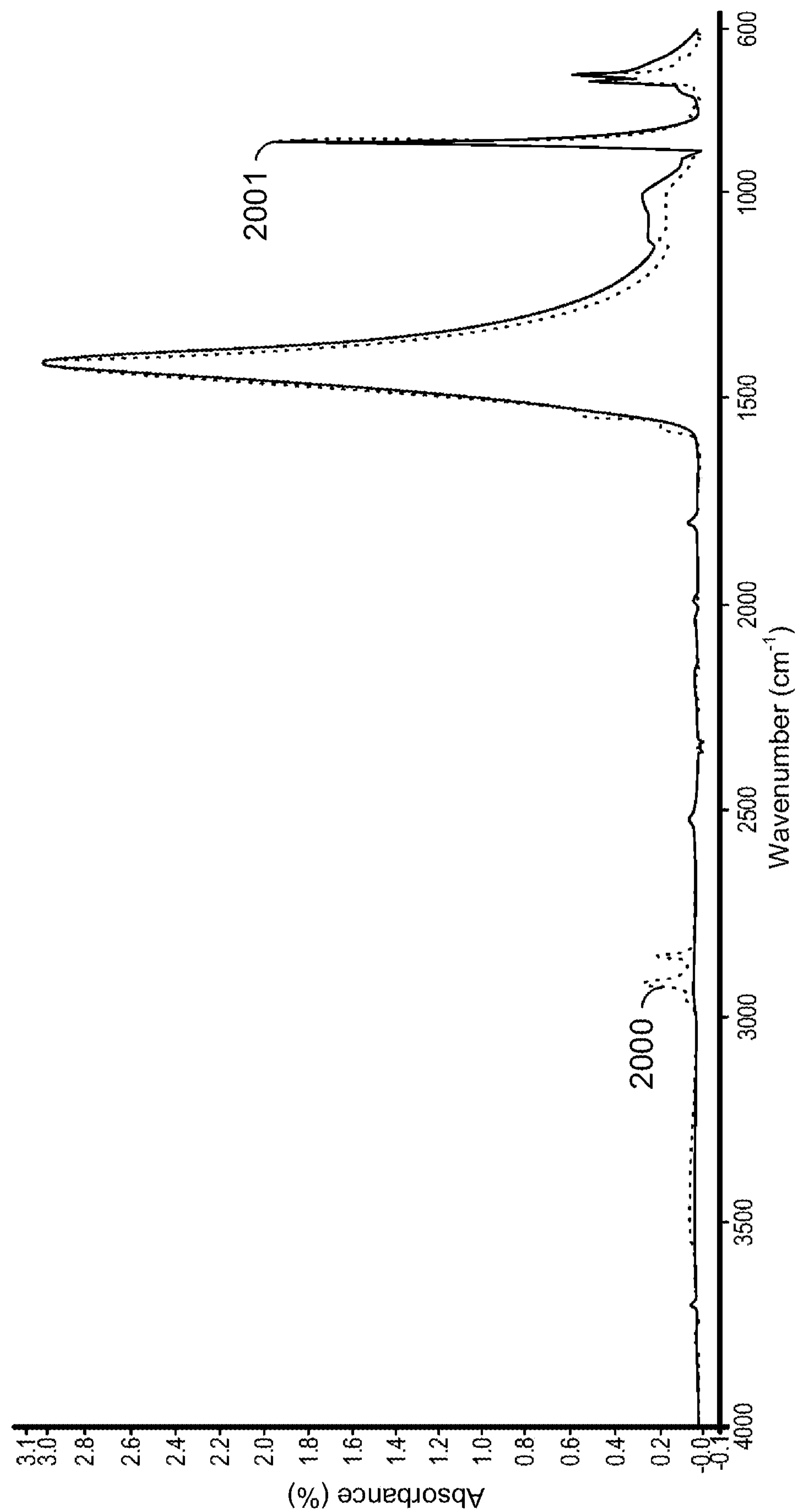
FIG. 20 shows an exemplary spectrum of FTIR spectroscopy performed on a hydrophobic admixture precursor, according to one embodiment of the present disclosure.
Figure 21:
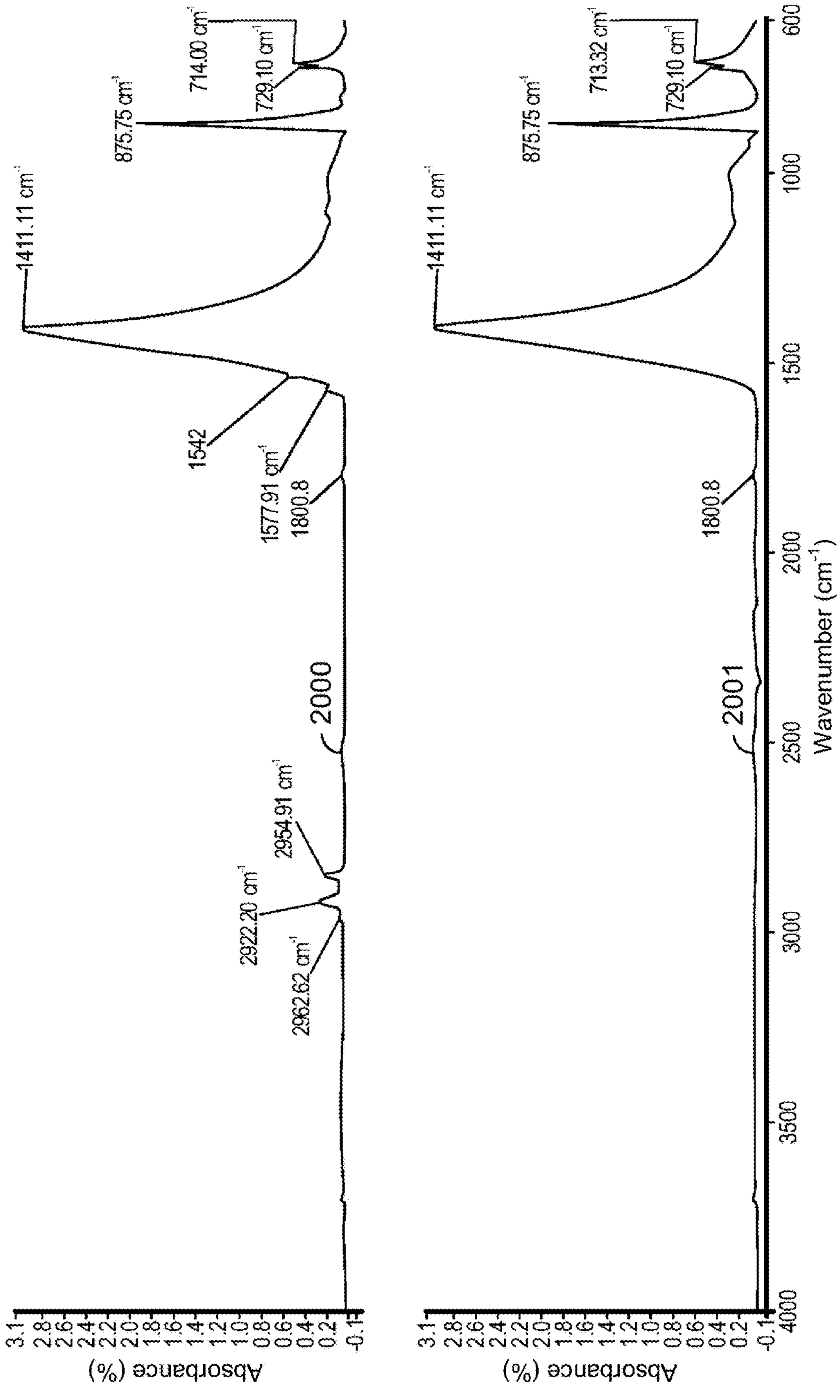
FIG. 21 shows an exemplary spectrum of FTIR spectroscopy performed on a hydrophobic admixture precursor, according to one embodiment of the present disclosure.
Figure 22:
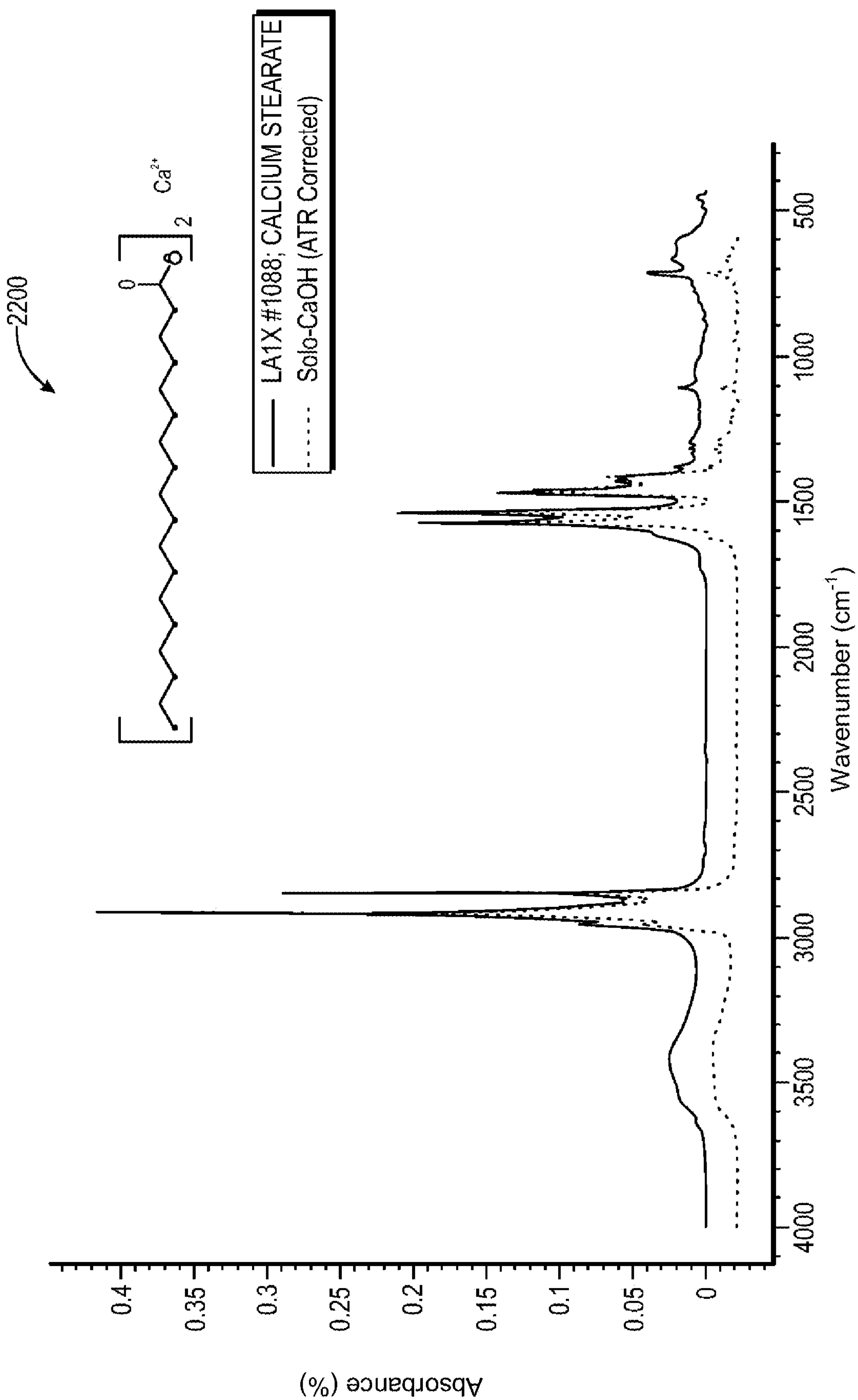
FIG. 22 shows exemplary FTIR spectroscopy results of calcium stearate, according to one embodiment of the present disclosure.

FIGS. 16-22 show exemplary results of fourier-transformed infrared spectroscopy (FTIR) analysis performed on one or more admixture precursor samples, such as those represented in the preceding FIGS. 5-6, 10-11 and potentially additional admixture ingredients (see FIG. 22 that show FTIR results for calcium stearate).

Figure 16:
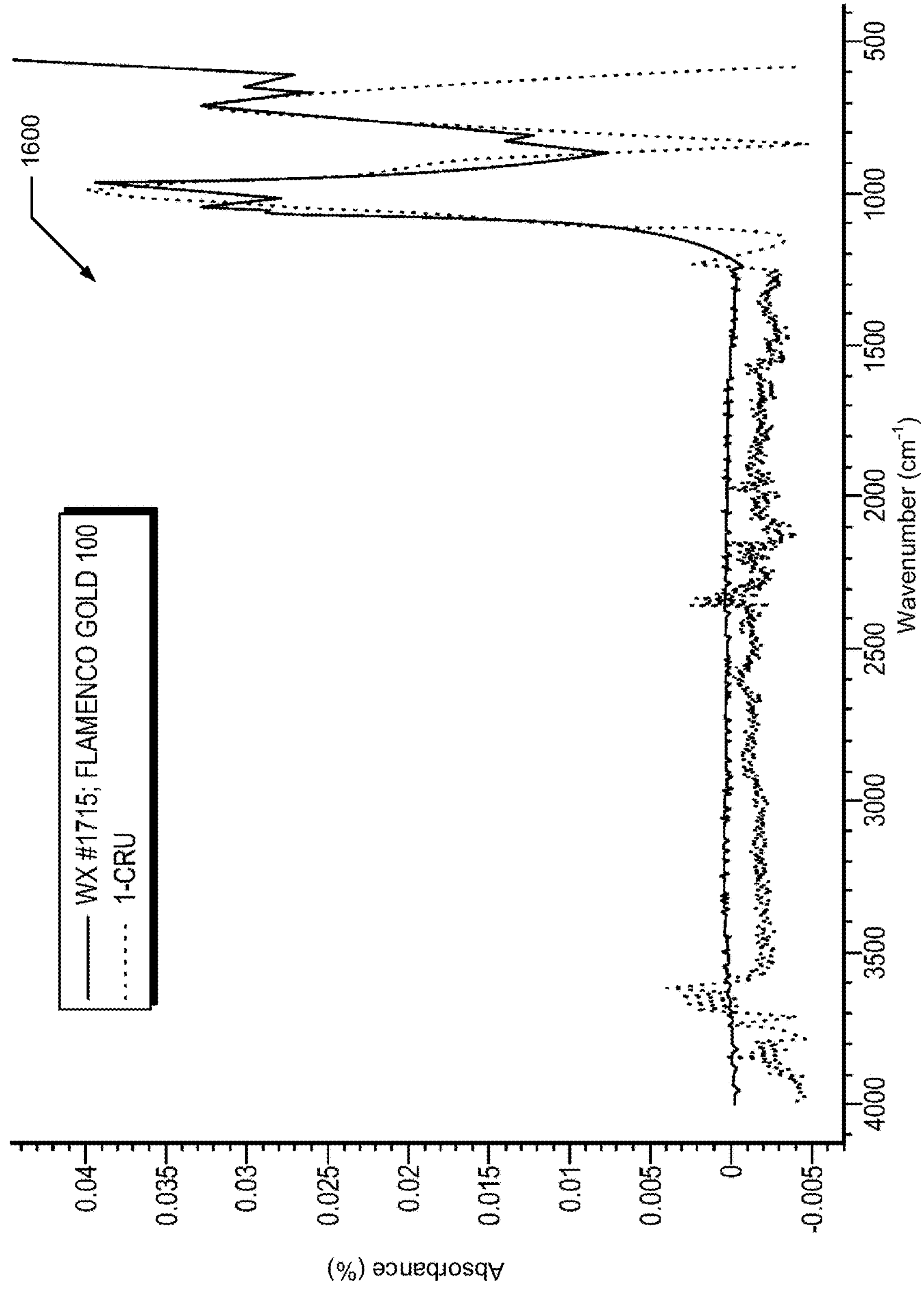
FIG. 16 shows an exemplary spectrum of FTIR spectroscopy performed on a hydrophobic admixture precursor, according to one embodiment of the present disclosure.

FIG. 16 shows a spectrum 1600 obtained via FTIR spectroscopy performed on the hydrophobic admixture precursor composition represented in FIGS. 5 and 12.

The matched compound was titanium dioxide-coated mica platelets (flamenco gold 100). The peak around 700 $cm^{-1}$ corresponds to Ti—O—Ti bond vibrations present in titanium dioxide nanoparticles. The peaks at 1000 $cm^{-1}$ and 3650 $cm^{-1}$ correspond to mica or halloysite; both of them are types of clay. More specifically, the peak at 1000 $cm^{-1}$ corresponds to Si—O and Si═O bond vibrations in clay (e.g., mica, halloysite). A shorter peak around 900 $cm^{-1}$ corresponds to Al—OH bond vibrations present in mica ($X_2Y_{4-6}Z_8O_{20}(OH,F)_4$, where X═Na, K, or Ca, Y═Al, Mg, or Fe, Z═Si or Al) and halloysite ($Al_2Si_2O_5(OH)_4$). Although no graphite peaks are visible in IR spectrum, small peaks are visible in the figures below due to other oxygen or hydrogen groups attached on the surface. A peak around 1700 $cm^{-1}$, although small, is related to C═O bonds on the graphite surface. The single peak around 1250 $cm^{-1}$ is due to C—O—C bond vibrations in CO2. A peak around 1100 $cm^{-1}$ is due to C—O bonds on graphite surface. Another slight peak around 1400 $cm^{-1}$ corresponds to C—H bond vibrations on graphite surface.

Figure 17:
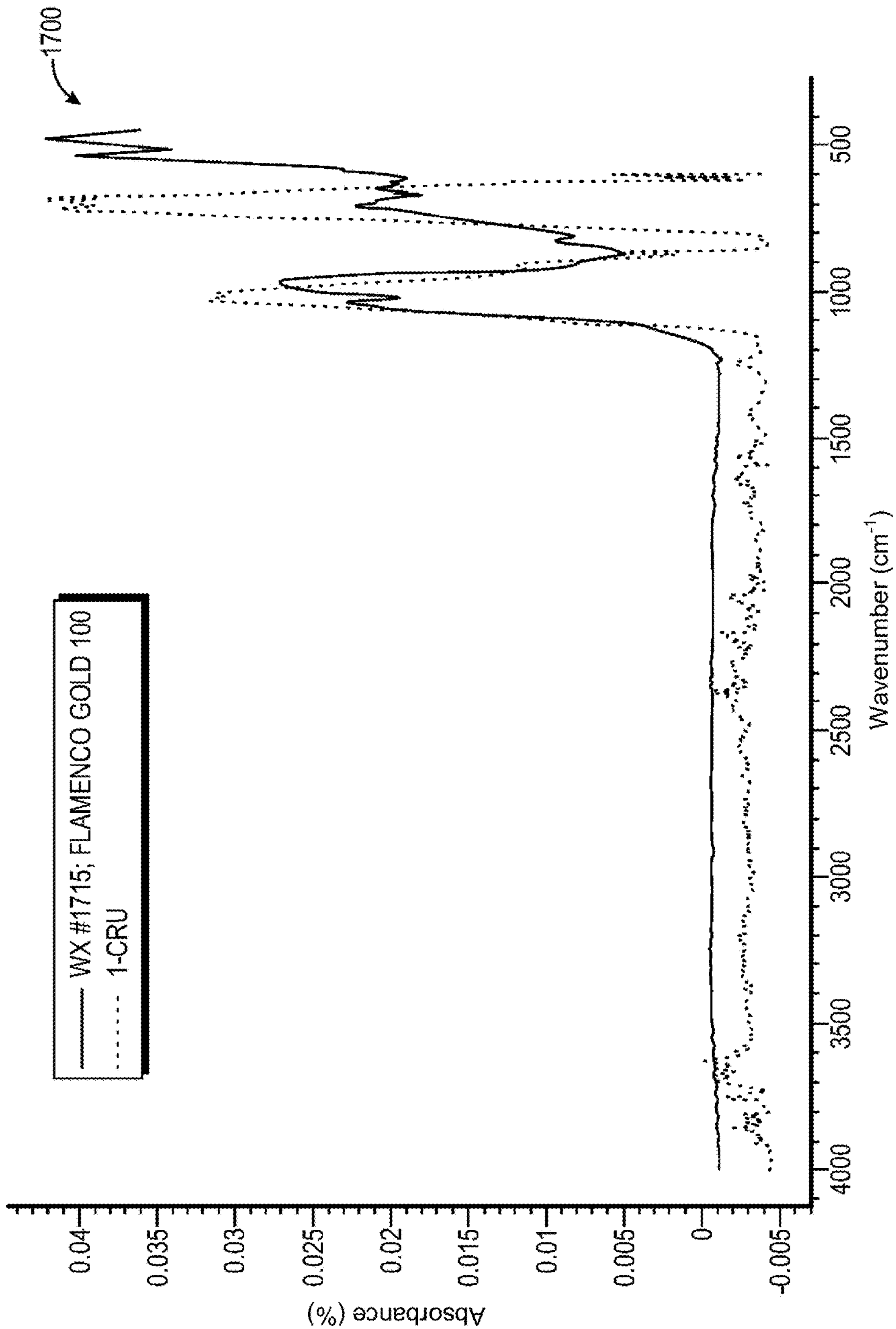
FIG. 17 shows an exemplary spectrum of FTIR spectroscopy performed on a hydrophobic admixture precursor, according to one embodiment of the present disclosure.

FIG. 17 shows a spectrum 1700 obtained via FTIR spectroscopy performed on the hydrophobic admixture precursor composition of an exemplary hydrophobic admixture precursor represented in FIGS. 6 and 13. The software used in the analysis also identified the compound as titanium dioxide-coated platelets (e.g., flamenco gold 100). The same peaks shown in the spectrum 1600 of FIG. 16 are visible in the spectrum 1700.

Figure 18:
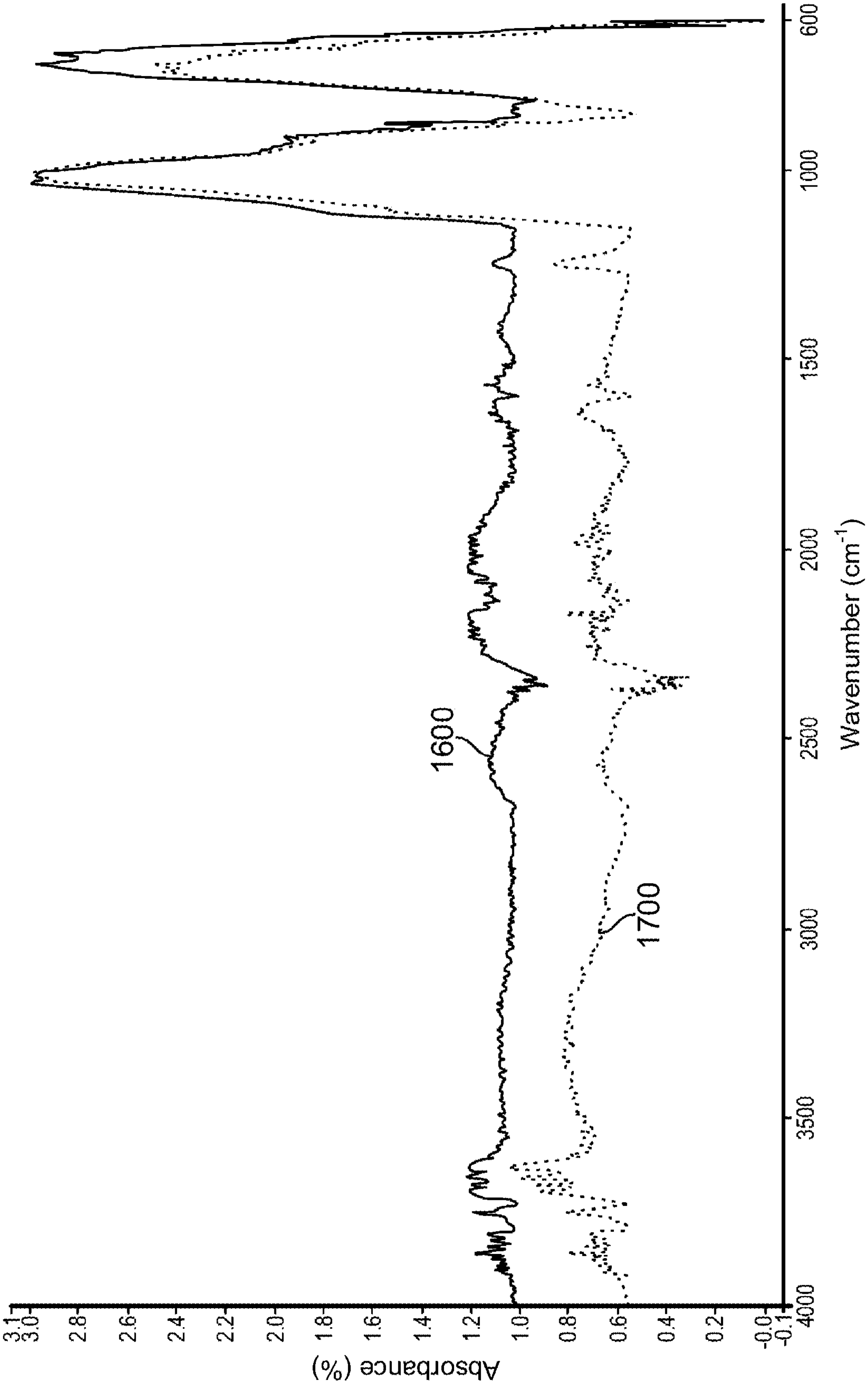
FIG. 18 shows an overlay of exemplary FTIR spectra from two hydrophobic admixture precursors, according to one embodiment of the present disclosure.
Figure 19:
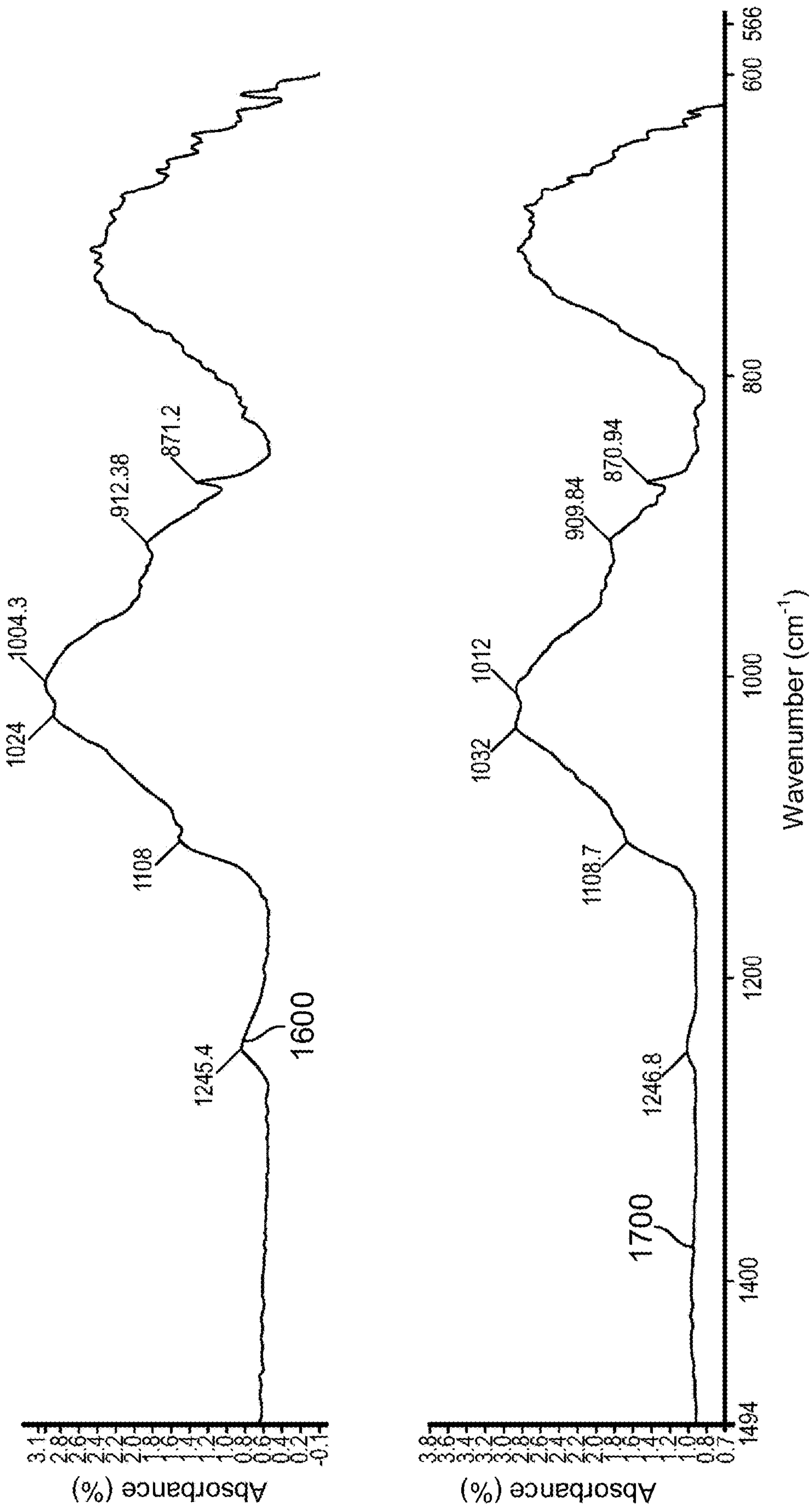
FIG. 19 shows an overlay of exemplary FTIR spectra from two hydrophobic admixture precursors, according to one embodiment of the present disclosure.

FIGS. 18-19 show respective overlays of the spectra 1600, 1700 on the same chart, including, in FIG. 19, zoomed in spectra for wavenumber range of 600-1500 $cm^{-1}$. The peaks near 900 $cm^{-1}$ (e.g., Al—OH), 1100 $cm^{-1}$ (e.g., C—O), and 1250 $cm^{-1}$ (e.g., C—O—C) are more clearly visible in FIG. 19, confirming what was previously analyzed for the sample represented in FIGS. 5, 12, and 16. The peak corresponding to the Ti—O—C bond vibration (e.g., ~800 $cm^{-1}$) is not visible in the spectrum for the sample represented in FIGS. 6, 13, and 17, which would be expected if bond formation between titanium dioxide and graphite occurs during the microwave heating. However, other scientific sources indicate that other peaks between 500-700 $cm^{-1}$ correspond to Ti—O bonds with a graphitic surface. Additionally, a redshift or band broadening in a Ti—O peak also indicates recombination of Ti—O—Ti with Ti—O—C. In various embodiments and as shown, the peak near 700 $cm^{-1}$ does in fact shift slightly to a lower wavenumber (e.g., redshifting), indicating bonding interaction between the titanium dioxide and graphite surface.

FIG. 20 shows a spectrum 2000 obtained via FTIR spectroscopy performed on the hydrophobic admixture precursor composition of an exemplary hydrophobic admixture precursor represented in FIGS. 10 and 14.

FIG. 21 shows a spectrum 2100 obtained via FTIR spectroscopy performed on the hydrophobic admixture precursor composition of an exemplary hydrophobic admixture precursor represented in FIGS. 11 and 15.

The FTIR spectrum 2000 shown in FIGS. 20-21 corresponds to sample DP-03 shown and described herein. The spectra 2000 demonstrates that the addition of calcium and magnesium carbonates clearly changes and dominates the spectrum due to the high crystallinity and vibrations of $CaCO_3$ and $CaMg(CO_3)_2$. The peaks near 2500, 1800, 1400, 900, and 700 $cm^{-1}$ all correspond to bond vibrations in calcite; however, calcite shares the peaks near 2500, 1800, 900, and 700 $cm^{-1}$ with dolomite. The peak near 1400 $cm^{-1}$ that appears in calcite is slightly blue shifted in dolomite to 1410 $cm^{-1}$. In various embodiments, the spectra 2000 confirms the presence of dolomite in the sample represented by FIGS. 10, 14. The double peak near 2900 $cm^{-1}$ and 2850 $cm^{-1}$ in the spectra 2000, 2001 corresponds to low-magnesium calcite and dolomite, respectively. The small peak near 1000 $cm^{-1}$ corresponds to halloysite, as discussed previously. The double peak at and near 700 $cm^{-1}$ is due to titanium dioxide as well as calcite and dolomite vibrations. The other vibrations related to oxygen and hydrogen groups on graphite surface are shallow or overlap with other carbonate (C—O) vibrations originating from calcite and dolomite.

There are some slight differences between the spectra 2000, 2001, such as, for example, slight broadening of the peak near 1400 $cm^{-1}$, the shortening of the peaks near 2900, 2850, 1570, and 1540 $cm^{-1}$, and the broadening of the band between 600-700 $cm^{-1}$. Broadening of the peak near 1400 $cm^{-1}$ is due to bonding between the carbonate powders. The shortening of the peaks near 2900 $cm^{-1}$ and 2850 $cm^{-1}$ corresponds to the bonding of the calcite and dolomite. This makes the peaks belonging to low-magnesium calcite (e.g., 2900 $cm^{-1}$) and dolomite (e.g., 2850 $cm^{-1}$) less visible; however, the peak near 2500 $cm^{-1}$ (e.g., which is due to high-magnesium calcite) remains unchanged. These changes hint at an interaction between calcium and magnesium carbonates due to the microwave heating. The band broadening at 600-700 $cm^{-1}$ is due to titanium dioxide bonding with carbon (Ti—O—C), as observed in the previous microwave heating process, which indicates a continuation of the bonding started earlier in the process.

FIG. 22 shows a Fourier-transform infrared (FTIR) spectrum 2200 of an exemplary hydrophobic admixture precursor, calcium stearate.

Figure 23:
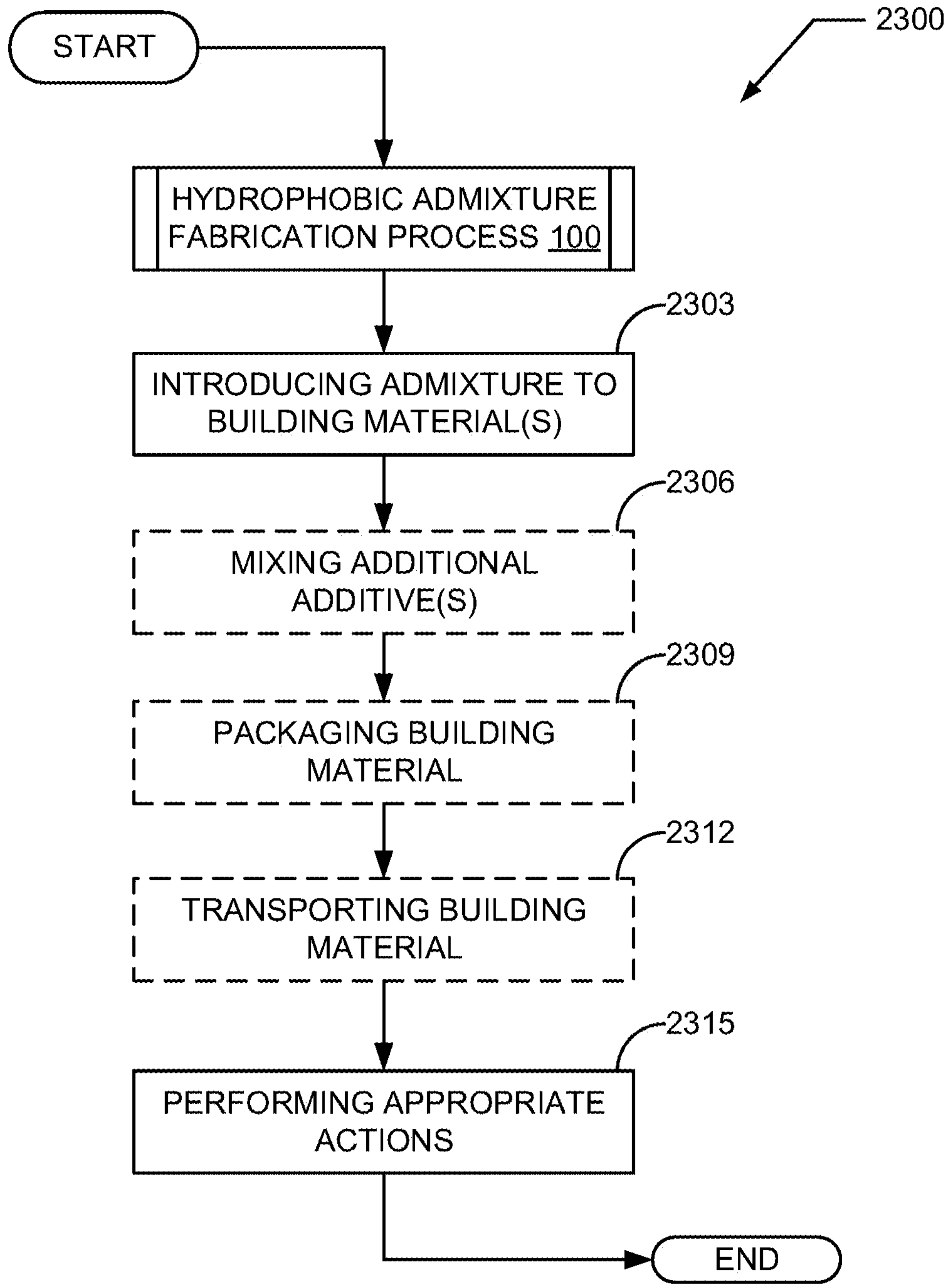
FIG. 23 shows a flowchart of an exemplary building material fabrication process, according to one embodiment of the present disclosure.

FIG. 23 shows a flowchart of an exemplary building material fabrication process 2300.

The process 2300 can include performing one or more hydrophobic admixture fabrication processes, such as an embodiment of the process 100 shown in FIG. 1A and described herein. In some embodiments, the hydrophobic admixture produced via the process 100 may be packaged into predetermined quantities. For example, a 50 kg quantity of hydrophobic admixture may be divided into packaged into 1 kg sealed containers. In this example, each 1 kg container may be used to treat 50 kg of a building material, such as concrete.

At step 2303, the process 2300 includes introducing the hydrophobic admixture to one or more building materials. The building materials can include, but are not limited to, concrete, cement, mortar, aggregate mixes, stucco, drywall, ferrock, cellulose-based concrete (e.g., timbercrete), fly ash-based concrete (e.g., ashcrete), sand-based concrete (e.g., finite), polystyrene, latex, acrylic latex, polyurethane, or one or more precursor ingredients thereof. The building material can be in a solid, semi-solid, liquid, or gaseous form.

Introducing the hydrophobic admixture to the building material can include depositing the hydrophobic admixture into the building material, or vice versa. Introducing the hydrophobic admixture can include stirring, mixing, and/or blending the building material and the hydrophobic admixture to ensure sufficient dispersion throughout. The hydrophobic admixture can be introduced during the production of the building material. For example, during mixing of mortar, the hydrophobic admixture can be mixed with other dry ingredients, such as fine sand and lime. Continuing the example, a sufficient water portion can be introduced to the dry mixture to form additive-treated mortar. Mixing of the hydrophobic admixture with the building material, or precursor(s) thereof, can occur for any suitable time period and number of repetitions. In one example, a mixer truck holds 1000 kg of cement. In this example, 20 kilogram (kg) of the hydrophobic admixture may be added to the mixer truck and mixed for about 3-5 minutes, or any suitable period, to ensure sufficient distribution and incorporation.

The wt. % of the hydrophobic admixture post-mixing can be at least about 5%, about 5-50%, or less than about 50%. For example, the wt. % can be about 2%. The 10 wt. % can be based on a particular building material (e.g., or class thereof) with which the hydrophobic admixture will be mixed. For example, the wt. % may be about 5-10% when mixing with American Portland cement and about 2-5% when mixing with Brazilian cement.

In various embodiments, a dry powder mass:liquid volume ratio between the hydrophobic admixture and the building material is between about 1:2 and 1:10. The hydrophobic admixture 300 can be mixed, in suitable quantities, with building materials in liquid or semi-liquid form (e.g., polystyrene, styrene, polyurethane, latex, acrylic latex, etc.) to form a hydrophobic compound. In one example, a compound (e.g., hydrophobic polystyrene) can be formed by mixing 300 grams of the hydrophobic admixture 300 with 1 L of polystyrene (e.g., or another suitable quantity of the building material with the ratio range 1:2 and 1:10). In another example, 500 grams of the hydrophobic admixture 300 can be mixed with 1 L of acrylic latex to form a compound (e.g., hydrophobic acrylic latex). In another example, 600 grams of the hydrophobic admixture 300 is mixed with 1 L of polyurethane to form a compound (e.g., hydrophobic polyurethane).

At step 2306, the process 2300 includes introducing one or more additives to the additive-treated building material. Non-limiting of additives include dyes, indicators, performance strengthening-materials, or other suitable agents. In one example, to improve tensile strength, carbon nanotubes are introduced to an additive-treated concrete mixture.

At step 2309, the process 2300 includes packaging the additive-treated building material, or one or more precursors thereof. The hydrophobic admixture can be introduced to one or more dry ingredients of a building material. The hydrophobic admixture-treated dry ingredient(s) may be packaged in a suitable container for later use. In some embodiments, the introduction of the hydrophobic admixture to dry precursors of a building material can advantageously render the precursors more water resistant or waterproof (e.g., which may improve stability of the materials during storage and transport). In one example, 1 kg of hydrophobic admixture is introduced to 50 kg of dry concrete mix. Continuing the example, the hydrophobic admixture-treated concrete mix is sealed in a container for storage and transportation.

At step 2312, the process 2300 includes transporting the building material. Transportation can include vehicular transportation (e.g., transporting into a vehicle and transporting via the vehicle), pumping the building material (e.g., from a mixture vessel to a desired target site), or releasing the building material (e.g., via pouring or dumping the building material from a mixture vessel).

At step 2315, the process 2300 includes performing one or more appropriate actions including, but not limited to, deploying the building material to a target site (e.g., via pumping, pouring, etc.), forming the building material into one or more desired shapes (e.g., molding and casting), and installing the building material at the target site (e.g., orientating and securing a building material shape at the target site).

Figure 24:
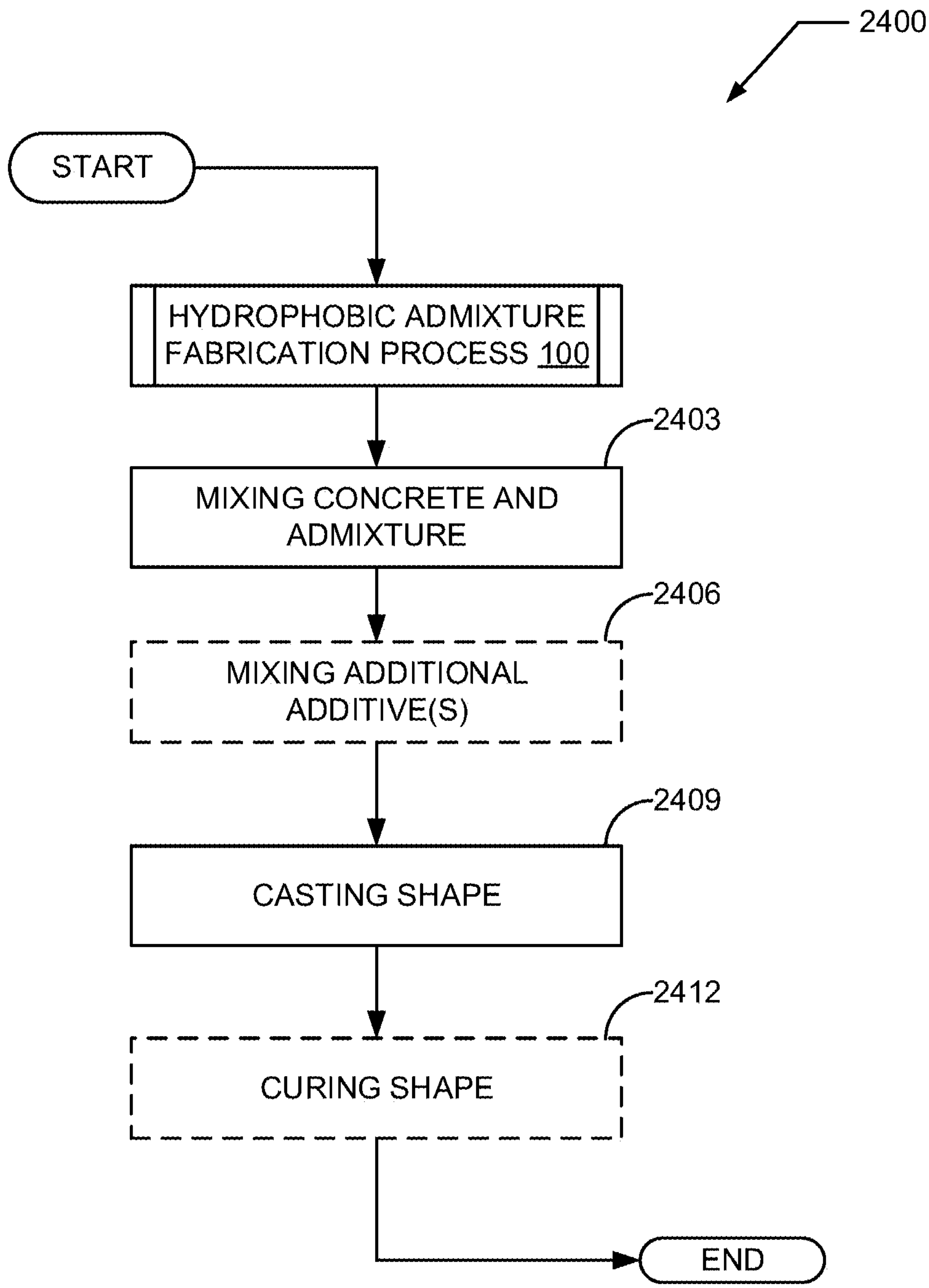
FIG. 24 shows a flowchart of an exemplary concrete fabrication process, according to one embodiment of the present disclosure.

FIG. 24 shows a flowchart of an exemplary concrete fabrication process 2400.

The process 2400 can include performing one or more hydrophobic admixture fabrication processes, such as an embodiment of the process 100 shown in FIG. 1A and described herein.

At step 2403, the process includes mixing the hydrophobic admixture with concrete (e.g., dry aggregate and cement). The hydrophobic admixture can be mixed with dry concrete ingredients or wetted concrete mix. In one example, a 50 kg bag of concrete is unsealed and deposited into a dry mixing vessel. Continuing the example, 1 kg of additive is added into the dry mixing vessel prior to introduction of a sufficient aqueous component. In some embodiments, the hydrophobic admixture is mixed with concrete ingredients in the presence of an aqueous component. In an exemplary scenario, a mixing truck holding 1000 kg of cement and a sufficient quantity of aggregate is parked next to a worksite. To perform mixing, a 20 kg bag of hydrophobic admixture is introduced to the mixing truck.

The concrete and hydrophobic admixture can be mixed via any suitable manual or mechanized method. The mixing can occur for a predetermined period of about 3-5 minutes, 5-10 minutes, 10-15 minutes, or any suitable interval. In at least one embodiment, during mixing, the concrete and hydrophobic admixture blend are maintained at a temperature of at least 4 degrees Celsius. In some embodiments, mixing the concrete and hydrophobic admixture includes measuring a temperature of the concrete prior to, during, and/or after mixing and verifying that the temperature meets a predetermined threshold.

For ready-mix concrete, the hydrophobic admixture can be mixed with cement in a plant for 3-5 minutes, 3-5 minutes, 5-10 minutes, 10-15 minutes, or any suitable time period. Aggregates, sand, gravel, and/or water can be mixed into the plant. The concrete mixture can be poured into a mixing vessel (e.g., a mixing truck) and further mixed for at least 5 minutes to ensure even distribution of the hydrophobic admixture throughout the concrete.

For precast concrete mixing plants, the hydrophobic admixture can be mixed with cement for 2-3 minutes, 3-5 minutes, 5-10 minutes, 10-15 minutes, or any suitable time period, prior to adding the cement to aggregate and water (e.g., and, in some embodiments, performing further mixing to ensure even distribution). In one or more embodiments, the mixing times described herein are increased or decreased based on the efficiency of the machinery and processes by which mixing is performed.

Mixing the hydrophobic admixture and the concrete can include confirming (e.g., by visual or other suitable means) that the hydrophobic admixture is homogenously distributed throughout the concrete. In various embodiments, to avoid lump formation and poor dispersion, the hydrophobic admixture is never added directly to a water (e.g., water may be introduced to the hydrophobic admixture during mixing with non-aqueous ingredients).

At step 2406, the process includes mixing one or more additives into the hydrophobic admixture-treated concrete. Non-limiting examples of additives include air-entraining admixtures, other water- or other compound-reducing admixtures, retarding admixtures, accelerating admixtures, plasticizers, superplasticizers, and strengthening agents, such as carbon nanotubes or graphene.

At step 2409, the process includes casting the hydrophobic admixture-treated concrete into one or more desired shapes. Casting can be performed via any suitable technique, such as pouring the concrete into a mold and/or over a substructure, such as a steel lattice. Casting the concrete can include smoothing the concrete via suitable means (e.g., smoothing planes, etc.). Casting the concrete can include removing air bubbles, water bubbles, and other voids via suitable means (e.g., rakes, vibratory mechanisms, etc.).

At step 2412, the process includes curing the shape. Curing the shape can include allowing the shape to rest undisturbed for a predetermined time period. Parameters of curing can be based on the particular concrete mix used. The hydrophobic admixtures described herein may lack a requirement for curing post-mix unless hot and humid or extreme weather conditions are present (e.g., post-mix curing may be dictated by the building material to which the hydrophobic admixture is introduced). When hot and humid conditions, heavy rain, or snow are present, light misting with water about 24 hours post-cast may ensure controlled curing.

Hardening time of concrete treated with the present hydrophobic admixtures is not affected by the mineral composition of the hydrophobic admixture used. In at least one embodiment, once treated with the hydrophobic admixture, hardening time of the concrete is unaffected by concrete temperature and weather conditions. As shown and described herein, hydrophobic admixture-treated concrete can develop higher endurance limit as compared to untreated concrete.

Figure 25:
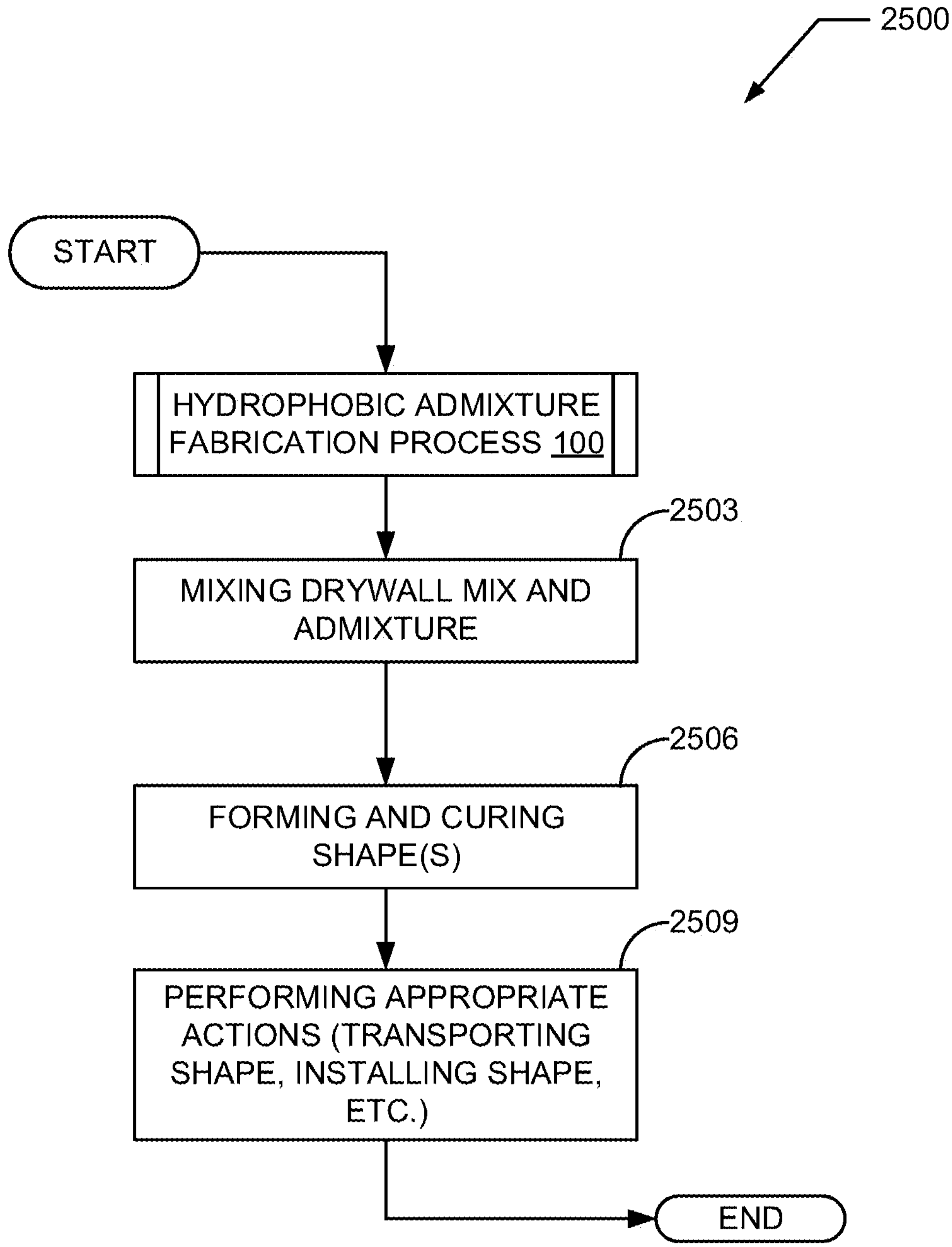
FIG. 25 shows a flowchart of an exemplary drywall fabrication process, according to one embodiment of the present disclosure.

FIG. 25 shows a flowchart of an exemplary drywall fabrication process 2500.

The process 2500 can include performing one or more hydrophobic admixture fabrication processes, such as an embodiment of the process 100 shown in FIG. 1A and described herein.

At step 2503, the process 2500 includes mixing the hydrophobic admixture with a drywall mix. Mixing the hydrophobic admixture and drywall mix can include combining the hydrophobic admixture with one or more drywall precursors, such as gypsum, gypsum stucco, wood fiber, wood pulp, cement, soap or other void-producing agents, and setting accelerators. Mixing can be performed via any suitable method. The hydrophobic admixture can be introduced to the drywall precursor(s) prior to introduction of water or other aqueous ingredients.

At step 2506, the process 2500 includes forming and curing the drywall in one or more desired shapes. The hydrophobic admixture-treated drywall can be formed into sheets and cured under suitable high temperature conditions.

At step 2509, the process 2500 includes performing one or more appropriate actions, such as, for example, cutting the hydrophobic admixture-treated drywall shapes into secondary shapes, packaging the drywall shapes, transporting the drywall shapes, or installing the drywall shapes at a target site. In various embodiments, the hydrophobic admixture-treated drywall demonstrates reduced flammability as compared to untreated drywall (e.g., untreated drywall may burn faster and more readily as compared to hydrophobic admixture-treated drywall).

Additional Exemplary Experimental Results

The following section describes one or more experimental tests, and results thereof, performed on one or more embodiments of the present hydrophobic admixture. The descriptions therein are provided for the purposes of illustrating various elements of the hydrophobic admixture (e.g., as observed in the one or more embodiments). All descriptions, embodiments, and the like are exemplary in nature and place no limitations on any embodiment described, or anticipated, herein or otherwise.

Concrete samples formed from cement mixtures with and without an embodiment of the present hydrophobic admixture were tested to identify and contrast their various properties. The hydrophobic admixture analyzed may correspond to the hydrophobic admixture 130 shown in FIG. 1B and described herein. To evaluate endurance limit, six cement samples were prepared. Three of the six concrete samples incorporated an embodiment of the present hydrophobic admixture during mixing, and the remaining three samples excluded the hydrophobic admixture. The concrete mixture of the samples included a standard Brazilian cement mixture, natural sand, artificial sand, two types of gravel, and water. The samples demonstrated dimensions of 100×200 mm. The endurance of the samples was tested post-molding over a 28-day timespan (63 days for the hydrophobic admixture-comprising samples). Table 2 shows exemplary results of the endurance limit tests. As shown in Table 2, the hydrophobic admixture did not result in any detectable losses in endurance limit of the concrete. As shown in Table 2, the hydrophobic admixture-treated concrete may demonstrate a superior endurance limit as compared to an untreated concrete.

TABLE 2

Exemplary Endurance Test Results

| | Endurance Limit (MPa) | |
|---|---|---|
| Time (Days) | Treated Samples | Untreated Samples |
| 1 | 2.7 | 2.6 |
| 3 | 8.6-8.8 | 6.2-6.7 |
| 7 | 16.3-16.8 | 13.0-13.2 |
| 14 | 19.3-19.9 | 14.9-15.6 |
| 28 | 27.1-28.3 | 19.9-21.6 |
| 63 | 30.0-30.1 | — |

Tables 3-4 shows exemplary results of tests for determining the effect of the hydrophobic admixture on capillary rise and capillary absorption experienced by concrete samples. To evaluate capillary rise and capillary absorption, six concrete samples were prepared. Three of the six concrete samples incorporated an embodiment of the present hydrophobic admixture during mixing, and the remaining three samples excluded the hydrophobic admixture. Over the time series indicated in Table 4, a single face of each sample was immersed in water to precipitate capillary phenomena. According to one embodiment, capillary rise represents the delta in water level via capillary action as a material is exposed to the water surface (e.g., thereby indicating the level of capillary intrusion into the material). In various embodiments, capillary absorption measures the intrusion of water into a material via capillary action. In at least one embodiment, capillary absorption is based on capillary rise and the pre- and post-exposure mass of the sample. In at least one embodiment, greater capillary rise and/or capillary absorption may be indicative of a more porous and/or less hydrophobic material.

As shown in Table 3, the hydrophobic admixture-treated concrete demonstrated a lower capillary rise as com-pared to the untreated concrete. As shown in Table 4, the hydrophobic admixture-treated concrete demonstrated a lower capillary absorption as compared to the untreated concrete. In various embodiments, the experiments represented in Tables 3-4 indicate that the present hydrophobic admixture may reduce capillary infiltration in materials treated therewith.

TABLE 3

Exemplary Capillary Rise Results
Average Capillary Rise (cm)

| Treated Samples | Untreated Samples |
|---|---|
| 4.5 | 5.5 |
| 3.5 | 5.9 |
| 3.8 | 5.7 |

TABLE 4

Exemplary Capillary Absorption Results

| | Capillary Absorption (g/cm$^3$) | | | | | |
|---|---|---|---|---|---|---|
| | Treated Samples | | | Untreated Samples | | |
| Time (h) | 1 | 2 | 3 | 1 | 2 | 3 |
| 3 | 0.2 | 0.12 | 0.12 | 0.21 | 0.22 | 0.25 |
| 6 | 0.29 | 0.17 | 0.16 | 0.31 | 0.49 | 0.51 |
| 24 | 0.55 | 0.33 | 0.28 | 0.6 | 0.83 | 0.74 |
| 48 | 0.76 | 0.47 | 0.44 | 0.8 | 0.95 | 0.82 |
| 72 | 0.82 | 0.53 | 0.56 | 0.93 | 1.01 | 0.99 |

Table 5 shows exemplary results of tests for determining the effect of the hydrophobic admixture on water penetration experienced by concrete samples. To evaluate water penetration, six cylindrical concrete samples were prepared. Three of the six concrete samples incorporated an embodiment of the present hydrophobic admixture during mixing, and the remaining three samples excluded the hydrophobic admixture. As shown in Table 5, hydrophobic admixture-treated concrete samples demonstrated a lower level of water penetration as compared to untreated concrete samples.

TABLE 5

Exemplary Water Penetration Results

| | Water Penetration (mm) | |
|---|---|---|
| | Treated | Untreated |
| | 35 | 45 |
| | 40 | 40 |
| | 32 | 43 |
| Average | 39 | 43 |

Table 6 shows exemplary results of saturation, boiling, and mass measurement tests for determining absorption levels, void ratios, and porosities of hydrophobic admixture-treated and untreated concrete samples. Two hydrophobic admixture-treated samples and two untreated samples were evaluated. Table 6 reports averaged data from each sample set. As shown in Table 6, the treated samples demonstrated lower absorption, lower void prevalence, and lower porosity as compared to the untreated samples.

TABLE 6

| Exemplary Properties from Mass-Based Experiments | | |
|---|---|---|
| Property | Treated Average | Untreated Average |
| % Absorption After Immersion in Water at 23 degrees Celsius (+/−2 degrees) | 4.0 | 5.8 |
| % Absorption After Immersion in Water at 23 degrees Celsius (+/−2 degrees) and Boiling for 5 Hours | 4.9 | 6.1 |
| Void Ratio After Saturation in Water (%) | 9.1 | 13.1 |
| Void Ratio After Saturation and Boiling (%) | 11.3 | 13.9 |
| Specific Mass of Dry Sample (g) | 2.291 | 2.265 |
| Specific Mass of Sample After Saturation (g) | 2.382 | 2.398 |
| Specific Mass of Sample After Saturation and Boiling (g) | 2.404 | 2.403 |
| Effective Specific Mass (g) | 2.584 | 2.630 |
| % Porosity After Saturation | 9.3 | 11.6 |
| % Porosity After Saturation and Boiling | 10.2 | 12.2 |

Drywall mud samples formed from drywall mixtures with and without an embodiment of the present hydrophobic admixture were tested to identify and contrast their flammability. The hydrophobic admixture analyzed may correspond to the hydrophobic admixture 130 shown in FIG. 1B and described herein. Flammability can refer to the ease with which a substance ignites at ambient temperature. For example, flammability can refer to a time period required to ignite a material upon exposure to an ignition source, such as an open flame.

To evaluate flammability, two drywall mud samples were prepared. The first sample included 8 oz. of drywall mud mixed with 5 oz. of water and excluded the hydrophobic admixture. The second sample included 8 oz. of drywall mud mix, 5.5 oz. of water, and 0.8 oz. of an embodiment of the present hydrophobic admixture during mixing (e.g., 10% wt. of the of composition). Each drywall mud sample was spread across a respective cardboard base. Each cardboard sample was positioned at an angle of about 15 degrees to horizontal (e.g., to permit viewing of both sides of the cardboard). The untreated sample included a thickness of about 0.5 inches and the treated sample included a thickness of about 0.7 inches. In each sample trial, a propane torch was positioned perpendicular to the surface of the cardboard sample, ignited, and locked to gas open. Each sample trial measured the burn time required for the cardboard sample to combust on the surface opposite the flame-exposed surface. The impact of the hydrophobic admixture on flammability may correlate with the amount of time that passes before the flame reaches through the drywall mud sample and burns the cardboard beneath.

The untreated cardboard sample required 15 minutes in direct contact with the flame of the propane torch before the underside of the cardboard combusted. The treated cardboard sample required 27 minutes in direct contact with the flame before the underside of the cardboard combusted. The hydrophobic admixture-treated sample demonstrated a level of flame resistance 80% greater as compared to the untreated sample. The combustion temperature of each sample was about 800 degrees Celsius. The surface temperature of each sample at point of combustion was above 750 degrees Celsius. The dissimilar thickness of the samples (e.g., 40% greater in the treated sample) was not considered a sufficient factor for explaining the large difference in flame resistance. Based on the experimental results, the hydrophobic admixture significantly increased the flame resistance of the drywall mud mixture.

Figure 26B:
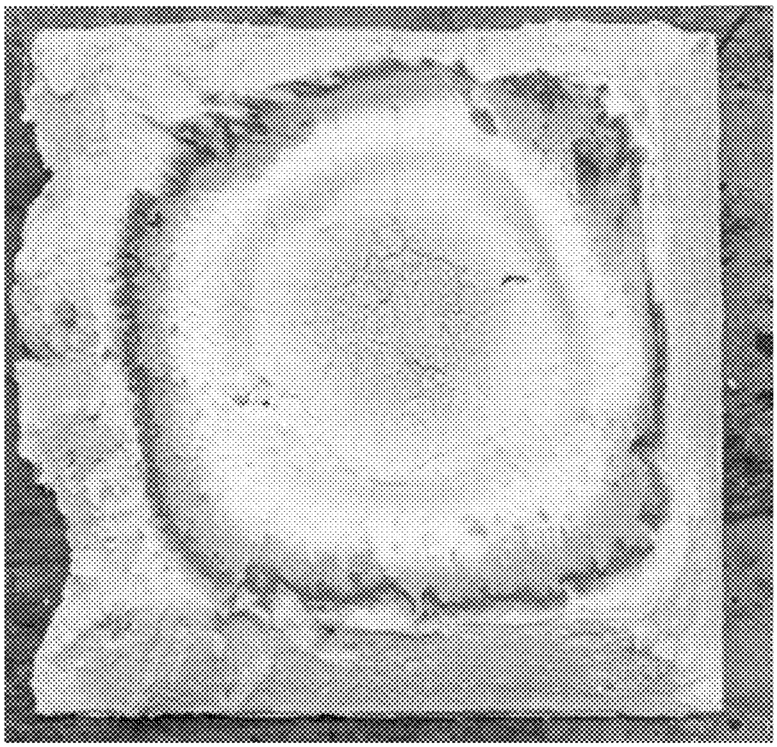
FIG. 26B shows an image of an exemplary drywall flammability test result, according to one embodiment the present disclosure.
Figure 26A:
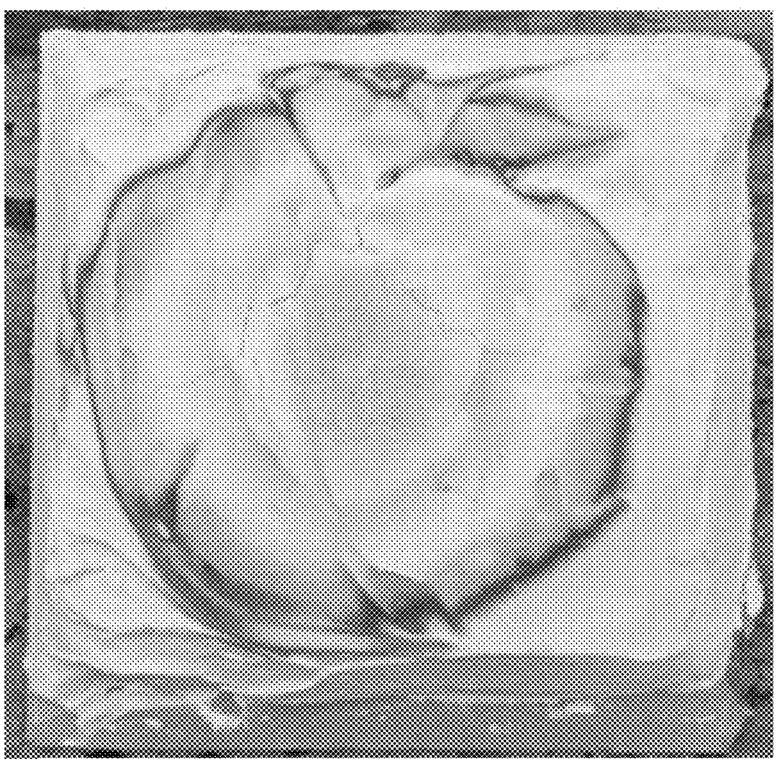
FIG. 26A shows an image of an exemplary drywall flammability test result, according to one embodiment of the present disclosure.

FIG. 26A shows an image 2600A of an exemplary drywall flammability test result. The sample show in the image 2600A can correspond to the flame-exposed side of the untreated drywall mud sample described herein. FIG. 26B shows an image 2600B of an exemplary drywall flammability test result. The sample shown in the image 2600B can correspond to the flame-exposed side of the treated drywall mud sample described herein.

Figure 27B:
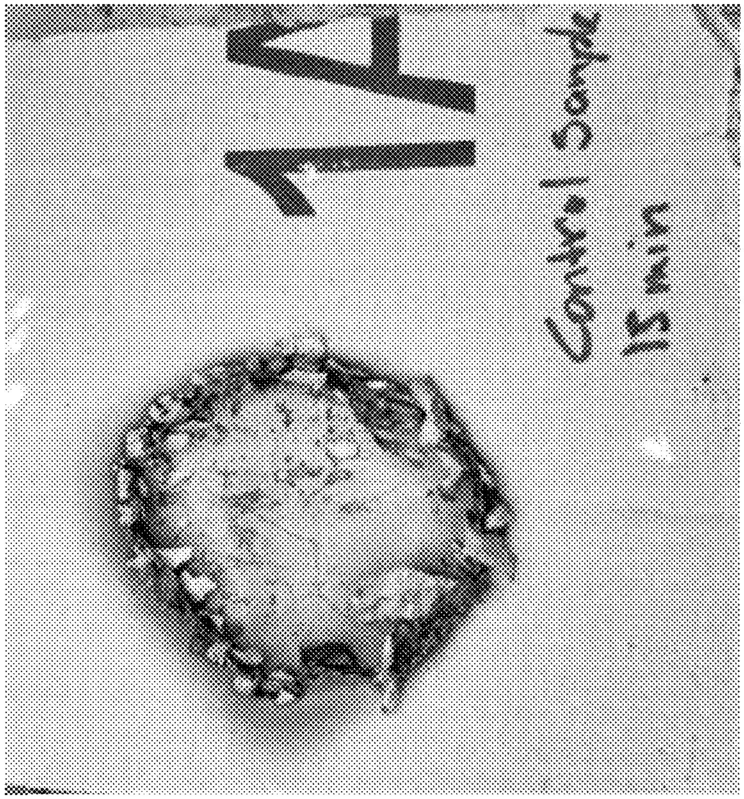
FIG. 27B shows an image of an exemplary drywall flammability test result, according to one embodiment of the present disclosure.
Figure 27A:
FIG. 27A shows an image of an exemplary drywall flammability test result, according to one embodiment of the present disclosure.

FIG. 27A shows an image 2700A of an exemplary drywall flammability test result. The sample show in the image 2700A can correspond to the opposing side of the untreated drywall mud sample shown in the image 2600A. FIG. 27B shows an image 2700B of an exemplary drywall flammability test result. The sample shown in the image 2700B can correspond to the opposing side of the treated drywall mud sample shown in the image 2600B. As demonstrated in the images 2600A, 2700A and the images 2600B, 2700B, the samples demonstrated similar burn patterns; however, the treated sample required 80% greater flame exposure time to undergo combustion, thereby demonstrating the flammability-reducing and/or flame resistance-increasing property of the hydrophobic admixture.

Drywall samples formed from drywall mixtures with and without an embodiment of the present hydrophobic admixture were tested to identify and contrast their water resistance. The hydrophobic admixture analyzed may correspond to the hydrophobic admixture 130 shown in FIG. 1B and described herein. Water resistance can refer to the ease with which water penetrates into a surface of a material. For example, water resistance can refer to a time period required to for a water droplet to be absorbed into a material.

To evaluate water resistance, two drywall samples were prepared. The first sample included commercial drywall powder and 10% of the drywall powder weight in an embodiment of the present hydrophobic admixture. The second sample included only the drywall powder. Each drywall sample was thoroughly mixed, poured into a mold, and compressed with a tamping instrument to form a uniform and level surface. The two sample surfaces were removed from the mold and three water droplets were deposited onto each sample.

Figure 28B:
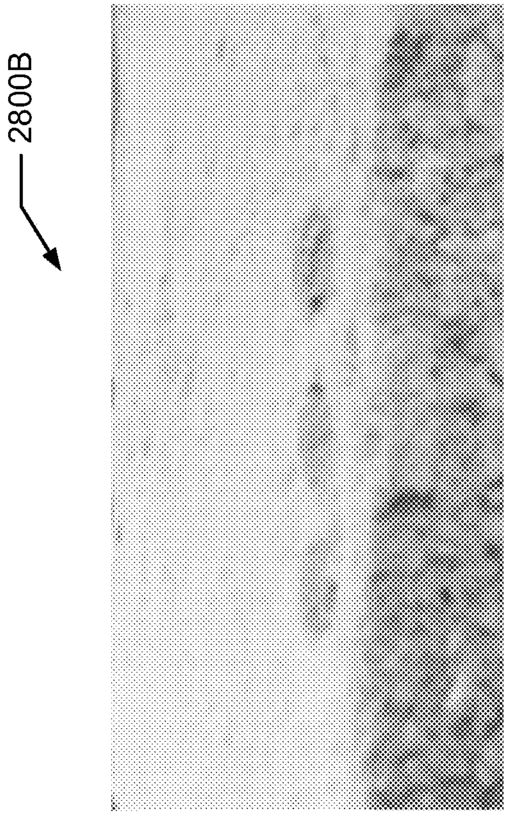
FIG. 28B shows an image of an exemplary drywall waterproofing test result, according to one embodiment of the present disclosure.
Figure 28A:
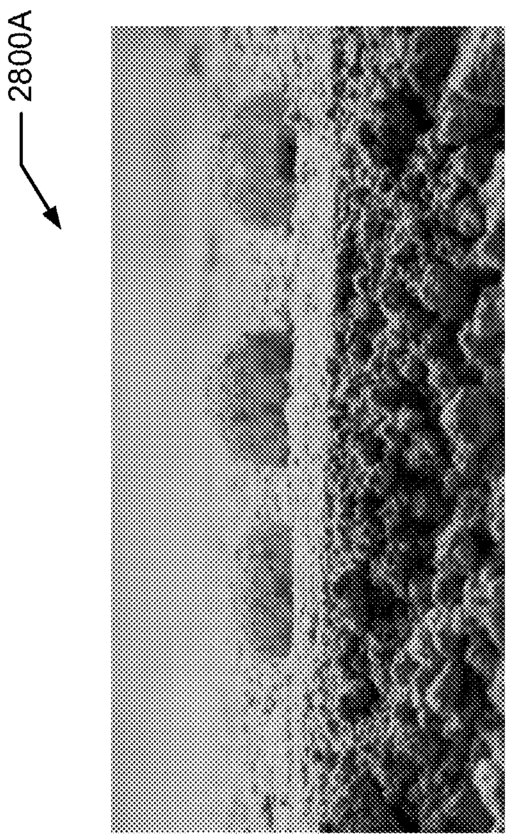
FIG. 28A shows an image of an exemplary drywall waterproofing test result, according to one embodiment of the present disclosure.

FIG. 28A shows an image 2800A of the first drywall sample.

FIG. 28B shows an image 2800B of the second drywall sample.

As demonstrated in the images 2800A, 2800B, the hydrophobic admixture-inclusive sample maintained the water droplets on the surface of the drywall (e.g., resisting absorption), whereas drywall-only sample immediately absorbed the water droplet into the drywall surface. For the hydrophobic admixture-inclusive sample the angles between the water droplet edges and the sample surface were measured using ImageJ software. According to one embodiment, a standard for characterizing a material as hydrophobic includes determining that the material demonstrates a contact angle greater than 90 degrees. The contact angles of the hydrophobic admixture-inclusive sample included 91.1 degrees, 113.2 degrees, 94.2 degrees, 95.1 degrees, 93.5 degrees, and 117.6 degrees. The hydrophobic admixture-inclusive sample demonstrated an average contact angle of 100.8 degrees, thereby demonstrating the hydrophobic properties of drywall treated with 10% wt. of the present hydrophobic admixture.

The hydrophobic admixture-inclusive sample was compared to a sample of a commercially available, water-resistant-advertised drywall sheet. Three water droplets were deposited onto the surface of the commercial drywall sample and the average contact angle therebetween measured 128.4 degrees. While the commercial sample demonstrated a greater average contact angle (e.g., greater hydrophobicity) as compared to the hydrophobic admixture-treated sample, the hydrophobic admixture-treated sample required a greater time period before the water droplets were absorbed into the sample surface (e.g., greater water resistance).

Figure 29:
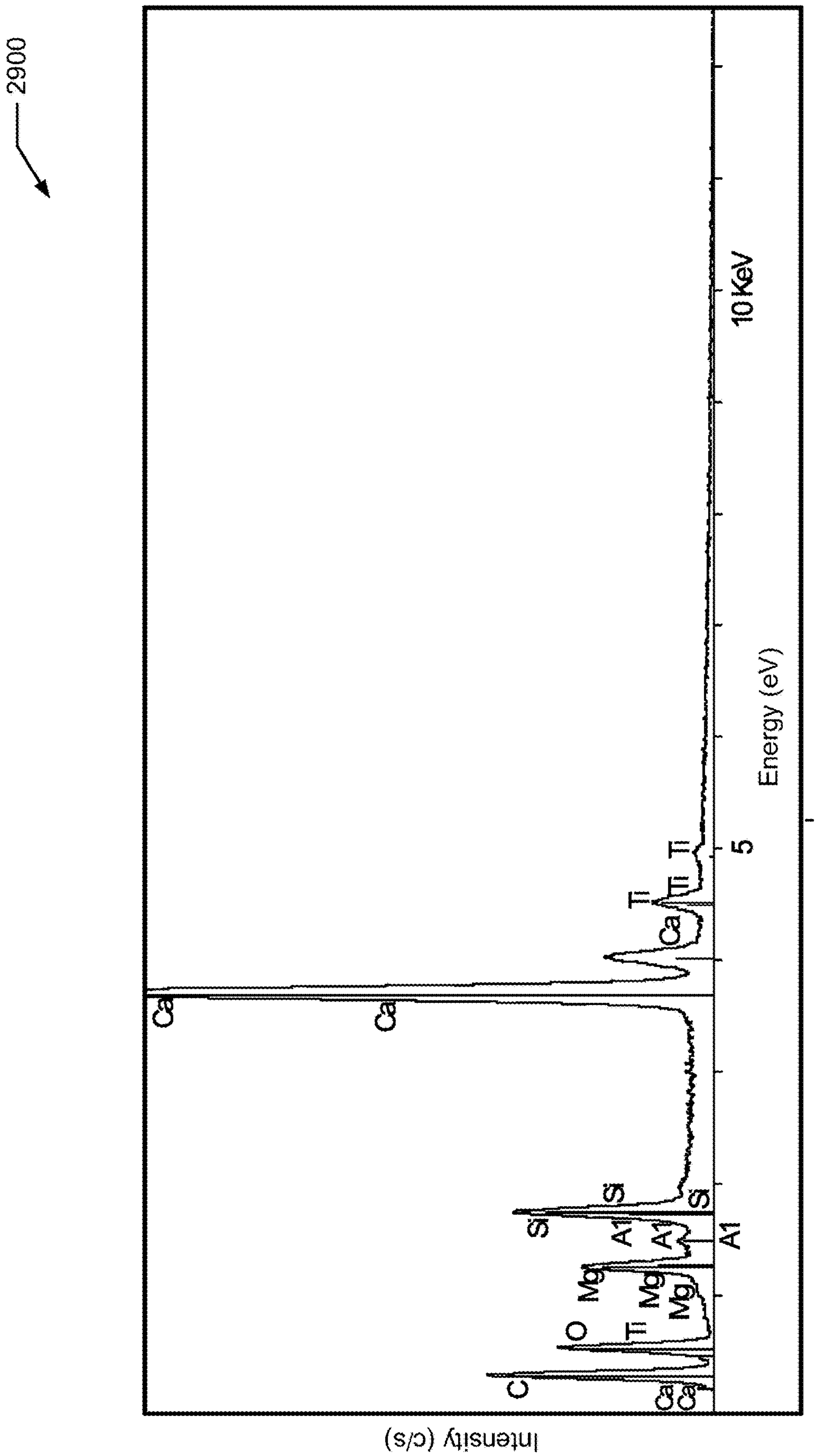
FIG. 29 shows a chart of exemplary EDS results obtained from EDS analysis of an exemplary hydrophobic admixture composition, according to one embodiment of the present disclosure.

FIG. 29 shows a chart 2900 of exemplary energy-dispersive X-ray spectroscopy (EDS) results obtained from EDS analysis of an exemplary hydrophobic admixture composition. As shown in Table 7, the EDS results provided a composition of the exemplary hydrophobic admixture. The EDS was performed at a takeoff angle of 50 degrees, for an elapsed live time of 90.0 seconds, and an acceleration voltage of 15.0 kV.

TABLE 7

Composition of an Exemplary Hydrophobic Admixture

| Element | Emission Line | Intensity (c/s) | Concentration | Units | |
|---|---|---|---|---|---|
| C | Ka | 98.73 | 62.08 | wt. % | |
| O | Ka | 77.04 | 14.55 | wt. % | |
| Mg | Ka | 71.70 | 1.73 | wt. % | |
| Al | Ka | 5.92 | 0.13 | wt. % | |
| Si | Ka | 114.93 | 2.32 | wt. % | |
| Ca | Ka | 574.98 | 17.38 | wt. % | |
| Ti | Ka | 40.23 | 1.81 | wt. % | |
| | | | 100.00 | wt. % | Total |

Figure 30:
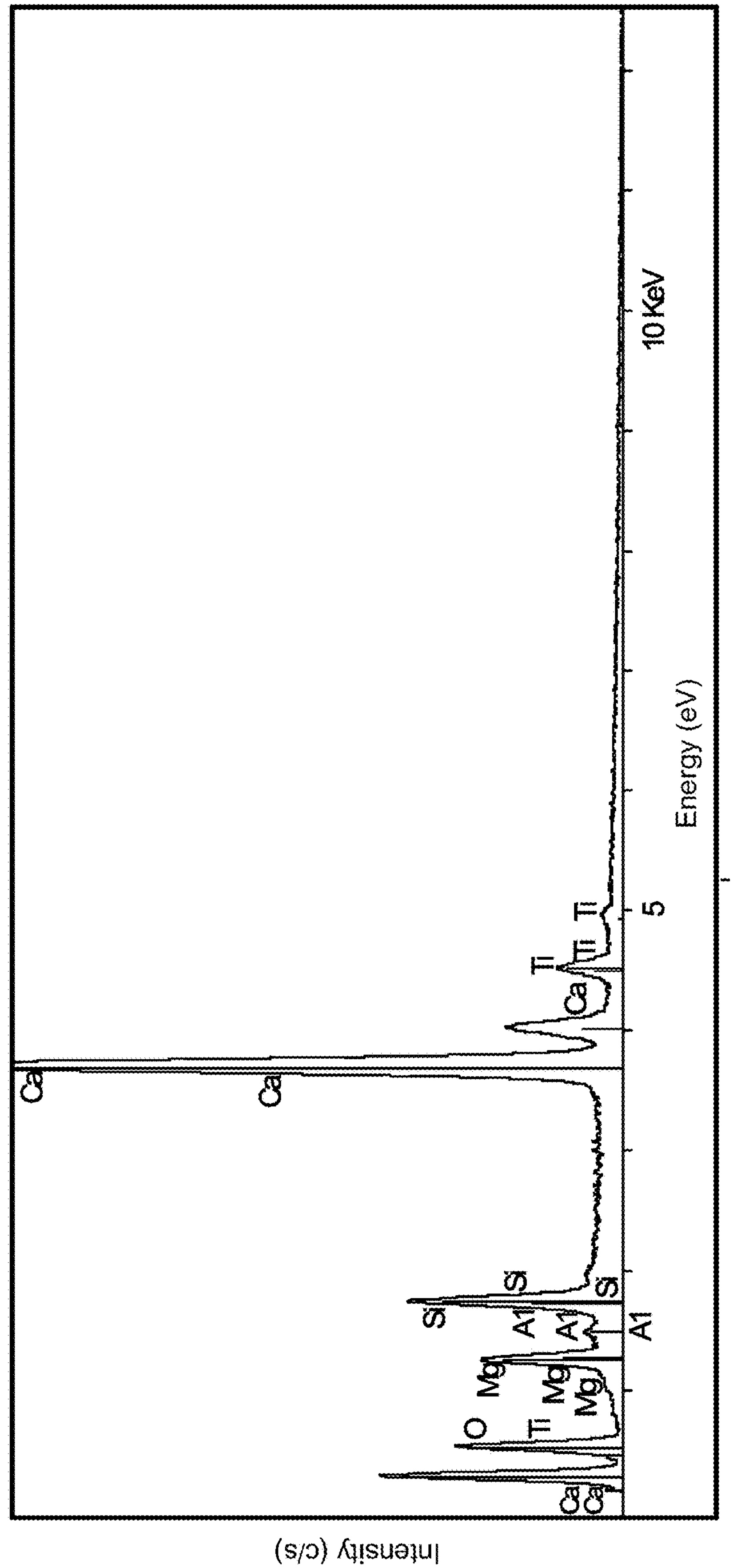
FIG. 30 shows a chart of exemplary EDS results obtained from EDS analysis of an exemplary hydrophobic admixture composition, according to one embodiment of the present disclosure.

FIG. 30 shows a chart 3000 of exemplary EDS results obtained from EDS analysis of an exemplary hydrophobic admixture composition. Table 8 provides a composition of the exemplary hydrophobic admixture, excluding a carbon component thereof. The EDS was performed at a takeoff angle of 40 degrees, for an elapsed live time of 90.0 seconds, and an acceleration voltage of 15.0 kV.

TABLE 8

Composition of an Exemplary Hydrophobic Admixture

| Element | Emission Line | Intensity (c/s) | Concentration | Units | |
|---|---|---|---|---|---|
| O | Ka | 76.99 | 35.80 | wt. % | |
| Mg | Ka | 71.70 | 5.29 | wt. % | |
| Al | Ka | 5.92 | 0.39 | wt. % | |
| Si | Ka | 114.93 | 6.77 | wt. % | |
| Ca | Ka | 574.98 | 46.69 | wt. % | |
| Ti | Ka | 40.23 | 5.06 | wt. % | |
| | | | 100.00 | wt. % | Total |

Figure 31:
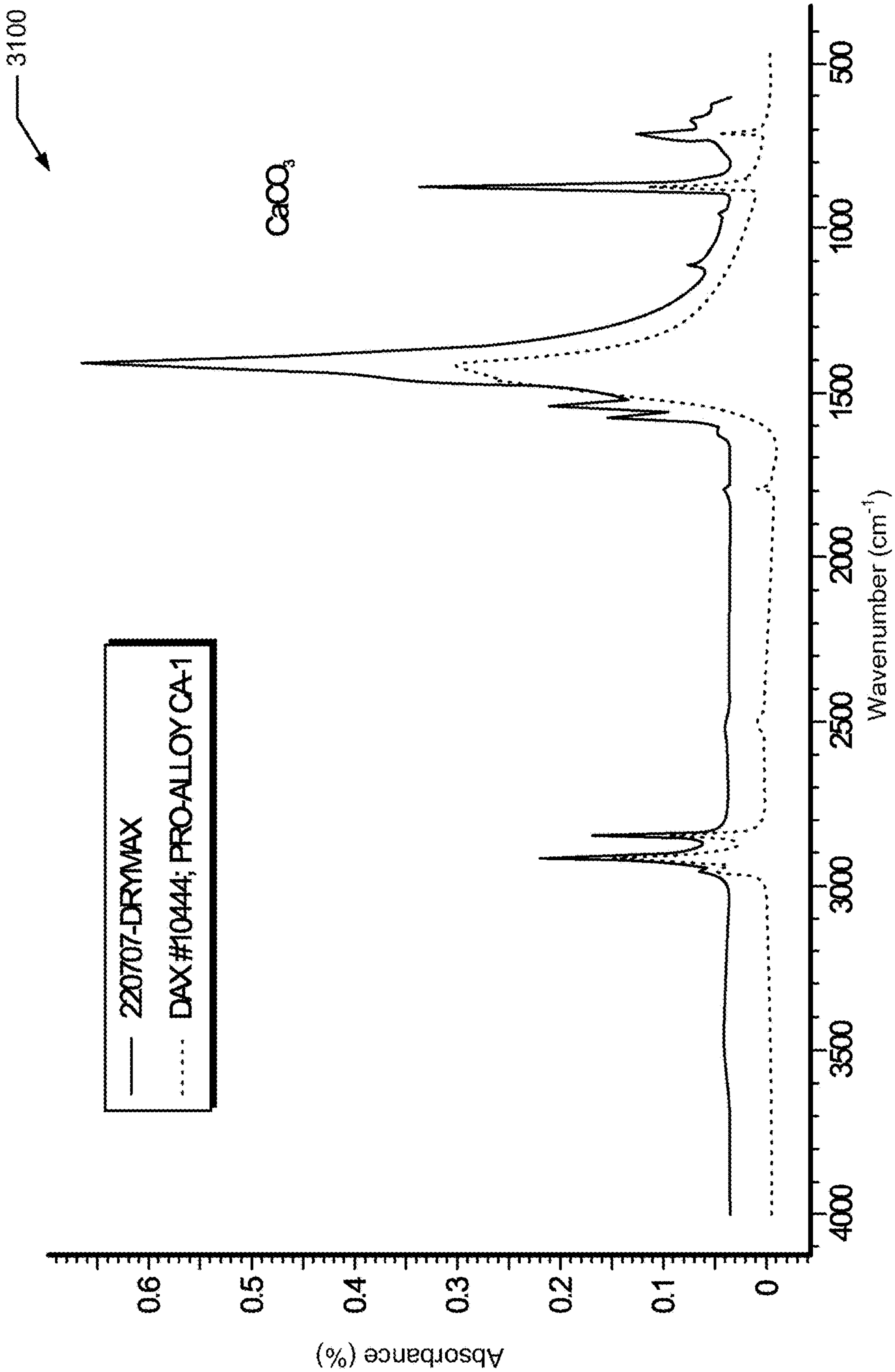
FIG. 31 shows an exemplary spectrum of FTIR spectroscopy performed on a hydrophobic admixture, according to one embodiment of the present disclosure.

FIG. 31 shows an exemplary spectrum 3100 of FTIR spectroscopy performed on a hydrophobic admixture.

Figure 32:
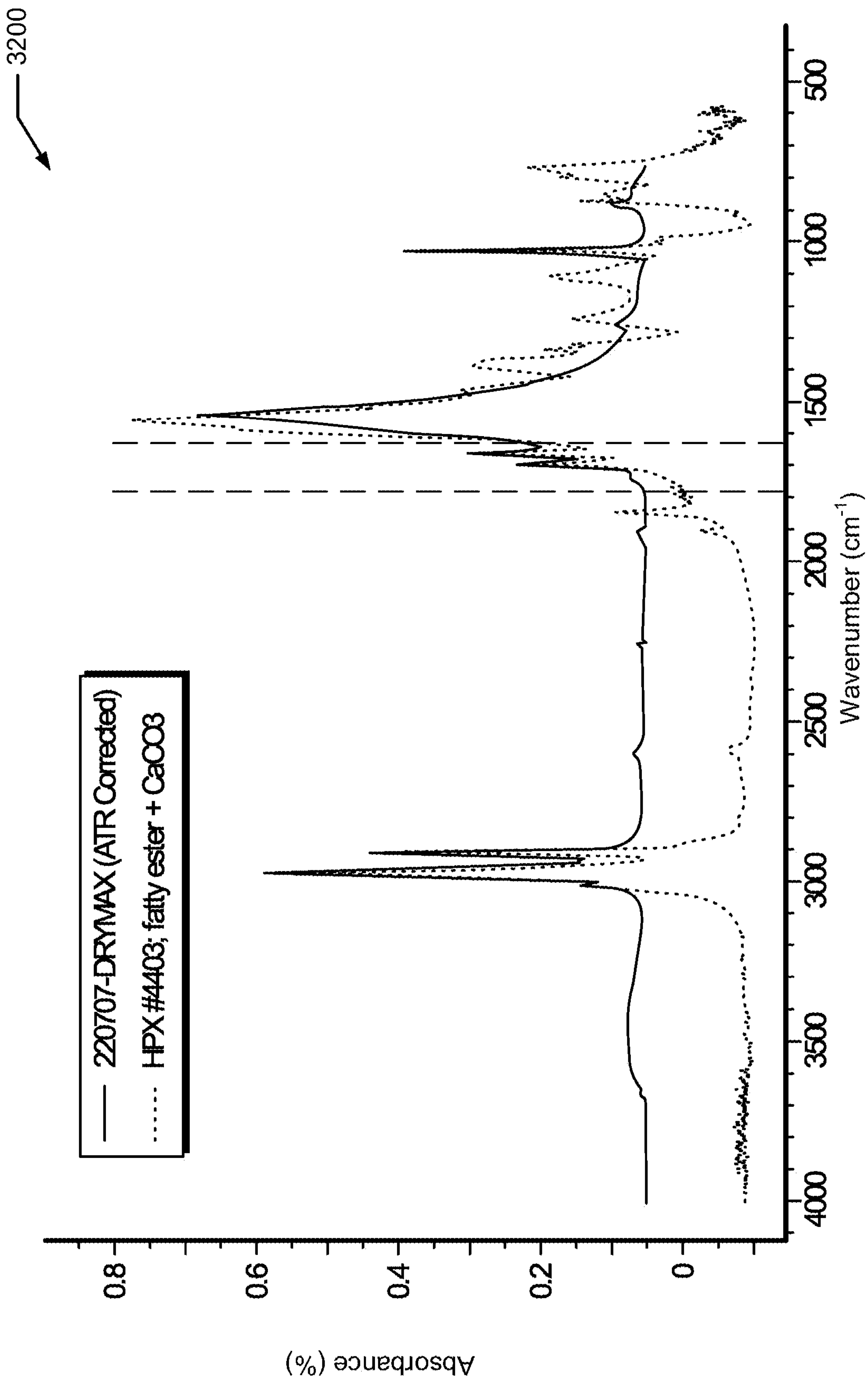
FIG. 32 shows an exemplary attenuated total reflectance (AFTR)-corrected spectrum of FTIR spectroscopy performed on a hydrophobic admixture, according to one embodiment of the present disclosure.

FIG. 32 shows an exemplary attenuated total reflectance (ATR)-corrected spectrum 3200 of FTIR spectroscopy performed on a hydrophobic admixture.

Figure 33:
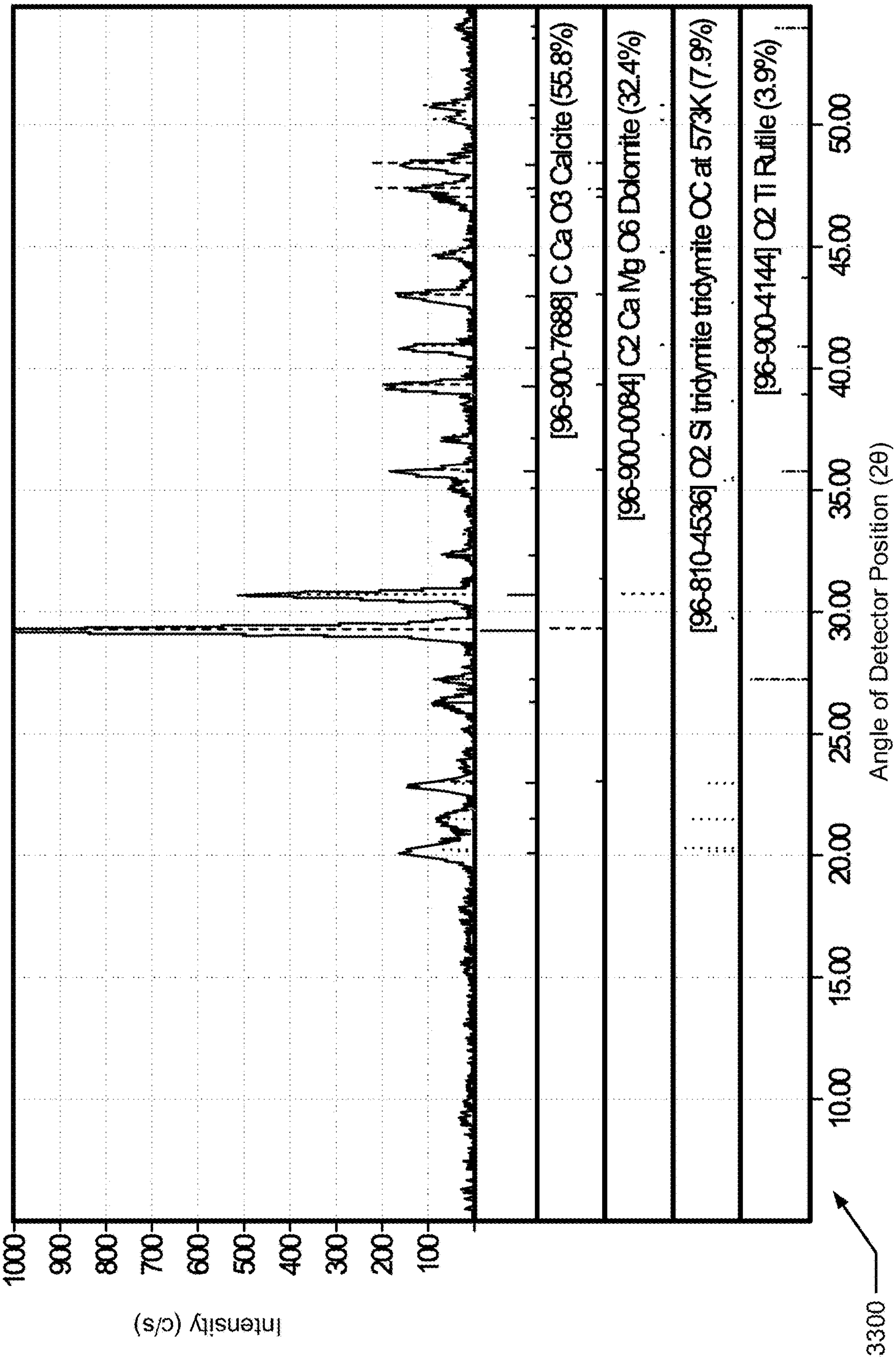
FIG. 33 shows a chart of exemplary X-ray diffraction (XRD) results obtained from XRD analysis of a hydrophobic admixture, according to one embodiment of the present disclosure.

FIG. 33 shows a chart 3300 of exemplary X-ray diffraction (XRD) results obtained from XRD analysis of a hydrophobic admixture.

Figure 34:
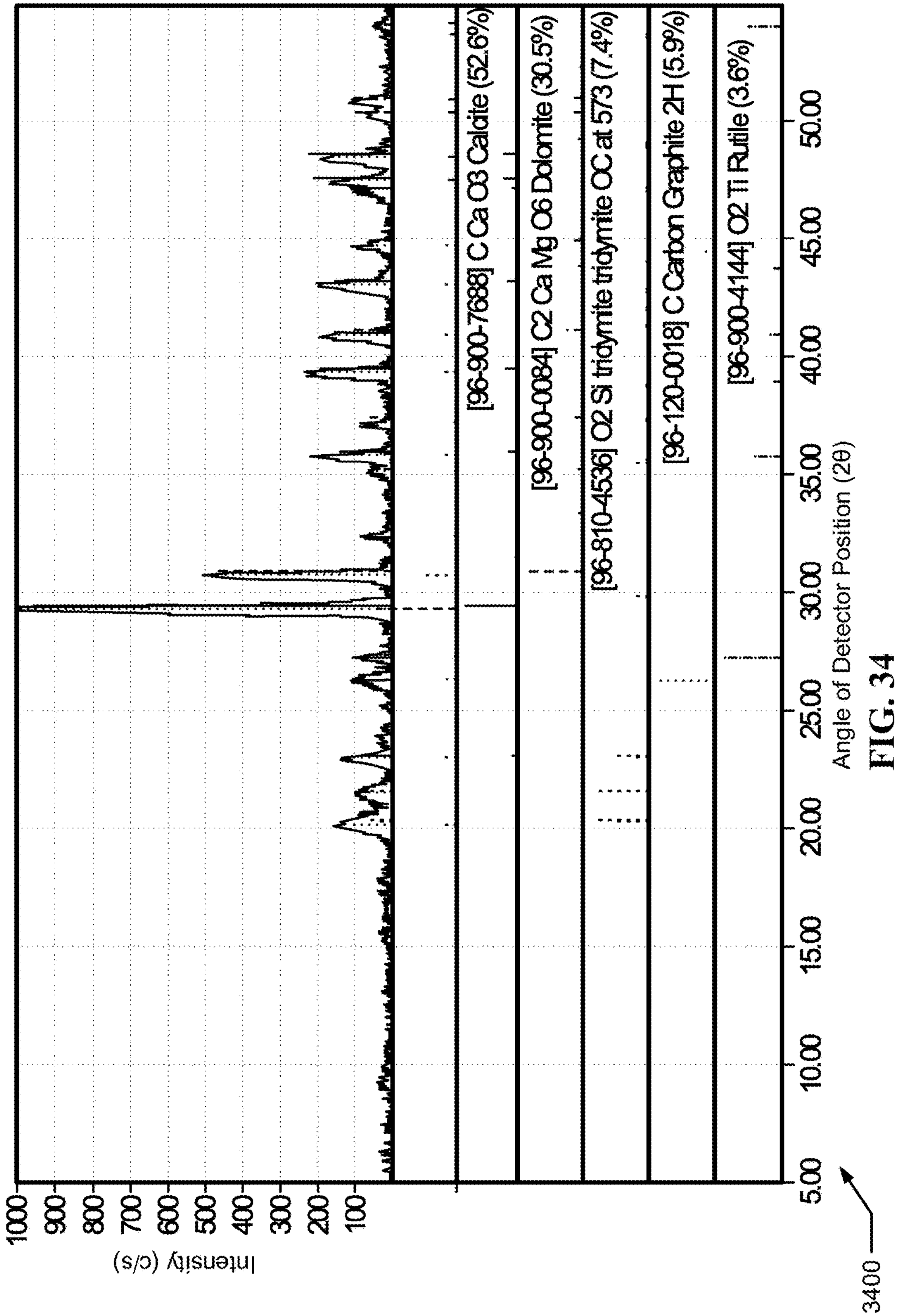
FIG. 34 shows a chart of exemplary X-ray diffraction (XRD) results obtained from XRD analysis of a hydrophobic admixture, according to one embodiment of the present disclosure.

FIG. 34 shows a chart 3400 of exemplary X-ray diffraction (XRD) results obtained from XRD analysis of a hydrophobic admixture.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A hydrophobic admixture, comprising:

titanium dioxide at about 1-16.5 weight % (wt %) of the hydrophobic admixture;

carbon allotrope at about 1-38.5 wt % of the hydrophobic admixture;

calcium salt at about 25-82.5 wt % of the hydrophobic admixture;

calcium stearate at about 15-27.5 wt % of the hydrophobic admixture; and magnesium carbonate at about 0-11 wt % of the hydrophobic admixture.

2. The hydrophobic admixture of claim 1, wherein the titanium dioxide is at about 1-15 wt % of the hydrophobic admixture; the carbon allotrope at about 1-35 wt % of the hydrophobic admixture; the calcium salt at about 25-75 wt % of the hydrophobic admixture; the calcium stearate at about 15-25 wt % of the hydrophobic admixture; and the magnesium carbonate at about 0-10 wt % of the hydrophobic admixture.

3. The hydrophobic admixture of claim 1, further comprising:

the titanium dioxide at 10.5 wt % of the hydrophobic admixture;

the carbon allotrope at about 31.6 wt % of the hydrophobic admixture;

the calcium salt at about 31.6 wt % of the hydrophobic admixture;

the calcium stearate at about 21.1 wt % of the hydrophobic admixture; and the magnesium carbonate at about 5.2 wt % of the hydrophobic admixture.

4. The hydrophobic admixture of claim 1, further comprising:

the titanium dioxide at 10 wt % of the hydrophobic admixture;

the carbon allotrope at a weight percentage of about 30 wt % of the hydrophobic admixture;

the calcium salt at a weight percentage of about 30 wt % of the hydrophobic admixture;

the calcium stearate at a weight percentage of about 20 wt % of the hydrophobic admixture;

the magnesium carbonate at a weight percentage of about 5 wt % of the hydrophobic admixture; and water at a weight percentage of about 5 wt % of the hydrophobic admixture.

5. The hydrophobic admixture of claim 1, further comprising water at about 1-10 wt % of the hydrophobic admixture.

6. The hydrophobic admixture of claim 1, wherein the calcium salt is selected from the group consisting of: calcium carbonate, calcium phosphate, calcium sulfate, calcium-magnesium carbonate, and calcium oxalate.

7. The hydrophobic admixture of claim 1, wherein the calcium salt is calcium carbonate.

8. The hydrophobic admixture of claim 1, wherein the carbon allotrope is selected from the group consisting of: graphite, graphenylene, AA'-graphite, and amorphous carbon.

9. The hydrophobic admixture of claim 1, wherein the carbon allotrope is graphite.

10. A hydrophobic building material, comprising:

a binder;

an aggregate;

a water portion; and a hydrophobic admixture, comprising:

titanium dioxide at about 1-16.5 wt % of the hydrophobic admixture;

graphite at about 1-38.5 wt % of the hydrophobic admixture;

calcium carbonate at about 25-82.5 wt % of the hydrophobic admixture;

calcium stearate at about 15-27.5 wt % of the hydrophobic admixture; and magnesium carbonate at about 0-11 wt % of the hydrophobic admixture.

11. The hydrophobic building material of claim 10, wherein the graphite comprises a grain size of about 134 μm and the titanium dioxide comprises a grain size of about 93 nm.

12. The hydrophobic building material of claim 10, wherein the binder comprises cement.

13. The hydrophobic building material of claim 10, wherein the aggregate comprises at least one of: sand and stone.

14. The hydrophobic building material of claim 10, wherein the hydrophobic building material comprises at least one: of concrete, mortar, stucco, and drywall.

* * * * *